(12) United States Patent
Kessler

(10) Patent No.: US 8,990,464 B2
(45) Date of Patent: Mar. 24, 2015

(54) METHODS FOR DISCOVERY, CONFIGURATION, AND COORDINATING DATA COMMUNICATIONS BETWEEN MASTER AND SLAVE DEVICES IN A COMMUNICATION SYSTEM

(71) Applicant: Analog Devices, Inc., Norwood, MA (US)

(72) Inventor: Martin Kessler, Somerville, MA (US)

(73) Assignee: Analog Devices, Inc., Norwood, MA (US)

( * ) Notice: Subject to any disclaimer, the term of this patent is extended or adjusted under 35 U.S.C. 154(b) by 177 days.

(21) Appl. No.: 13/646,382

(22) Filed: Oct. 5, 2012

(65) Prior Publication Data

US 2013/0124763 A1    May 16, 2013

Related U.S. Application Data

(60) Provisional application No. 61/543,380, filed on Oct. 5, 2011.

(51) Int. Cl.
| | |
|---|---|
| *G06F 13/42* | (2006.01) |
| *H04L 12/40* | (2006.01) |
| *G06F 9/44* | (2006.01) |
| *H04L 12/403* | (2006.01) |

(52) U.S. Cl.
CPC ........ *H04L 12/40026* (2013.01); *G06F 9/4411* (2013.01); *G06F 13/4282* (2013.01); *G06F 2213/0016* (2013.01); *H04L 12/4035* (2013.01); *H04L 2012/40273* (2013.01)
USPC .................... 710/104; 710/8; 710/9; 710/110

(58) Field of Classification Search
CPC ........................... G06F 9/4411; G06F 13/4282
USPC .................... 710/8–10, 104, 110; 713/400
See application file for complete search history.

(56) References Cited

U.S. PATENT DOCUMENTS

| | | | | |
|---|---|---|---|---|
| 6,629,172 | B1 * | 9/2003 | Andersson et al. | 710/104 |
| 6,745,270 | B1 * | 6/2004 | Barenys et al. | 710/104 |
| 6,928,501 | B2 * | 8/2005 | Andreas et al. | 710/110 |
| 7,673,084 | B2 * | 3/2010 | Krampl et al. | 710/110 |
| 8,205,017 | B2 * | 6/2012 | Parr et al. | 710/9 |
| 8,543,740 | B2 * | 9/2013 | Lotzenburger et al. | 710/9 |
| 2005/0128962 | A1 * | 6/2005 | Dybsetter et al. | 370/278 |
| 2010/0257303 | A1 * | 10/2010 | Lee et al. | 710/316 |

\* cited by examiner

*Primary Examiner* — Glenn A Auve
(74) *Attorney, Agent, or Firm* — Patent Capital Group

(57) ABSTRACT

Various embodiments of the present invention methods for discovery, configuration, and coordinating data communications between master and slave devices in a communication system. Exemplary embodiments are described with reference to a two-wire point-to-point bus system, although the method can be used in other communication systems. Provisions are included for controlling the sequential powering of the bus and slave devices.

24 Claims, 83 Drawing Sheets

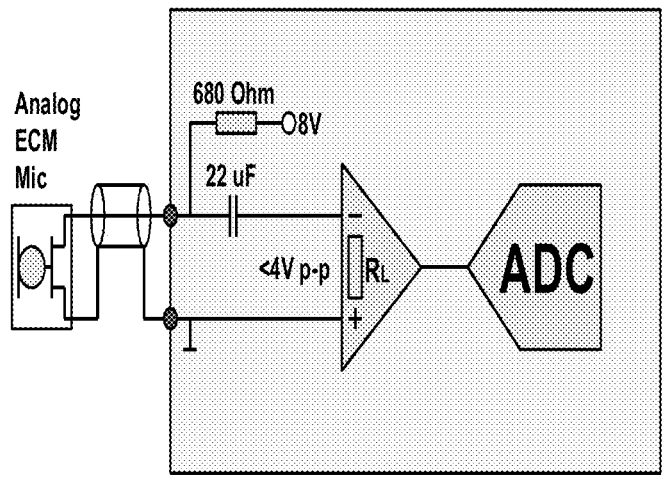
Automotive Specs:
ITU-T P.1100
Specification for Hands-Free Terminals Edition 1.6 November 2008 (and later):
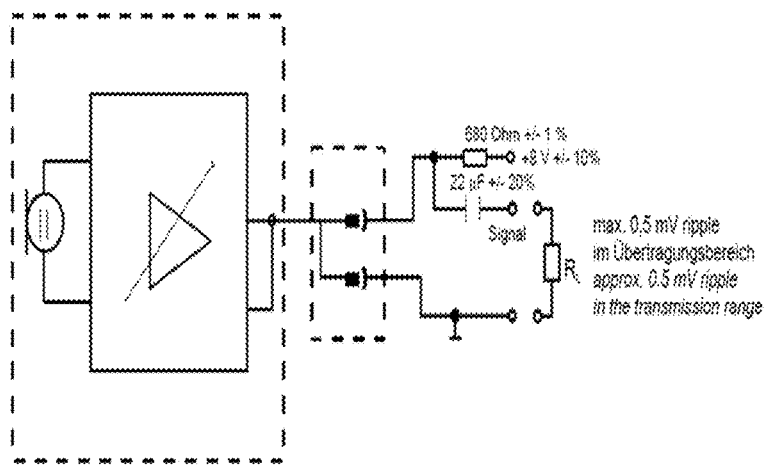
FIG. 2     Prior Art

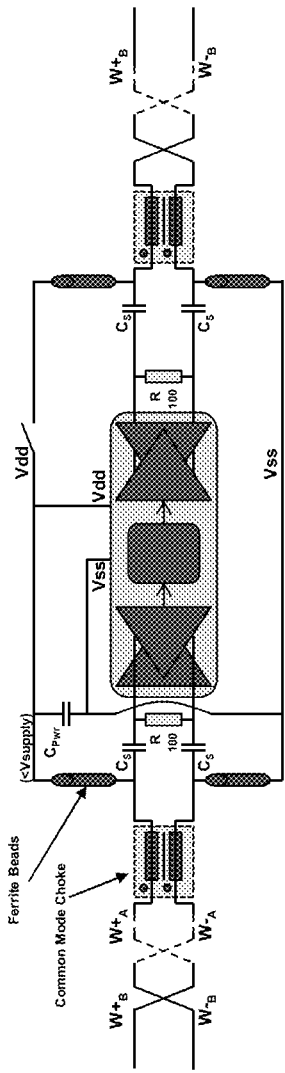
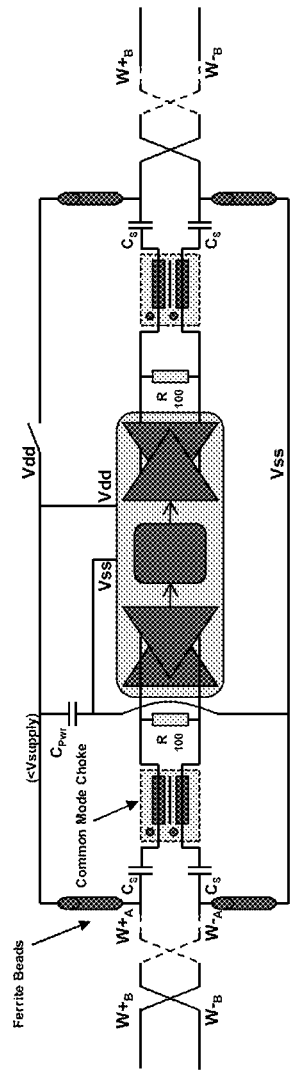
FIG. 22A
FIG. 22B

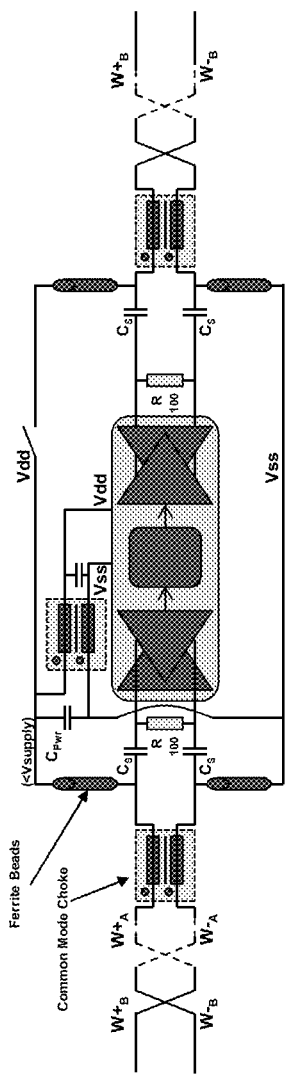
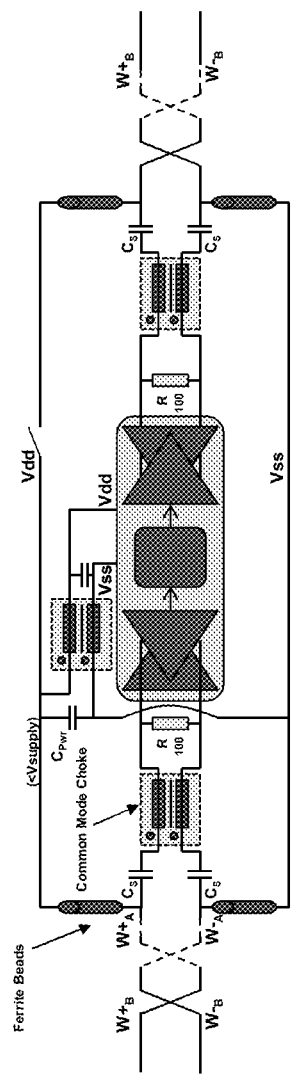
FIG. 23A
FIG. 23B

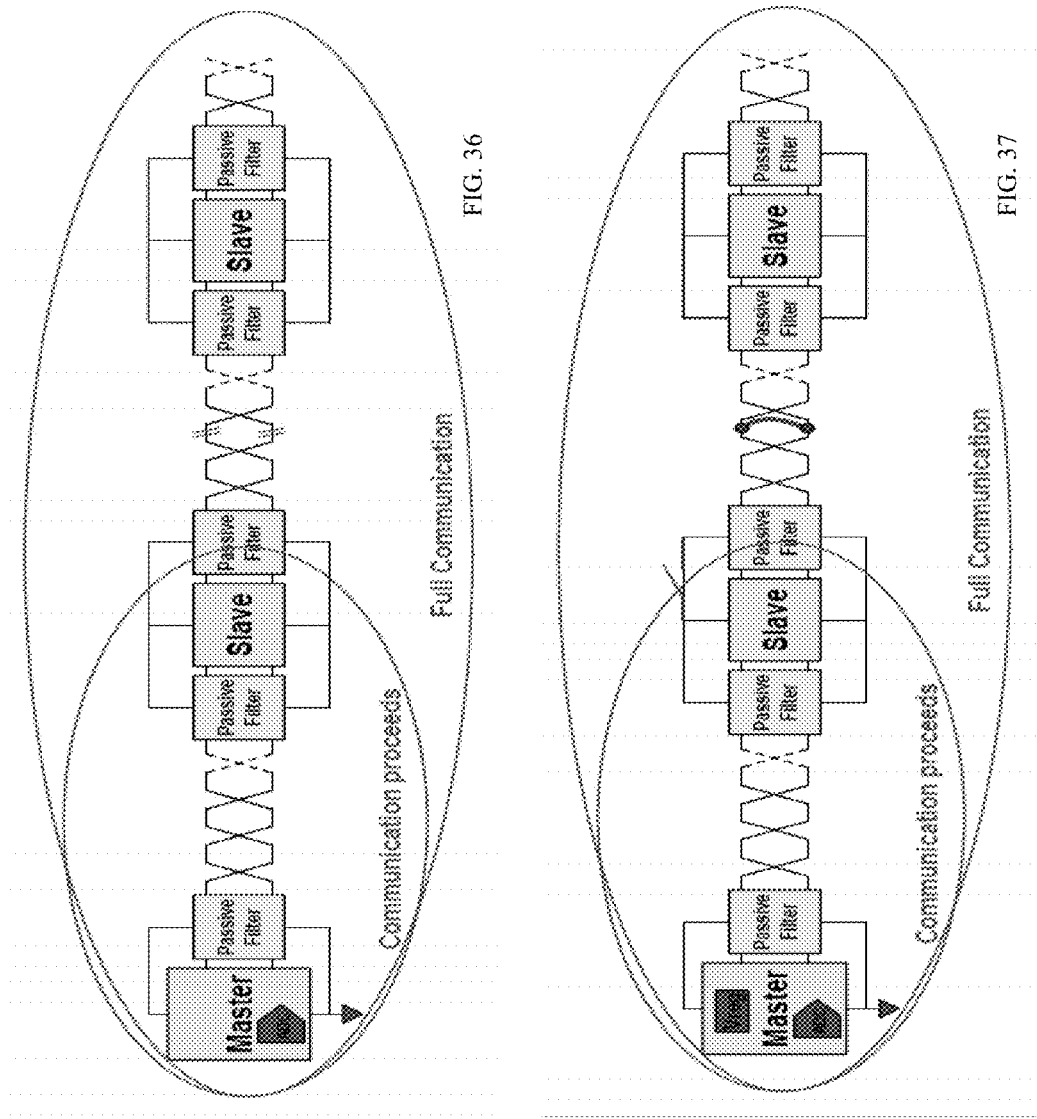

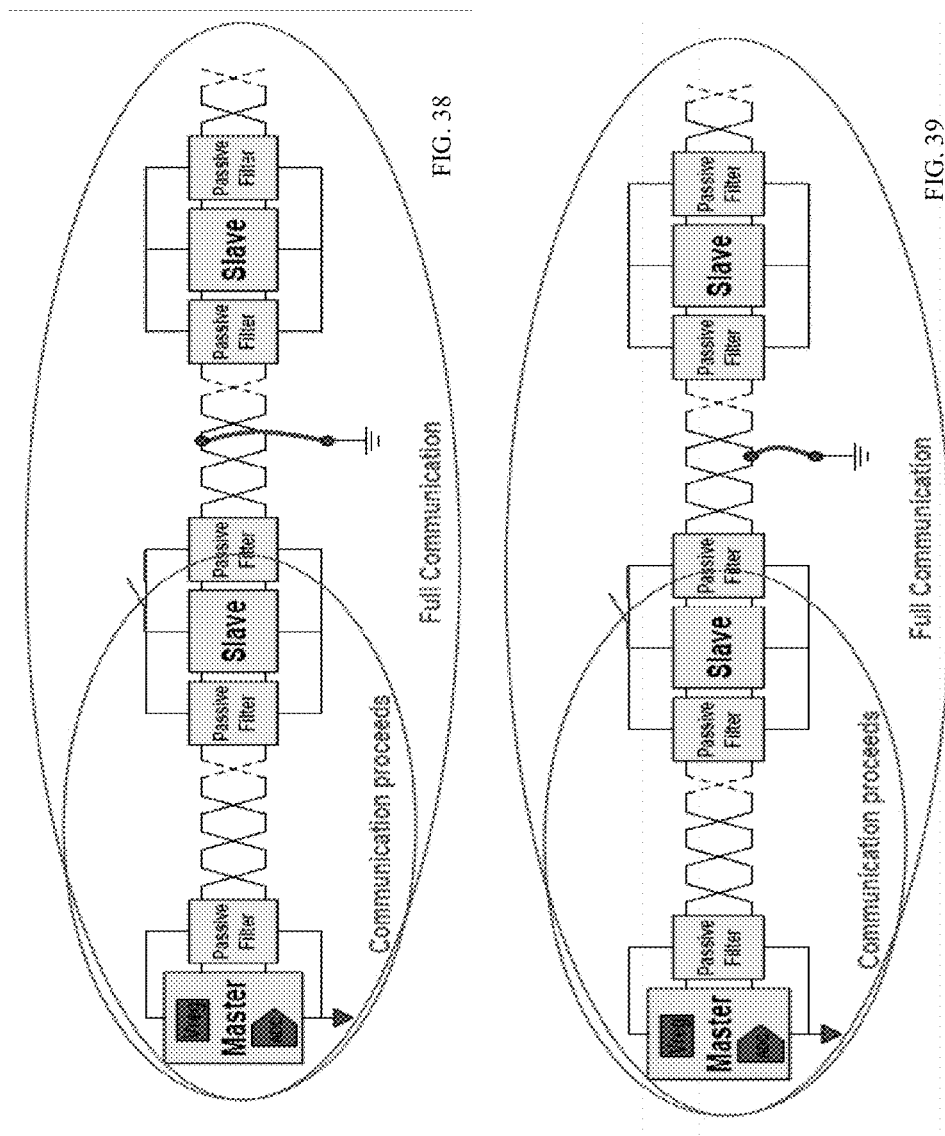

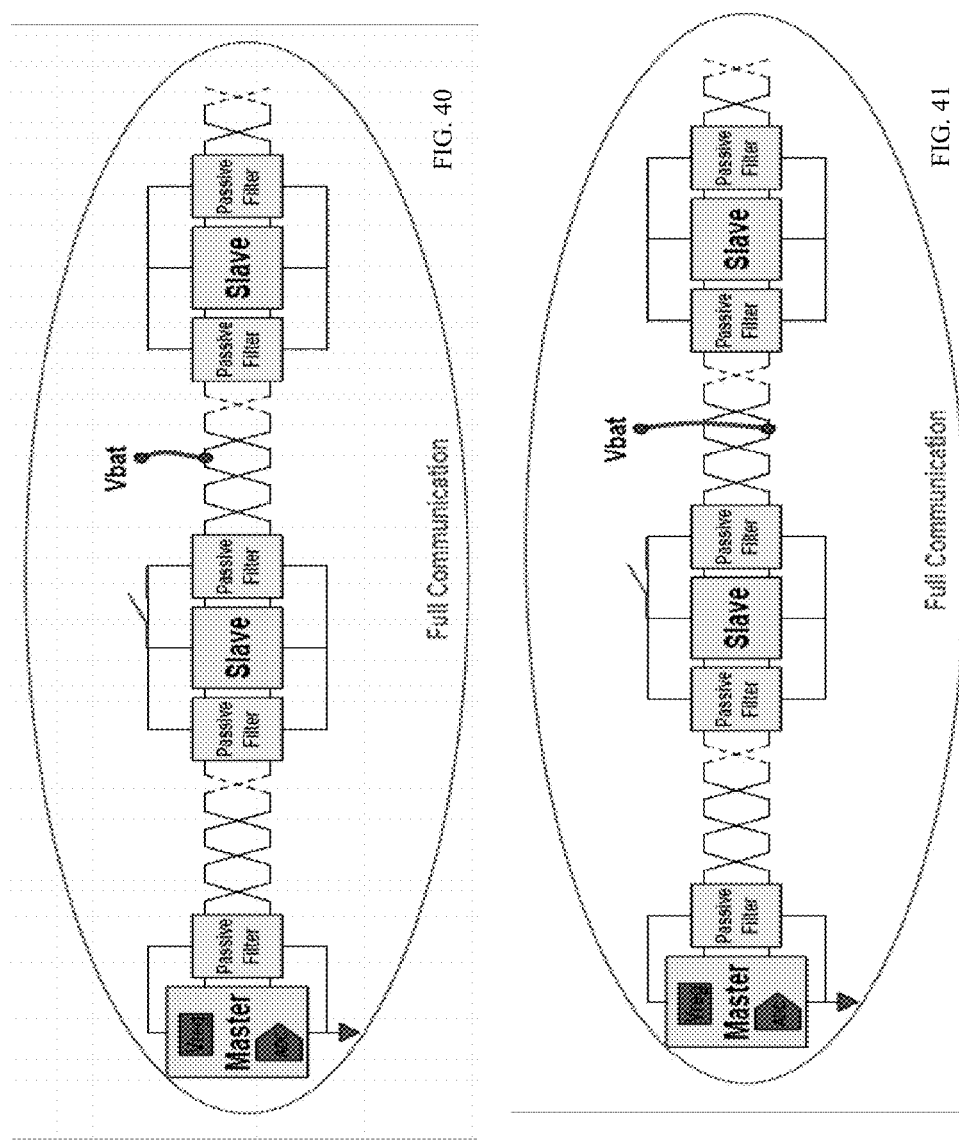

FIG. 45

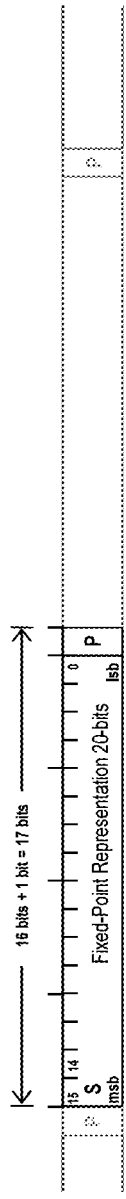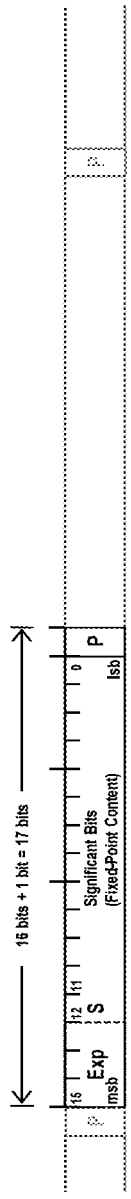
FIG. 60

FIG. 68

METHODS FOR DISCOVERY, CONFIGURATION, AND COORDINATING DATA COMMUNICATIONS BETWEEN MASTER AND SLAVE DEVICES IN A COMMUNICATION SYSTEM

CROSS-REFERENCE TO RELATED APPLICATION(S)

This patent application claims the benefit of U.S. Provisional Patent Application No. 61/543,380 filed Oct. 5, 2011 (2550/D60), which is hereby incorporated herein by reference in its entirety.

This patent application also is related to U.S. Provisional Patent Application No. 61/543,379 filed Oct. 5, 2011, which is hereby incorporated herein by reference in its entirety.

FIELD OF THE INVENTION

The present invention relates generally to communication bus technology, and, more particularly, to a two-wire communication system for high-speed data and power distribution.

BACKGROUND OF THE INVENTION

As is generally known, communication systems often have various types of sensors and/or actuators in communication with a control unit. For example, modern vehicles often have a head unit that is not only a car radio but also acts as a control unit that processes signals from various sensors and sends information to various actuators (e.g., for voice control, hands-free services, emergency roadside assistance, etc.). FIG. 1 schematically shows a vehicle head end 118 with a headend control unit 102 and related peripherals. In this figure, the respective connections between the headend control unit 102 and the Audio ADCs 106, the AM/FM/Bluetooth RF radio 108, and the Audio DACs 112, as well as the connection between Audio DACs 112 and Amplifiers 114, are local connections within the head unit 118, while the connections between the microphones 104 and the Audio ADCs 106 and the connection between Amplifiers 114 and Speakers 116 are remote connections with cables. In this figure, the head unit 118 also includes one or more communication interfaces, represented here by the block 110 (e.g., MOST, CAN, Ethernet, etc.). FIG. 2 shows some exemplary microphone connections as known in the art. FIG. 3 is a schematic diagram showing exemplary automobile microphone cabling in accordance with the head unit shown in FIG. 1. As can be seen, there is an excessive amount of wiring for the microphones, which is expensive and adds to the vehicle weight.

Thus, microphones are being used ever more frequently in vehicles for such things as hands-free systems, voice control of various devices, emergency roadside assistance and other remote services, active noise cancellation, and even in-vehicle communication (e.g., intercom, passenger-to-passenger, and driver-to-passenger communications). In automobiles, one or two microphones are often mounted on or near the rear-view mirror, but there are proposals to mount microphones additionally or alternatively in other structures such as the vehicle headliner, seatbelt straps, and/or headrests. In some proposals, multiple microphones (e.g., digital MEMS microphones) will be used together in each of a number of locations (e.g., three separate microphones or a microphone array with three microphones), for example, for beam-forming or beam-steering.

In some cases, it may be necessary or desirable for the headend control unit to send audio information to various devices in the communication system.

In FIG. 1 a head unit 118 could disintegrate some of its functions and use remote, digital connections with cables for the link between the headend control unit 102 and the Audio ADCs 106, the AM/FM/Bluetooth RF radio 108, and the Audio DACs 112.

Transmission of additional control and status information further extends the functionality and enables features as remote control and remote display.

Typically, the headend control unit requires multiple connectors (or ports) for connecting to the various sensors and/or actuators.

Some existing bus systems include:

MAC Controller based bus systems, such as MOST150 (optical, very expensive, optical cable not practical), MOST50 (electrical, expensive, requires transformers and microcontroller at each node), Flexray (complex, has synchronization issues and bandwidth limitations);

SPDIF/AES3 based bus systems, such as SPDIF (192 kBit/s, 24 bits, Stereo, no multichannel support, expensive cable), Differential (AES3)—differential, no multichannel support), Multi Channel ADAT, AES10-MADI (expensive cable and connectors), E1/T1 (ISDN)—too slow, not enough channels supported), proprietary buses; and Video+Audio Links such as National Semiconductor's FPD or Inova's APIX. These systems use expensive cables/connectors, are point to point systems and are too expensive for systems that don't require a video link.

A survey of various automotive buses can be found at http://www.interfacebus.com/Design_Connector_Automotive.html.

SUMMARY OF EXEMPLARY EMBODIMENTS

One embodiment includes a method for coordinating data communications between a master device and slave devices in a communication system having a master device, at least one intermediate slave device, and a last slave device communicatively coupled in series. The method involves periodically transmitting a synchronization control frame by the master device downstream to a first intermediate slave device in the succession of slave devices; selectively forwarding the synchronization control frame downstream by each successive intermediate slave device to the last slave device; transmitting by the last slave device a synchronization response frame upstream; and selectively forwarding the synchronization response frame upstream by each successive intermediate slave device to the master device, wherein each slave device derives timing information from the downstream synchronization control frame; at least one slave device transmits data upstream; each slave device that receives data from a downstream device selectively transmits the received data upstream and selectively transmits additional data upstream; and each device that transmits data upstream transmits the data in at least one designated time interval following the synchronization control frame.

In various alternative embodiments, each slave device may be communicatively coupled to a corresponding upstream device by a separate two-wire bus segment. The timing information may include a clock signal for local timing at the slave device and a framing signal indicating the start of a periodic superframe. Selectively transmitting data received from a downstream device may involve selectively removing the received data without transmitting the data upstream.

The method may further involve selectively transmitting data for at least one slave device by the master device following the synchronization signal, wherein each slave device that receives data from an upstream device selectively transmits the received data downstream and selectively transmits additional data downstream and each device that transmits downstream data transmits the data in designated time intervals following the synchronization signal. Selectively transmitting data received from an upstream device may involve selectively removing the received data without transmitting the data downstream.

The synchronization control frame may include a preamble and a header, wherein periodically transmitting the synchronization control frame by the master device may include scrambling a portion of the header. The scrambled portion of the header may include a count field that is changed for each successive transmission to effectively change scrambling parameters for scrambling the remainder of the scrambled portion of the header.

The synchronization control frame may include a set of fields selectively used by the master device for conveying communications between an I2C-connected host and a designated slave device. The set of fields may include a field selectively used by the master device to indicate whether a communication is destined for the designated slave device itself or for an I2C device coupled to the designated slave device.

The synchronization control frame sent by the master device may selectively include broadcast information intended for all slave devices, and wherein the synchronization response frame may include a broadcast acknowledgement field for indicating whether or not the slave devices received the broadcast information. The synchronization response frame may include an interrupt frame portion to indicate that the slave device requires attention by the master device. The synchronization response frame may include a first CRC field and a second CRC field specifically for the interrupt frame portion. The first CRC field may be a 16-bit CRC field and the second CRC field may be a 4-bit CRC field.

The upstream and/or downstream data transmitted in designated time intervals may include a parity bit as part of the data frame. The upstream and/or downstream data transmitted in designated time intervals may be scambled.

Another embodiment includes a method for discovering and configuring slave devices in a communication system having a master device and a plurality of slave devices communicatively coupled in series. The method involves, in each of a number of successive discovery cycles, transmitting a discovery signal by the master device on a downstream communication link; by each discovered slave device that receives the discovery signal, forwarding the discovery signal on a downstream communication link; and by an undiscovered slave device that receives the discovery signal, responding upstream to the discovery signal without forwarding the discovery signal on a downstream communication link.

In various alternative embodiments, a discovered slave device that is configured as the last discovered slave device and that receives the discovery signal may forward the discovery signal on a downstream communication link and await a reply from a downstream slave device while maintaining communications with the master device over an upstream communication link and, upon receiving a discovery response from a downstream slave device, forward the discovery response from the newly discovered slave device to the master device over the upstream communication link. Such discovered slave device that is configured as the last discovered slave device and that receives the discovery signal may provide power to the downstream communication link prior to forwarding the discovery signal. Providing power to the downstream communication link may involve connecting power from the upstream communication link to the downstream communication link. Connecting power from the upstream communication link to the downstream communication link may involve closing at least one switch coupled between the upstream communication link and the downstream communication link.

The method may involve, upon discovery of the newly discovered slave device, configuring the newly discovered slave device as the last discovered slave device and reconfiguring the previously last discovered slave device as no longer being the last discovered slave device. The discovery signal may be part of a synchronization control frame from which the slave devices obtain timing information. The discovery signal may include a response time indicating a time interval for a newly discovered slave device to reply to the discovery signal.

Additional embodiments may be disclosed and claimed.

BRIEF DESCRIPTION OF THE DRAWINGS

The foregoing and advantages of the invention will be appreciated more fully from the following further description thereof with reference to the accompanying drawings wherein:

FIGS. 22A and 22B are schematic diagrams of a slave device in which common mode chokes are used at both bus ports to reduce common mode variations in the signal chain;

FIGS. 23A and 23B are schematic diagrams of a slave device in which common mode chokes are used at both bus ports to reduce common mode variations in the signal chain and also a common mode choke is used on the power supply to filter out differential and common mode voltage variations;

FIG. 36 schematically shows an open wire situation between two slave devices;

FIG. 37 schematically shows a short circuit situation between two slave devices;

FIG. 38 schematically shows a situation in which the positive wire between two slave devices is shorted to ground;

FIG. 39 schematically shows a situation in which the negative wire between two slave devices is shorted to ground;

FIG. 40 schematically shows a situation in which the positive wire between two slave devices is shorted to a high-voltage source such as a car battery;

FIG. 41 schematically shows a situation in which the negative wire between two slave devices is shorted to a high-voltage source such as a car battery;

FIG. 45 provides a relative comparison of the uni-directional bus (ring) to the bi-directional point-to-point bus;

FIG. 60 shows exemplary data frame formats in accordance with certain embodiments of the present invention;

FIG. 68 schematically shows scenarios with seatbelt-mounted microphones in communication with the headend control unit via one or more A2B devices;

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

Figure 1:
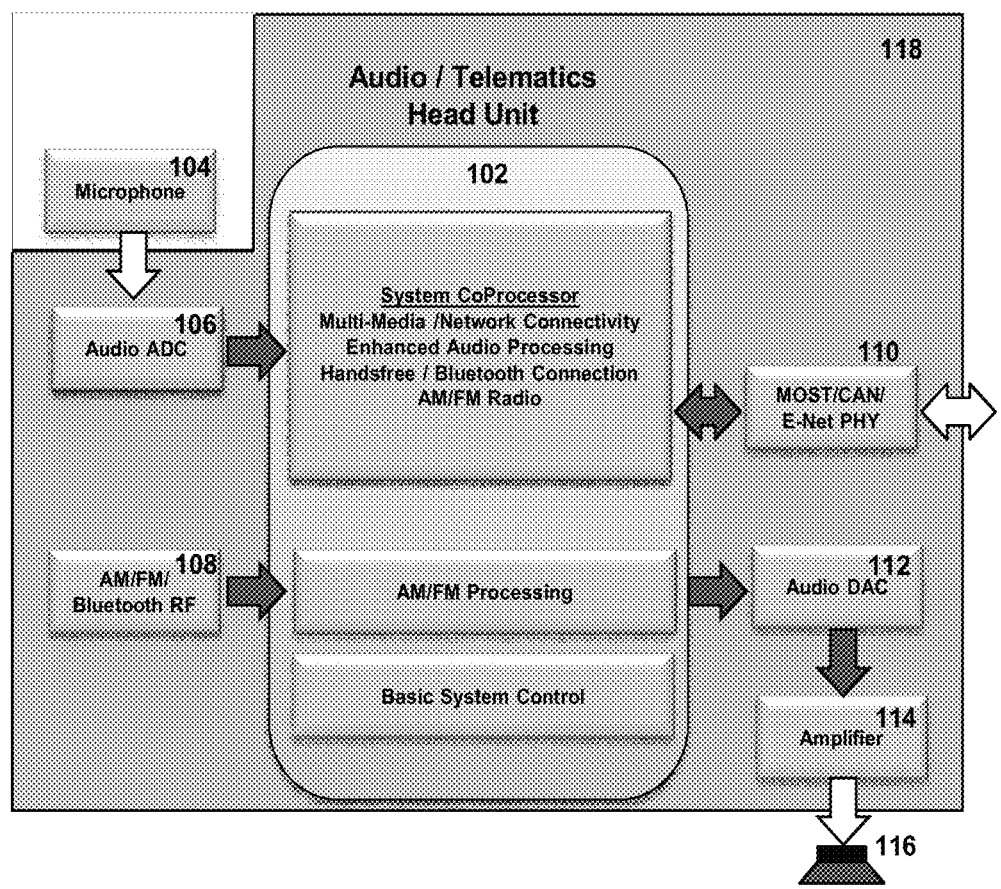
FIG. 1 schematically shows a vehicle headend control unit and related peripherals.
Figure 3:
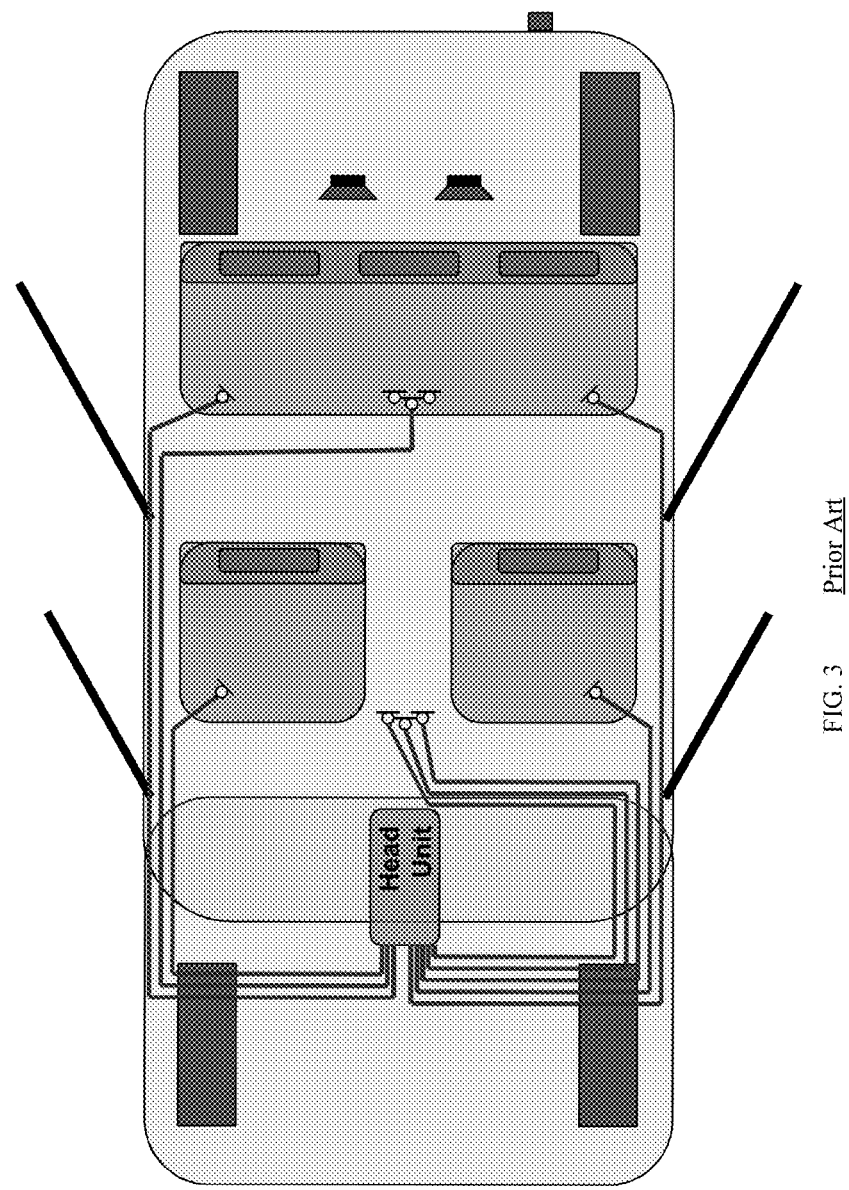
FIG. 3 is a schematic diagram showing exemplary automobile microphone cabling in accordance with the headend unit shown in FIG. 1.

Various embodiments of the present invention provide a two-wire (e.g., unshielded twisted pair) bus system that is simple (e.g., no microcontroller required in slave devices), synchronous with embedded clock information, inexpensive, automotive EMC compliant, and has sufficient speed and bandwidth for a large number of slave devices/peripherals, and also provides various protocols that can be used in various communication systems such as a two-wire bus system. The two-wire bus optionally may be self-powered, i.e., the master device may provide power to the slave devices over the two-wire bus. The slave devices do not require a separate ground connection and therefore they can be placed virtually anywhere. Furthermore, the slave devices do not require a crystal oscillator or other independent clock source, as clocking information is provided in the signaling over the two-wire bus. Provisions for time-division multiplexed data to/from the various sensors/actuators as well as I2S and/or I2C signaling is included in certain alternative embodiments While two-wire buses of the type described below may be used in any of a wide variety of communication systems, they were designed with automotive audio applications in mind and therefore may be referred to as an Automotive Audio Bus or A2B. With reference again to FIG. 1, the A2B bus may be used to replace any of the local connections, which would allow the devices to be placed remotely from the headend control unit 102, e.g., in various locations throughout a vehicle.

A number of bus configurations are discussed below, including a bi-directional point-to-point bus configuration, a uni-directional ring configuration, and a bi-directional multipoint line configuration.

1. Exemplary Bi-Directional Point-to-Point Bus Configurations

Figure 4:
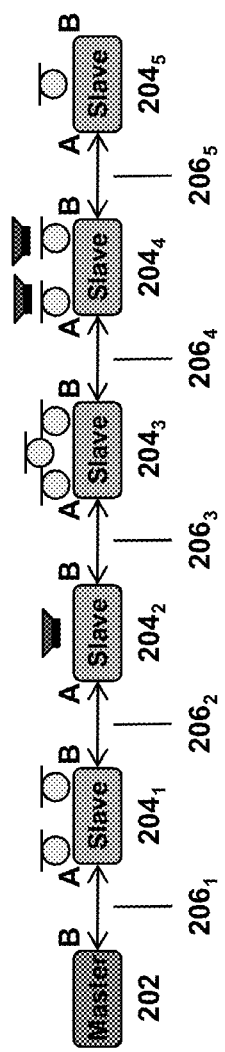
FIG. 4 schematically shows a bi-directional point-to-point bus configuration in accordance with an exemplary embodiment of the present invention.

An exemplary bi-directional point-to-point bus embodiment is now described. FIG. 4 schematically shows a bi-directional point-to-point bus configuration in accordance with an exemplary embodiment of the present invention. Here, a master device 202 is in communication with various slave device sensors and actuators 204$_1$-204$_5$. It should be noted that a particular slave 204 may be both a sensor and an actuator, such as, for example, a touch-screen device that both displays information provided by the master 202 and sends inputs to the master 202, a device with both a microphone and speaker, etc. In any case, it is typically necessary or desirable to allow for bi-directional communication between the master 202 and each slave 204 and optionally to allow for communication between slave devices either directly or via the master device 202.

In the exemplary embodiment shown in FIG. 4, each pair of adjacent devices (e.g., the master 202 and the first slave 204$_1$, the first slave 204$_1$ and the second slave 204$_2$, etc.) is connected by a two-wire bus segment 206 (i.e., two-wire bus segments 206$_1$-206$_5$), typically unshielded twisted pair (UTP) wiring with appropriate connectors. Power is provided by the master device 202 to all of the slave devices 204 as discussed more fully below. Communications between adjacent devices over the corresponding two-wire bus segment is essentially half-duplex, e.g., the first slave device does not transmit while the master device is transmitting to it, and vice versa. In order to allow for communications between the master and any given slave, and optionally between slave devices on a peer-to-peer basis, intermediate slave devices essentially relay information. Communications over the various bus segments 206 are essentially independent of one another, and each slave device 204 can selectively pass along the information it receives (e.g., similar to a repeater), remove information before passing along information (e.g., strip information intended for the particular slave device), and/or add information (e.g., insert data into a time slot designated for the particular slave device). The bus protocols (discussed more fully below) ensure that synchronization and timing information is provided appropriately to the slave devices. In preferred embodiments, the bus protocols also provide for I2S and I2C communications, expanding the types of applications in which the bus can be employed.

2. Exemplary Bus/Device Configurations

FIGS. 5-11 schematically show various bus/device configuration scenarios (in these examples, for digital, multi-channel pulse-code modulated (PCM) information), in accordance with exemplary embodiments of the present invention.

Figure 5:
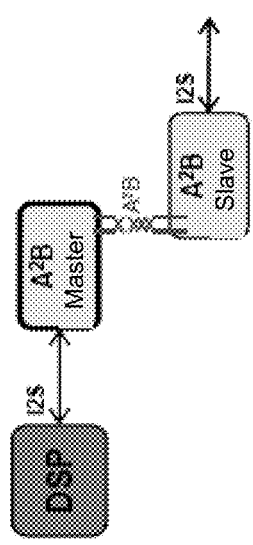
FIG. 5 schematically shows an A2B point-to-point bus/device configuration, in accordance with an exemplary embodiment.

FIG. 5 schematically and generically shows an A2B point-to-point bus/device configuration, in accordance with an exemplary embodiment.

Figure 6:
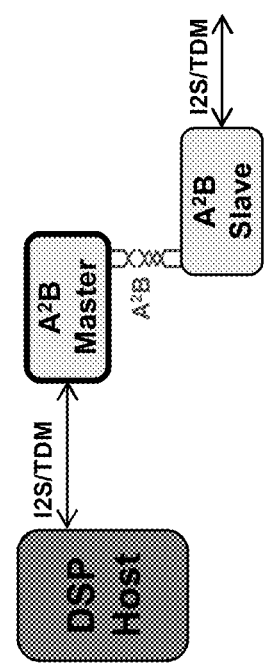
FIG. 6 schematically shows a point-to-point bus/device configuration scenario in which multiple PCM channels are presented to a DSP or provided by the DSP.

FIG. 6 schematically shows a point-to-point bus/device configuration scenario in which multiple PCM channels are presented to a DSP or provided by the DSP. Exemplary embodiments support various data sizes, such as 8, 16, 24, and 32 bit data sizes.

Figures 7, 8:
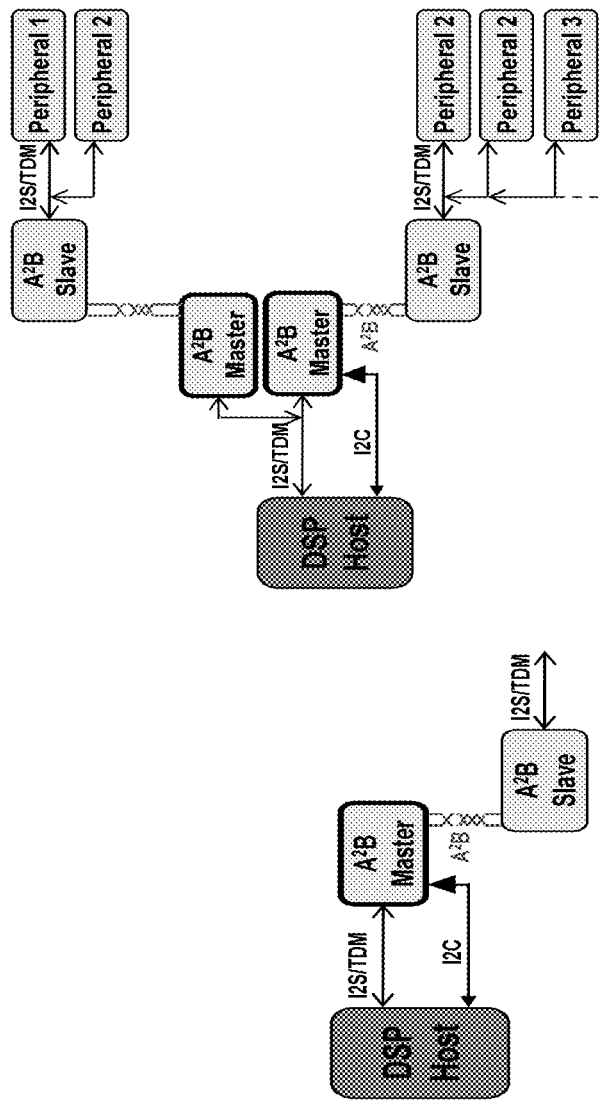
FIG. 7 schematically shows a point-to-point bus/device configuration scenario in which multiple PCM channels are presented to a DSP or provided by the DSP; and the host device (microcontroller or DSP) is in communication with the master device via an I2C interface.
FIG. 8 schematically shows multiple (in this example two) bus/device configurations in which multiple, PCM channels are presented to a DSP or provided by the DSP on a shared PCM link (e.g. I2S/TDM); and the host device (microcontroller or DSP) is in communication with the master device via an I2C interface.

FIG. 7 schematically shows a point-to-point bus/device configuration scenario in which multiple PCM channels are presented to a DSP or provided by the DSP; and the host device (microcontroller or DSP) is in communication with the master device via an I2C interface.

FIG. 8 schematically shows multiple (in this example two) bus/device configurations in which multiple, PCM channels are presented to a DSP or provided by the DSP on a shared PCM link (e.g. I2S/TDM); and the host device (microcontroller or DSP) is in communication with the master device via an I2C interface. FIG. 8 also shows that the Slave devices can connect to multiple peripherals sharing a single PCM interface (e.g. I2S/TDM).

Figure 9:
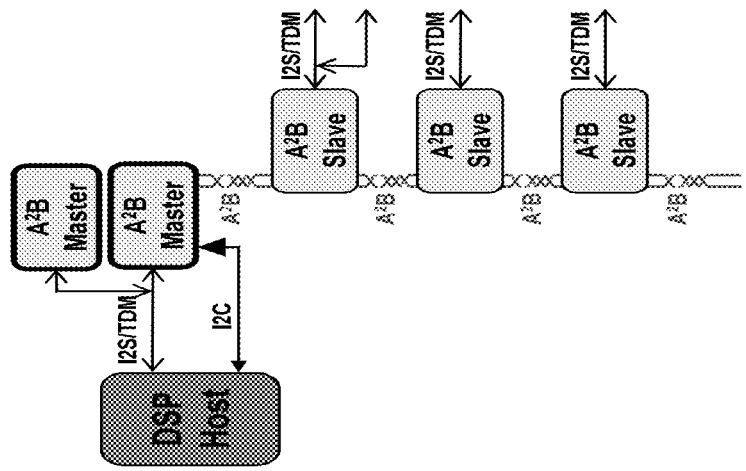
FIG. 9 schematically shows a bus/device configuration in which multiple PCM channels are presented to a DSP or provided by the DSP on a shared PCM link (e.g. I2S/TDM) where the channels are sourced by and consumed at multiple remote nodes; and the host device (microcontroller or DSP) is in communication with the master device via an I2C interface.

FIG. 9 schematically shows a bus/device configuration in which multiple PCM channels are presented to a DSP or provided by the DSP on a shared PCM link (e.g. I2S/TDM) where the channels are sourced by and consumed at multiple remote nodes; and the host device (microcontroller or DSP) is in communication with the master device via an I2C interface. FIG. 9 also shows that the Slave devices can connect to multiple peripherals sharing a single PCM interface (e.g. I2S/TDM).

Figure 10:
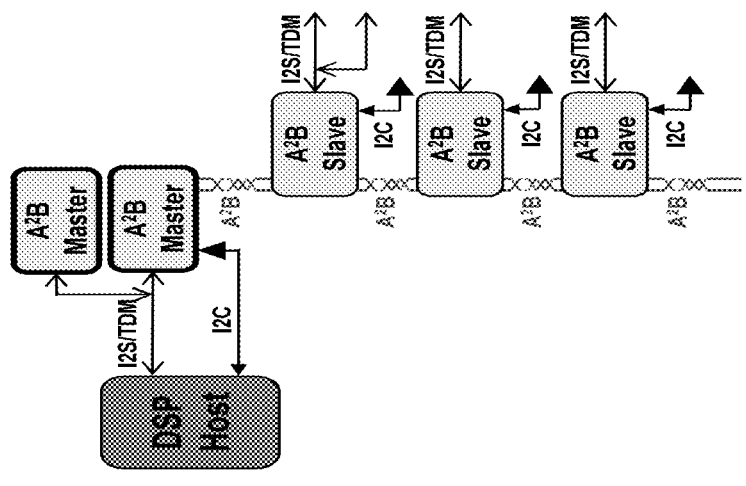
FIG. 10 schematically shows a bus/device configuration in which multiple PCM channels are presented to a DSP or provided by the DSP on a shared PCM link (e.g. I2S/TDM) where the channels are sourced by and consumed at multiple slave nodes; and the host device (microcontroller or DSP) is in communication with the master device via an I2C interface.

FIG. 10 schematically shows a bus/device configuration in which multiple PCM channels are presented to a DSP or provided by the DSP on a shared PCM link (e.g. I2S/TDM) where the channels are sourced by and consumed at multiple slave nodes; and the host device (microcontroller or DSP) is in communication with the master device via an I2C interface. FIG. 10 also shows that the Slave devices can connect to multiple peripherals sharing a single PCM interface (e.g. I2S/TDM) and that I2C signaling can be conveyed over the bus.

Figure 11:
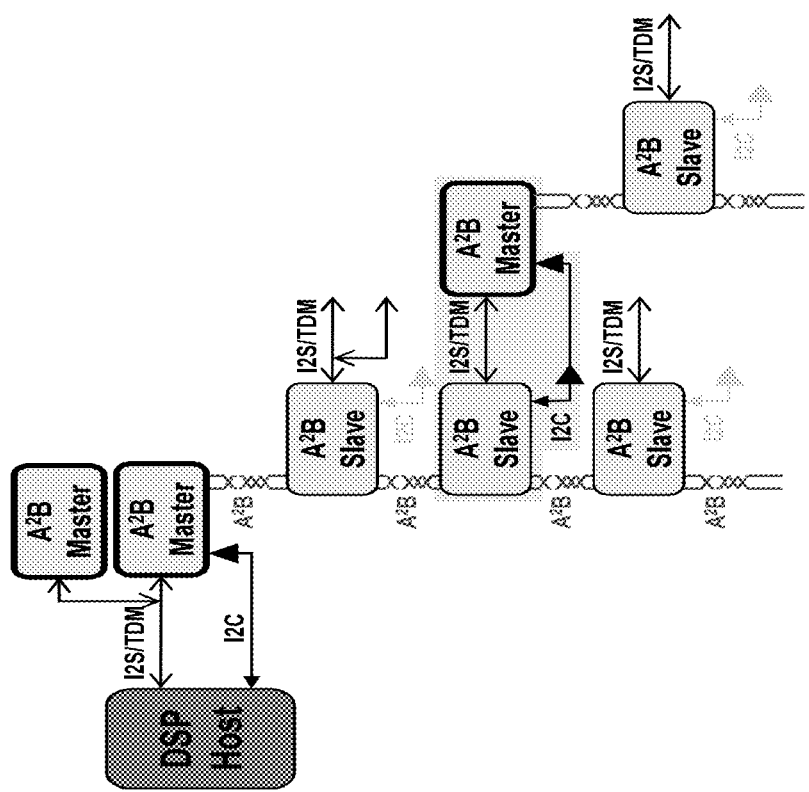
FIG. 11 schematically shows a bus/device configuration scenario in which a remote node combines both slave and master functions so as to act as a slave on one bus segment and a master on a second bus segment (e.g., the two A2B chips connected by an I2C and PCM link (e.g., I2S/TDM) may be a single physical node with two bus ports)

FIG. 11 schematically shows a bus/device configuration scenario in which a remote node combines both slave and master functions so as to act as a slave on one bus segment and a master on a second bus segment (e.g., the two A2B chips connected by an I2C and PCM link (e.g., I2S/TDM) may be a single physical node with two bus ports).

3. Conveying Data, Power, and Timing

Typically, the master device will operate a single bus port and each slave will operate two bus ports, one for an upstream connection (i.e., toward the master device) and one for a downstream connection (i.e., toward the next slave device), with the last slave device only operating one port during normal operation (i.e., for its upstream connection). Generally speaking, each bus port will be associated with a transceiver, and thus the master device typically will have a single transceiver and each slave device typically will have two transceivers (i.e., one for the upstream connection and one for the downstream connection), although it should be noted that, alternatively, the master device may have two transceivers such as, for example, to allow for the device to be configurable between master and slave modes or to allow for connection of the bus in a ring configuration (discussed below).

Each transceiver is AC-coupled to its corresponding two-wire bus segment, and data signals are conveyed using a predetermined form of low voltage differential signaling (e.g., LVDS or MLVDS or similar signaling) with appropriate encoding to provide timing information over the bus (e.g., differential Manchester coding, biphase mark coding, Manchester coding, NRZI coding with run-length limiting, etc.). For power distribution (which is optional, as some nodes may be configured to have local power provided to them), the master device typically places a DC bias on the bus segment on the line side of its AC coupling (e.g., by connecting one wire to Vdd and the other to ground), and each successive slave device can selectively tap the upstream bus segment on the line side of its upstream AC coupling to recover power, which may be used to power the slave itself (and optionally devices coupled to it) and also to selectively bias the downstream bus segment on the line side of its downstream AC coupling (as will be discussed below, slaves may be powered one at a time in some embodiments, e.g., using one or more switches to selectively apply DC bias to the downstream bus segment). Typically, the correct polarities of the two bus wires on a given bus segment must be maintained, although in certain alternative embodiments, provisions may be made to allow operation even if the signal wires are reversed (e.g., the slave devices may include full wave rectifiers on the power supply that, together with the encoding scheme, allow the signal wires to be reversed and the circuit to still function).

Thus, each bus segment carries AC and DC components. The AC couplings on the line side of the transceiver substantially isolate the transceivers from the DC component on the line to allow for high-speed bi-directional communications. The DC component is tapped for power, typically through filters (e.g., ferrites or other inductors) that eliminate the high-frequency AC component (in an exemplary embodiment, the bus runs at a frequency of around 49.152 MHz and the filters are selected to filter frequencies in this range). Each slave typically includes a power regulator in order to produce a predetermined voltage (e.g., 1.8V or 3.3V) from the line voltage, which may drop along the length of the bus in some embodiments. In this way, power can be conveyed from the master to all of the slave devices while preserving the ability for high-speed data bi-directional communications on each bus segment.

Figure 12:
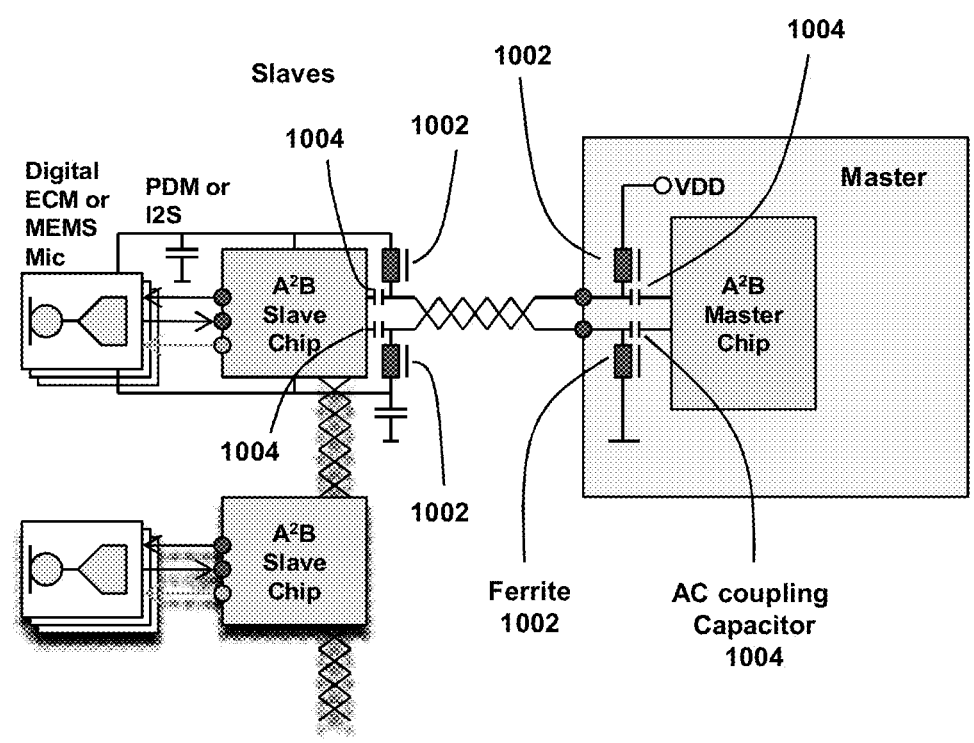
FIG. 12 schematically shows the AC coupling and DC biasing in accordance with an exemplary embodiment of the present invention.

FIG. 12 schematically shows a configuration with AC coupling and DC biasing in accordance with an exemplary embodiment of the present invention. In this example, the ferrites 1002, coupling capacitors 1004, and even an optional power switch (not shown) is outside of the A2B chips. The ferrites 1002 and/or AC coupling capacitors 1004 may be part of a two-wire bus segment that connects to the A2B chip via an appropriate connector. In alternative embodiments, the coupling capacitors and/or the ferrites and/or switch(es) may be integral to the A2B chip.

Figure 13:
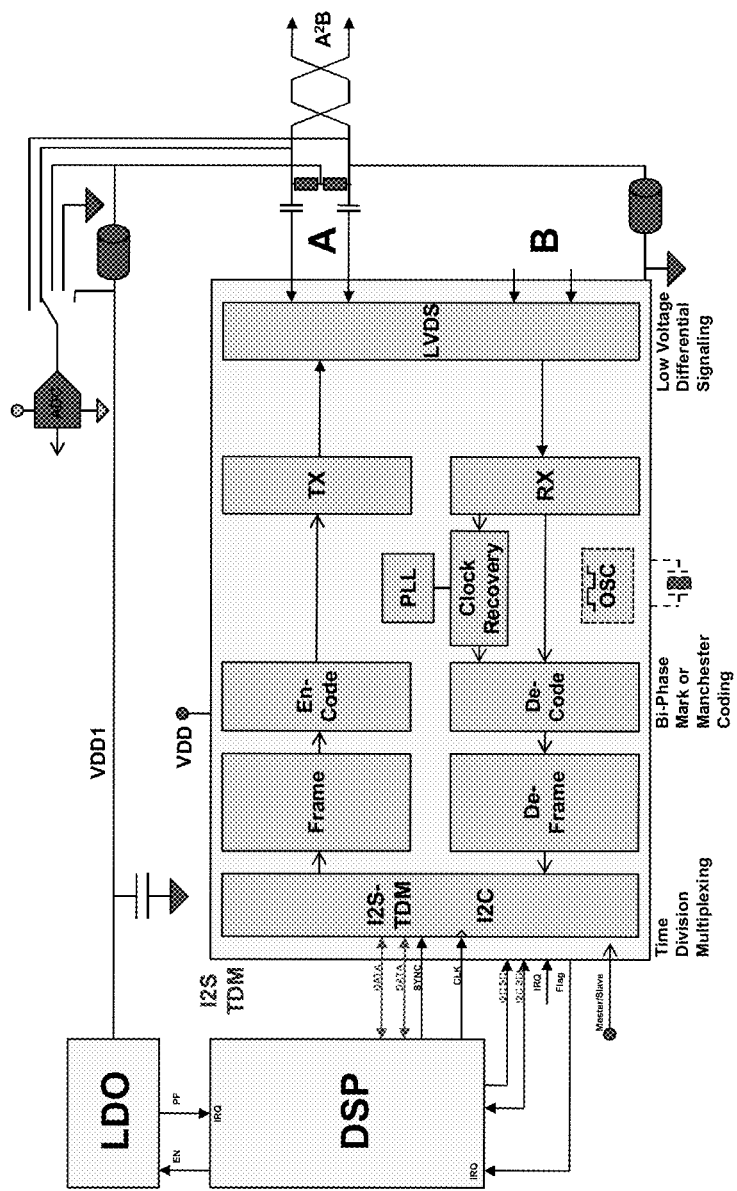
FIG. 13 schematically shows a block diagram of the relevant components of a master device, in accordance with an exemplary embodiment of the present invention.

FIG. 13 schematically shows a block diagram of the relevant components of a master device, in accordance with an exemplary embodiment of the present invention. Here, the master device is connected to a digital signal processor (DSP), although other configurations are possible, for example, coupling to a microprocessor via the I2C interface.

A power supply (in this example, a low-dropout or LDO regulator, although a switching regulator or other voltage regulator may be used in various alternative embodiments) provides power for the master device as well as for biasing the bus. As will be discussed more fully below, an analog-to-digital converter (ADC) is included here for use in detecting various types of bus errors, e.g., by the DSP or by a separate diagnostics processor.

Figure 14:
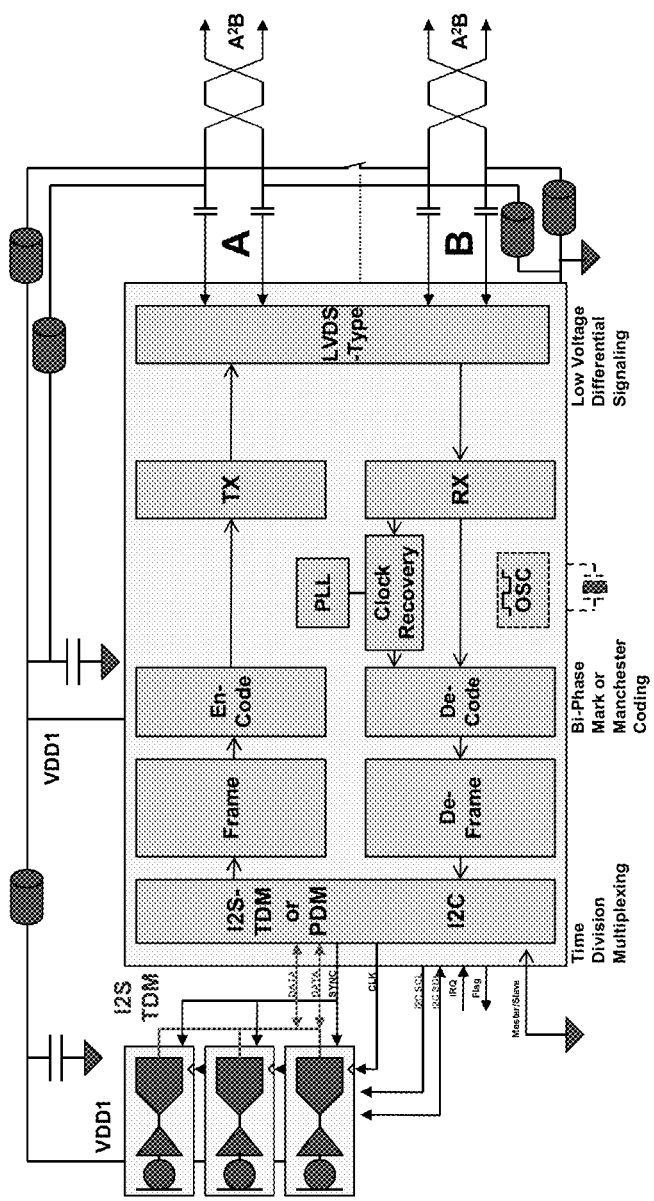
FIG. 14 schematically shows block diagrams of the relevant components of a slave device, in accordance with a particular exemplary embodiment of the present invention.

FIG. 14 schematically shows a block diagram of the relevant components of a slave device, in accordance with an exemplary embodiment of the present invention. In this exemplary embodiment, the transmitter and receiver blocks are essentially shared by the two bus ports A and B through a set of switches (such a configuration may allow one bus port to receive while the other bus port transmits and vice versa but not both ports receiving or transmitting at the same time), although alternative embodiments may have separate transmitter and receiver blocks for each bus port. It should be noted that the oscillator (OSC) block is shown in dashed lines to indicate that a crystal oscillator is not needed in the slave device.

Figure 15:
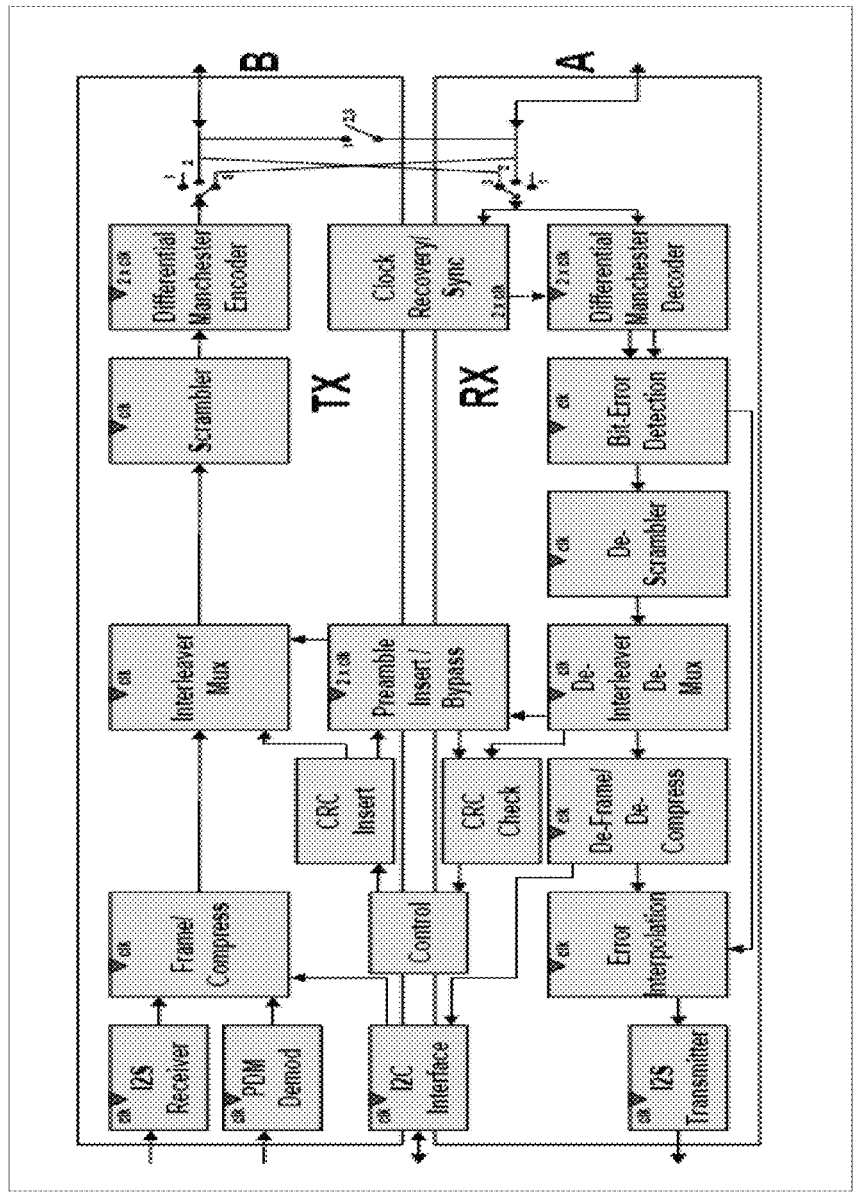
FIG. 15 schematically shows additional details of certain components of the slave device shown in FIG. 14, in accordance with a particular exemplary embodiment of the present invention.

FIG. 15 schematically shows additional details of certain components of the slave device shown in FIG. 14, in accordance with a particular exemplary embodiment of the present invention. Of particular interest is the block labeled "Error Interpolation," which, in this exemplary embodiment, compensates for missing or erroneous information received by the device, e.g., using interpolation to insert data in place of missing or erroneous information. Where the information is audio information, the Error Interpolation block may insert a duplicate or interpolated audio frame in place of a missing or erroneous audio frame. It should be noted that errors may be signaled to the chip interface via the I2S Transmitter, i.e., embedded in I2S/TDM transmissions.

Figure 18:
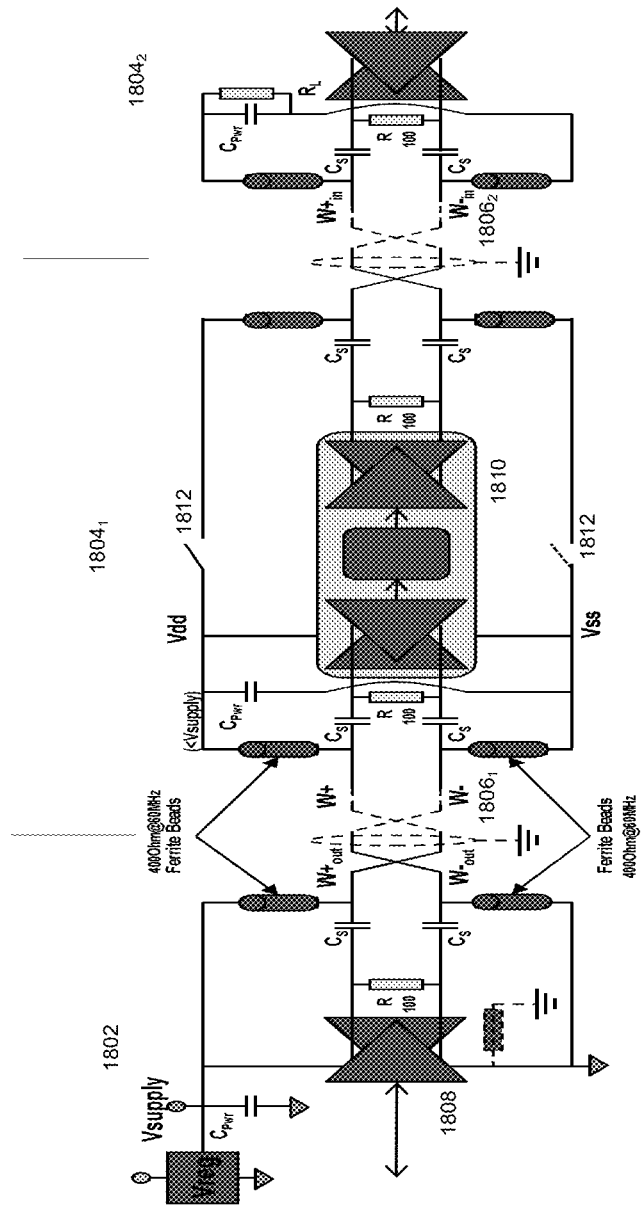
FIG. 18 is a schematic block diagram showing additional details of the bi-directional point-to-point serial bus and devices, in accordance with exemplary embodiments of the present invention.
Figure 19:
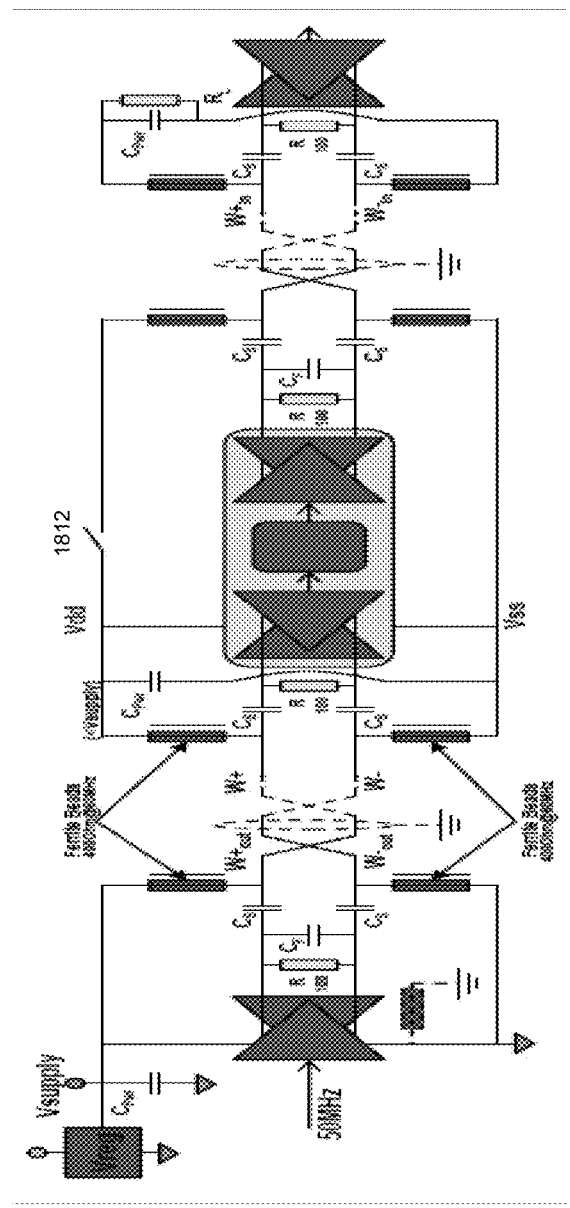
FIG. 19 is a schematic block diagram similar to FIG. 18 but with only a single switch, in accordance with an alternative embodiment of the present invention.

FIG. 18 is a schematic block diagram showing additional details of the bi-directional point-to-point serial bus and devices, in accordance with exemplary embodiments of the present invention. As discussed above, the master device 1802 includes a transceiver 1808 that is AC-coupled to the first bus segment 1806$_1$ and also places the initial DC bias on the bus segment 1806$_1$. The slave device 1804$_1$ includes a transceiver 1810 that is AC-coupled on both ends to its upstream and downstream bus segments 1806$_1$ and 1806$_2$, respectively, and also selectively places a DC bias on the downstream bus segment 1806$_2$ via the lines marked Vdd and Vss to slave device 1804$_2$. In this exemplary embodiment, each of those lines Vdd and Vss includes a switch 1812 that can be used to selectively couple and decouple the bias signal to the corresponding wire of the downstream bus segment 1806$_2$. Among other things, these switches 1812 allow for selectively powering the next successive downstream slave, e.g., under the control of the master device 1802. In effect, only one such switch is needed to control power to the downstream slave device 1804$_2$, as shown in FIG. 19 (the switch 1812 is shown on the Vdd line, although it alternatively could be on the Vss line). Alternative embodiments may omit the switch(es) such that power provided by the master would be automatically propagated downstream to all slave devices. The switch can also be omitted if the power is not propagated over the bus but instead is separately provided to a bus node. If power is not propagated over the bus but instead is separately provided to the slave nodes, then the switches can still be of value to place a bias voltage downstream on the bus, which acts as a power-on, wake-up signal to the next node.

Here, the switches are only shown at the first slave device 1804 but the master 1802 and other slaves also may have switches to propagate power in a controlled fashion.

4. Slave Clock Recovery

As discussed above, the slave nodes do not require a crystal. Rather, the slaves generate their clock from the bus clock (typically 1024 or 2048 bits faster than the periodic sampling clock). As discussed below, a control frame with sync header is periodically sent (e.g., every 1024 bits). The slaves recover their clock with a clock recovery circuit and find in the sync header the periodic sampling clock, which feeds a phased-locked loop (PLL). The PLL output becomes the clock base for other processing.

Figure 20:
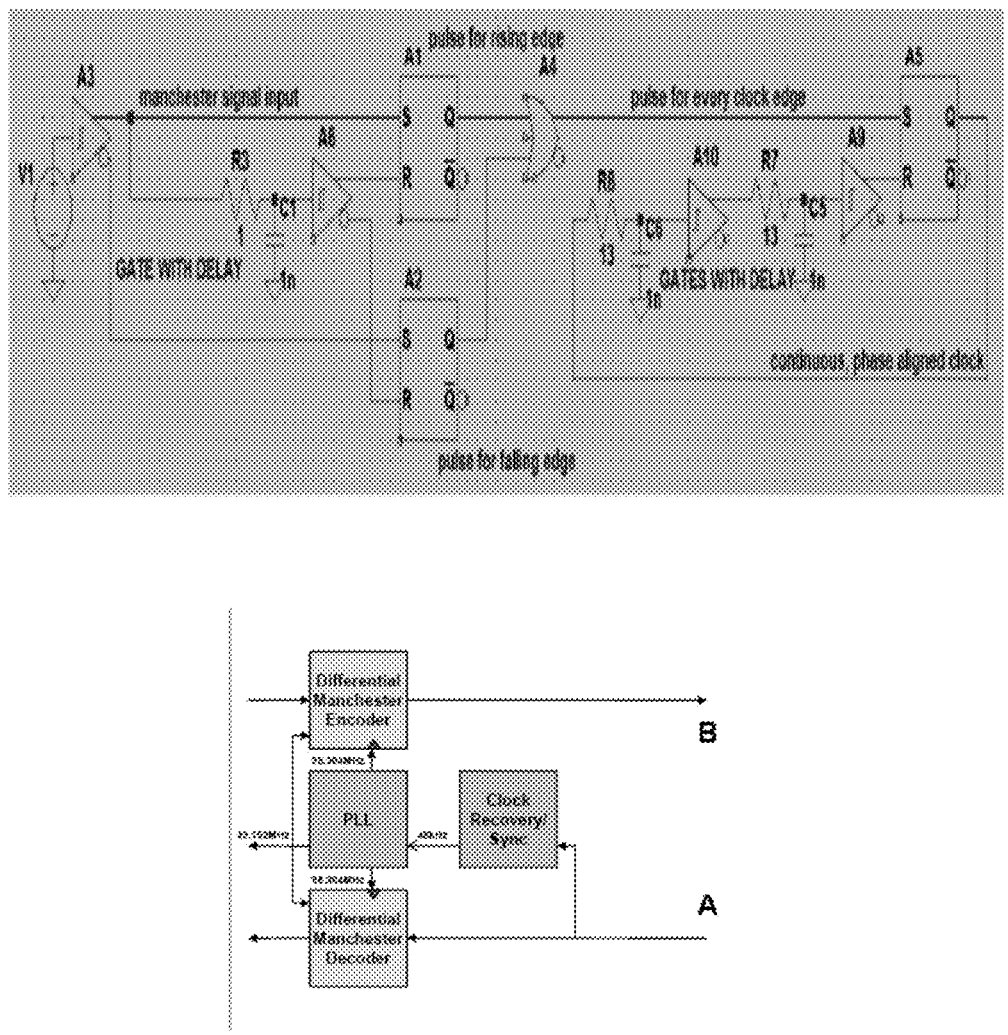
FIG. 20 schematically shows exemplary clock recovery circuitry to recover clock from a differential Manchester encoding, in accordance with an exemplary embodiment of the present invention.

FIG. 20 schematically shows exemplary clock recovery circuitry to recover clock from a differential Manchester encoding, in accordance with an exemplary embodiment of the present invention. In such a clock recovery circuit, the delay could be implemented using a series of gates. Other clock recovery circuits can of course be used in various alternative embodiments. The recovered clock may be fed into a phase-locked loop PLL circuit to generate clocks for the transmitter and receiver circuits (in this example, differential Manchester encoder/decoder).

5. Filtering Common Mode Variations

In various alternative embodiments, one or more common mode chokes may be used at various locations in the circuitry in order to filter out common mode variations that may be caused by EMI events and may accumulate over different nodes if left unchecked.

Figure 21:
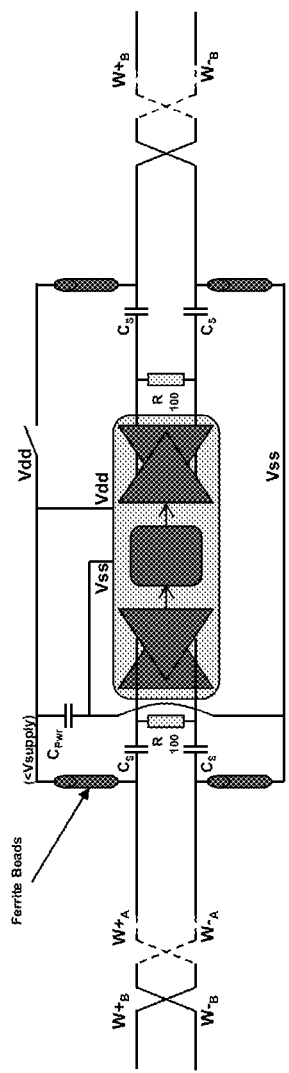
FIG. 21 is a schematic diagram of a slave device substantially as shown in FIG. 19, having no common mode chokes.

FIG. 21 is a schematic diagram of a slave device substantially as shown in FIG. 19, having no common mode chokes. In this circuit, ferrite beads are used to filter out differential AC signal content for the DC power supply. This circuit does not filter common mode variations caused by EMI events. It uses ferrite beads with low DC resistance. Common mode variations may accumulate over different nodes. Because of the potential for common mode voltage on the signal line, this circuit preferably uses a high input/output range transceiver.

FIGS. 22A and 22B are schematic diagrams of a slave device in which common mode chokes are used at both bus ports to reduce common mode variations in the signal chain. In FIG. 22A, the common mode chokes are positioned on the line side of the AC coupling capacitors. In FIG. 22B, the common mode chokes are positioned on the device side of the AC coupling capacitors, which helps to avoid DC saturation of the common mode chokes. In these circuits, ferrite beads are used to filter out differential AC signal content for the DC power supply. These circuits provide limited common mode filtering for lower EMI frequencies below the signal frequency and preferably use common mode chokes with low resistance at the signal frequencies.

FIGS. 23A and 23B are schematic diagrams of a slave device in which common mode chokes are used at both bus ports to reduce common mode variations in the signal chain and also a common mode choke is used on the power supply to filter out differential and common mode voltage variations. In FIG. 23A, the common mode chokes for the bus ports are positioned on the line side of the AC coupling capacitors. In FIG. 23B, the common mode chokes for the bus ports are positioned on the device side of the AC coupling capacitors, which helps to avoid DC saturation of the common mode chokes. In these circuits, ferrite beads are used to filter out differential AC signal content for the DC power supply. These circuits use an in-signal common mode choke with low impedance at the signal frequencies and use a common mode choke with high low-frequency impedance for the power supply. They use common mode chokes and ferrite beads with low DC resistance.

Figure 24A:
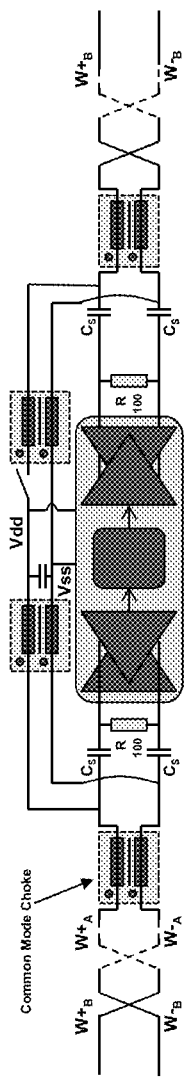
FIGS. 24A and 24B are schematic diagrams of a slave device in which common mode chokes are used at both bus ports to reduce common mode variations in both the signal chain and the power supply and also common mode chokes are used on the power supply to filter out differential and common mode voltage variations.
Figure 24B:
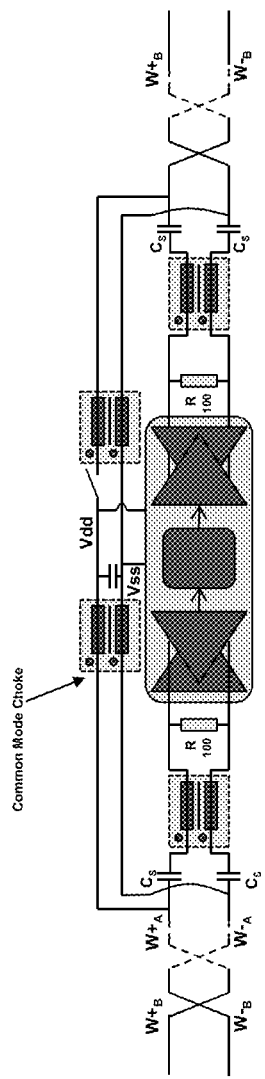

FIGS. 24A and 24B are schematic diagrams of a slave device in which common mode chokes are used at both bus ports to reduce common mode variations in both the signal chain and the power supply and also common mode chokes are used on the power supply to filter out differential and common mode voltage variations. In FIG. 24A, the common mode chokes for the bus ports are positioned on the line side of the AC coupling capacitors. In FIG. 24B, the common mode chokes for the bus ports are positioned on the device side of the AC coupling capacitors, which helps to avoid DC saturation of the common mode chokes. In these circuits, ferrite beads are used to filter out differential AC signal content for the DC power supply. These circuits use an in-signal common mode choke with low impedance at the signal frequencies and use a common mode choke with high low-frequency impedance for the power supply. They use common mode chokes and ferrite beads with very low DC resistance.

Figure 25:
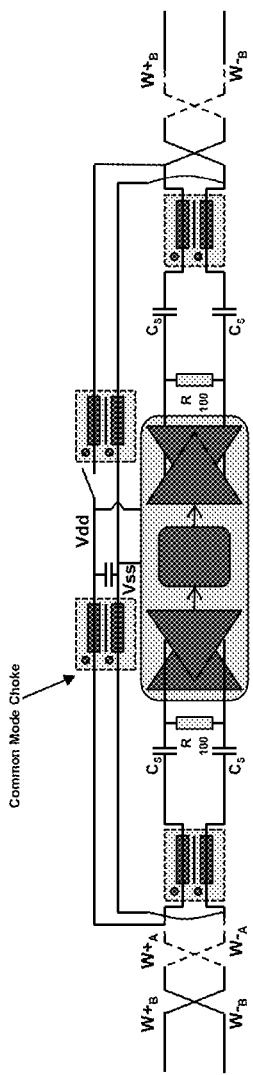
FIG. 25 is a schematic diagram of a slave device in which common mode chokes are used at both bus ports to reduce common mode variations in the signal chain and also optimized common mode chokes with high low-frequency impedance and high high-frequency impedance are used on the power supply to filter out differential and common mode voltage variations.

FIG. 25 is a schematic diagram of a slave device in which common mode chokes are used at both bus ports to reduce common mode variations in the signal chain and also optimized common mode chokes with high low-frequency impedance and high high-frequency impedance are used on the power supply to filter out differential and common mode voltage variations. In this circuit, the common mode choke for the power supply is optimized to reduce common mode variations at both high and low frequencies.

Figure 26:
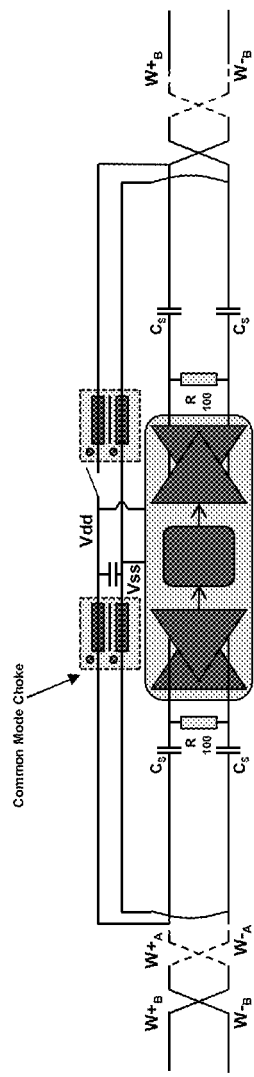
FIG. 26 is a schematic diagram of a slave device in which optimized common mode chokes with high low-frequency impedance and high high-frequency impedance are used on the power supply to filter out differential and common mode voltage variations.

FIG. 26 is a schematic diagram of a slave device in which optimized common mode chokes with high low-frequency impedance and high high-frequency impedance are used on the power supply to filter out differential and common mode voltage variations. It is assumed here that the differential transceivers provide sufficient common mode suppression over a wide common mode voltage range. In this circuit, the transceiver is preferably a high input/output range transceiver, and the common mode choke for the power supply has high low-frequency impedance and high high-frequency impedance.

Figure 27A:
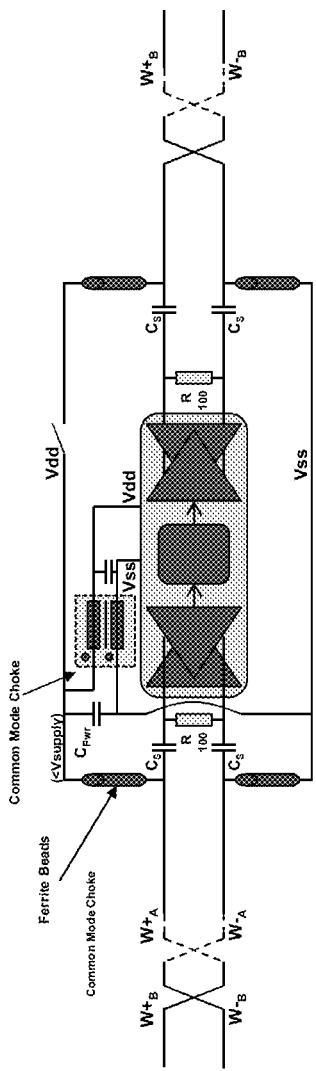
FIG. 27A is a schematic diagram of a slave device in which ferrite beads are used to filter out differential AC signal content for the DC power supply and an optimized common mode choke is used in the power supply to reduce power supply common mode variations.

FIG. 27A is a schematic diagram of a slave device in which ferrite beads are used to filter out differential AC signal content for the DC power supply and an optimized common mode choke is used in the power supply to reduce power supply common mode variations. It is assumed here that the differential transceivers provide sufficient common mode suppression over a wide common mode voltage range.

Figure 27B:
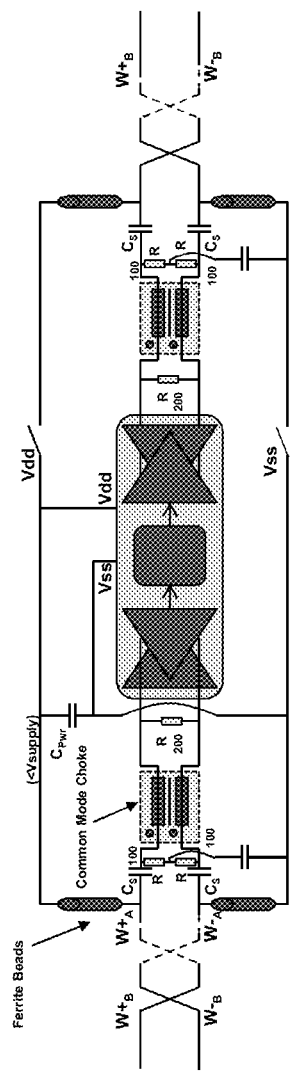
FIG. 27B is a schematic diagram of a slave device using two common mode chokes in the signal chain on the device side of the AC coupling capacitors, configured with line termination in accordance with one specific exemplary embodiment of the present invention.

FIG. 27B is a schematic diagram of a slave device using two common mode chokes in the signal chain on the device side of the AC coupling capacitors, configured with line termination in accordance with one specific exemplary embodiment of the present invention.

6. A Prototype Slave Device Transceiver

Figure 28:
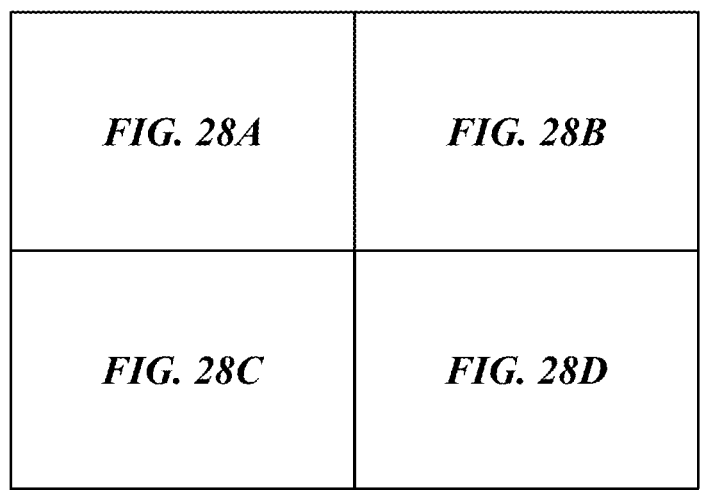
FIG. 28 including sub-part
Figure 28A:
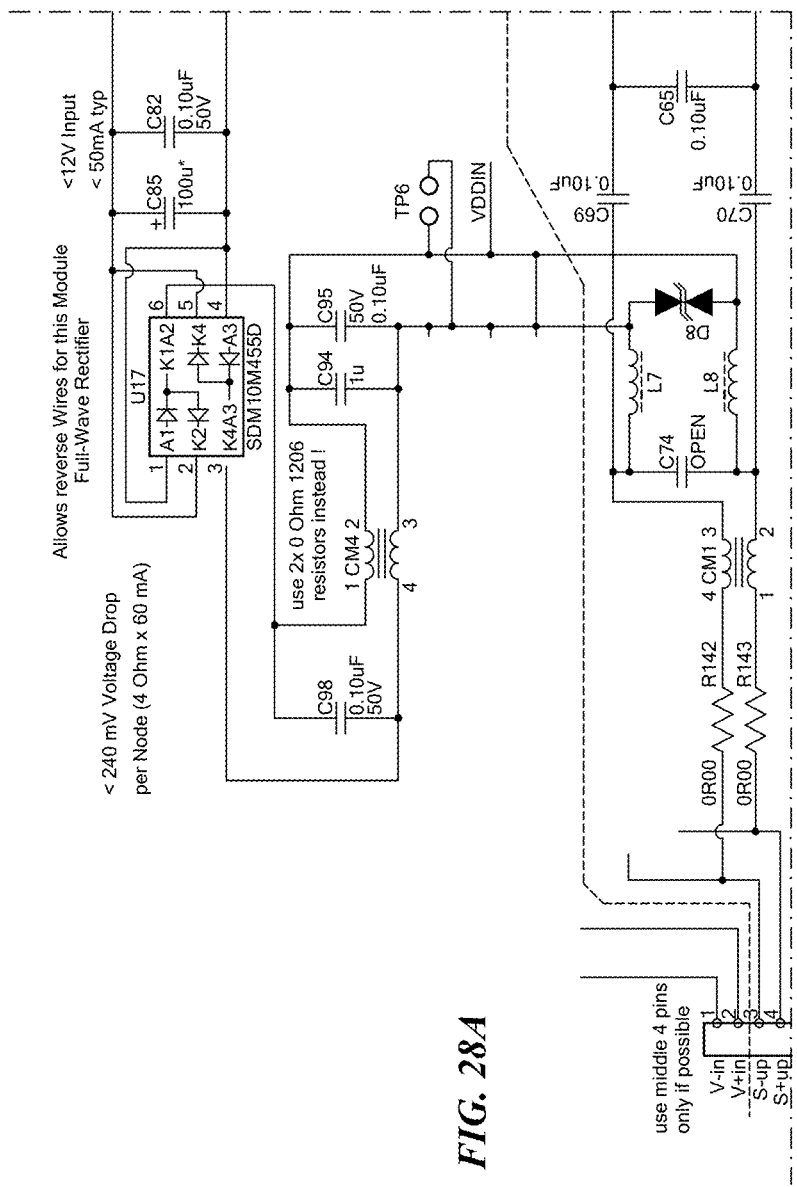
FIGS. 28A-28D is a schematic circuit diagram of a prototype slave device transceiver based on the configuration shown in FIG. 22A, in accordance with an exemplary embodiment of the present invention.
Figure 28B:
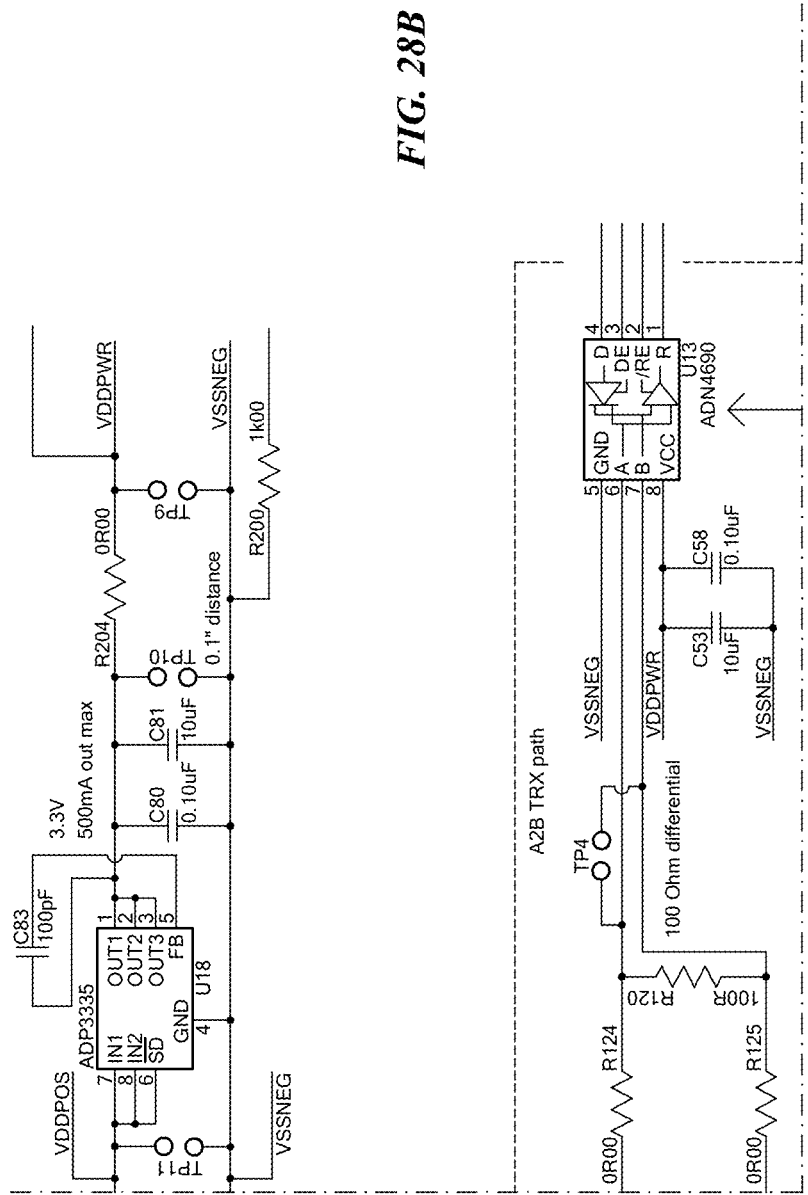
Figure 28C:
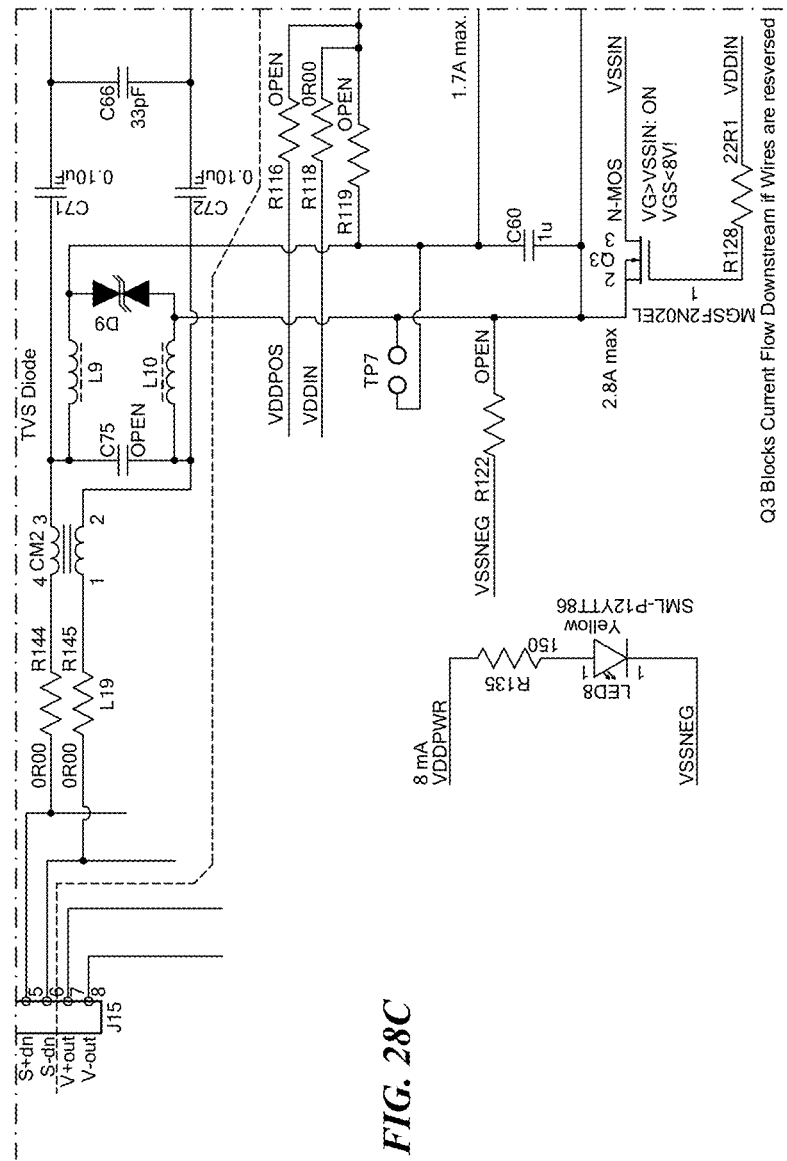
Figure 28D:
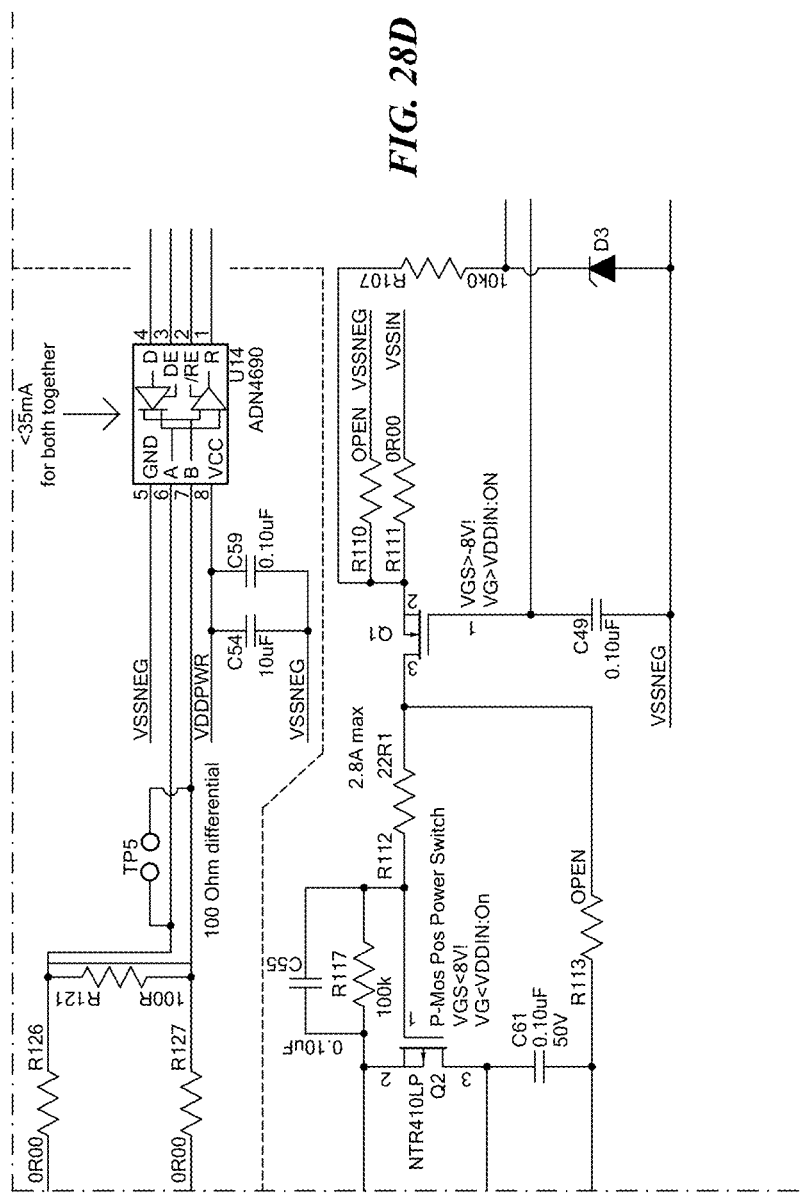
Figure 29:
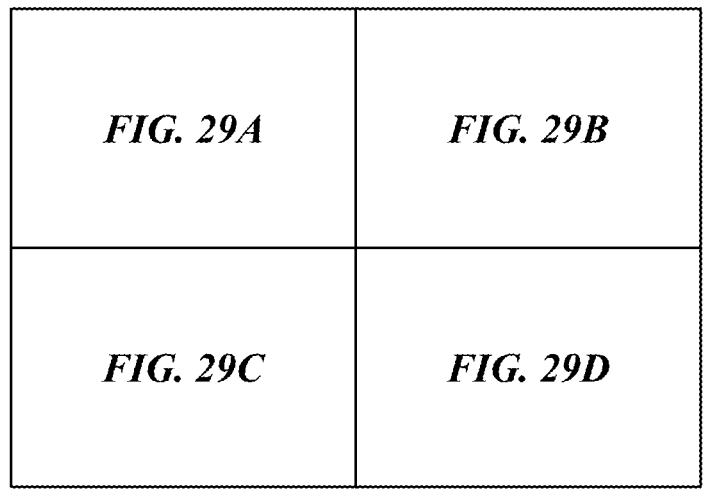
FIG. 29 including sub-part
Figure 29A:
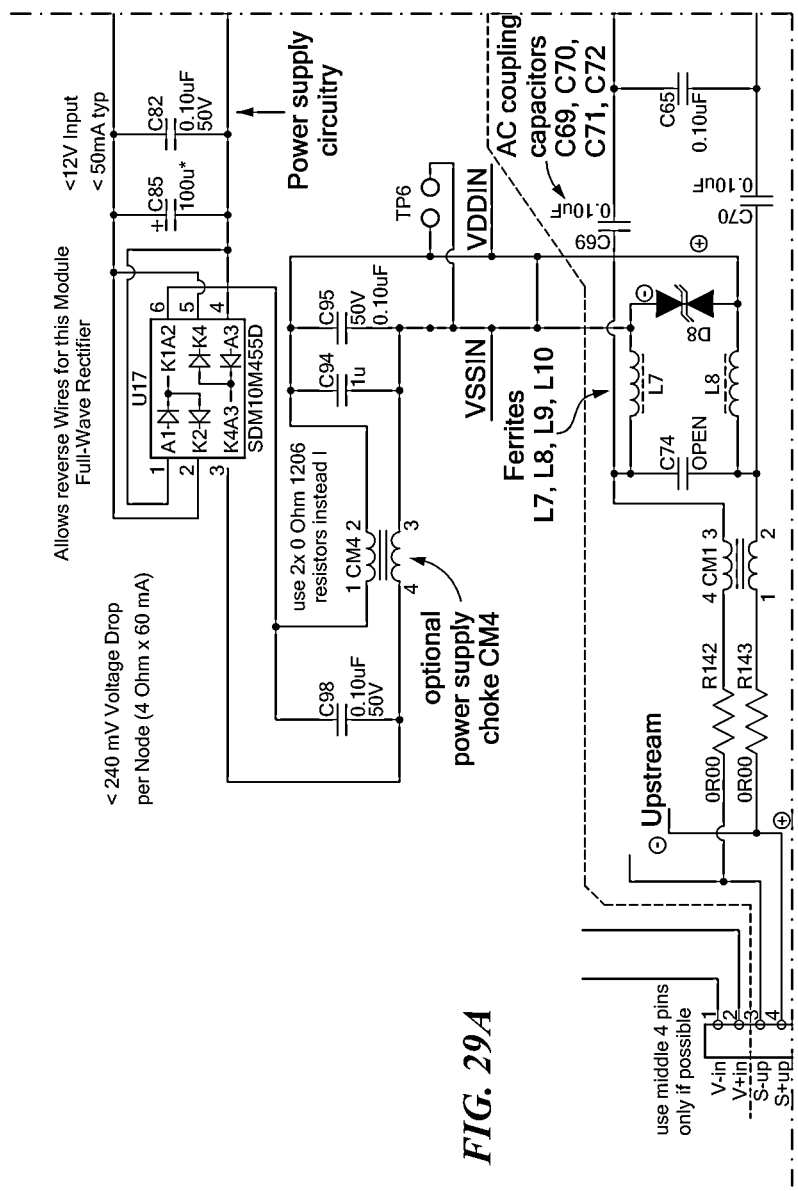
FIGS. 29A-29D is a marked-up version of FIG. 28 highlighting relevant components and circuits.
Figure 29B:
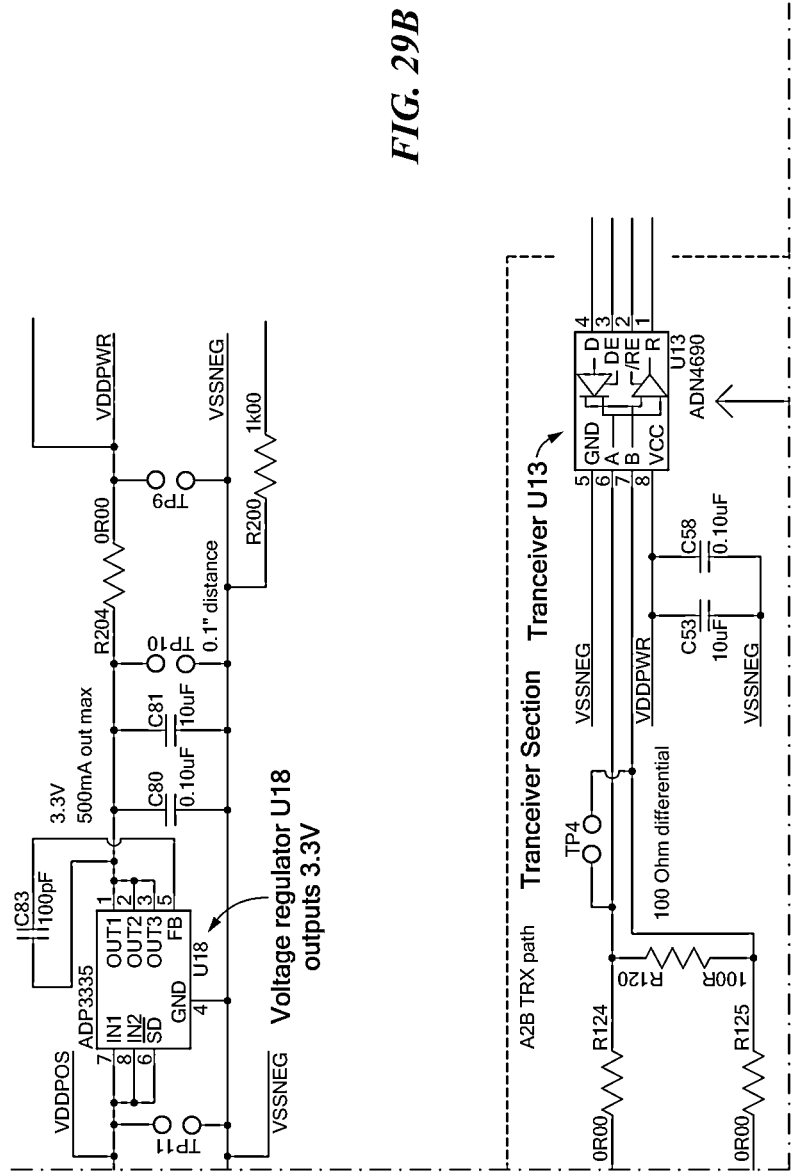
Figure 29C:
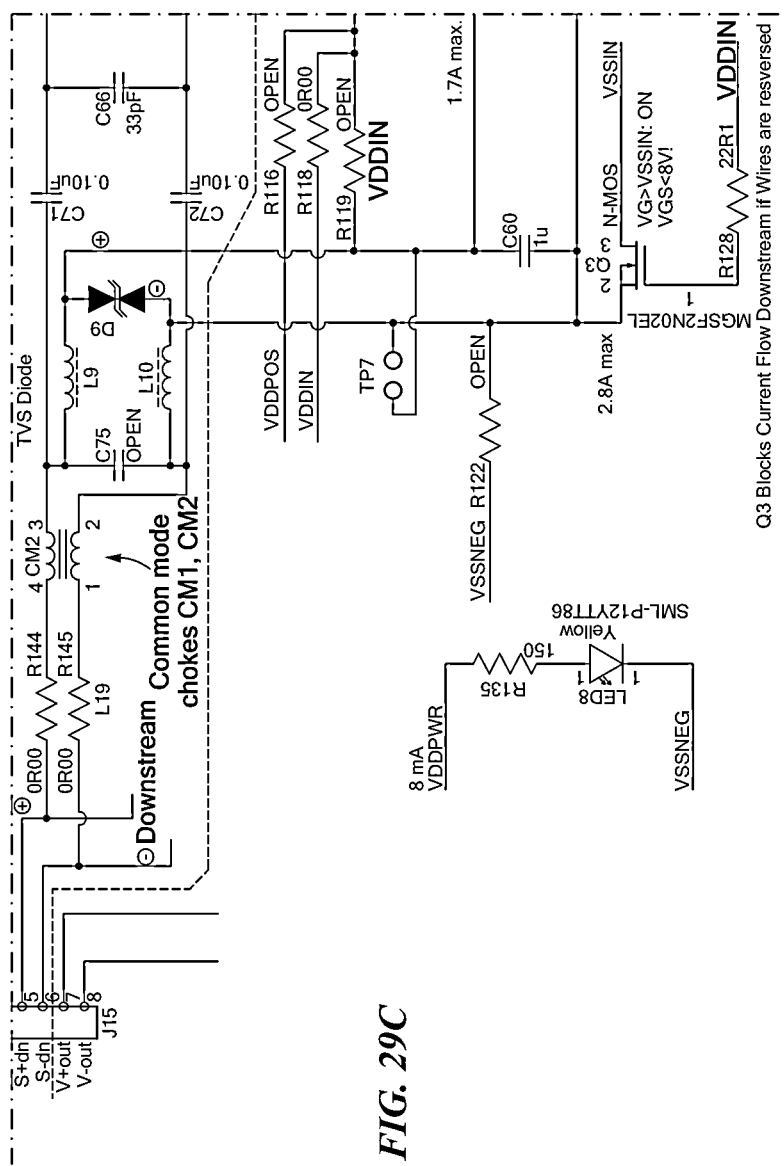
Figure 29D:
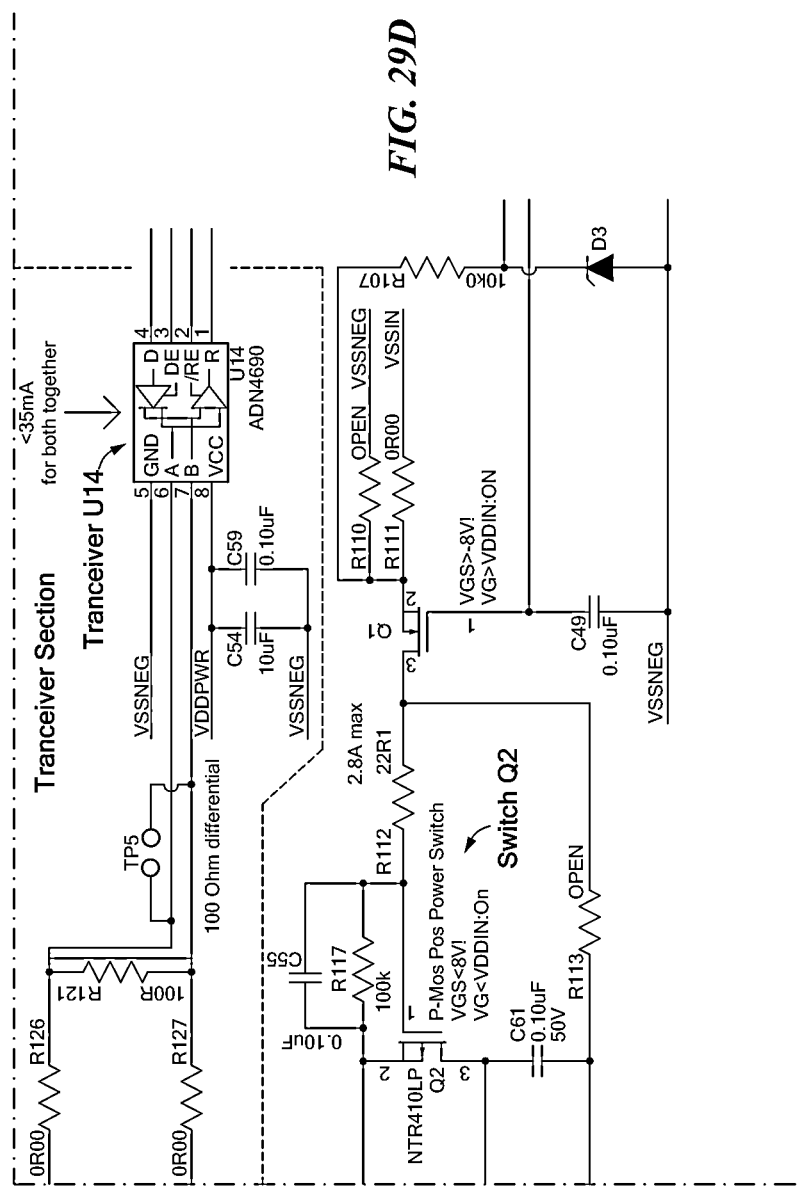

FIG. 28 is a schematic circuit diagram of a prototype slave device transceiver based on the configuration shown in FIG. 22A, in accordance with an exemplary embodiment of the present invention. FIG. 29 is a marked-up version of FIG. 28 highlighting relevant components and circuits. The following are some of the relevant components and circuits:

The A2B transceiver path is outlined with a dashed line;

S−up and S+up are the connections to the upstream link (i.e., toward the master);

S+dn and S−dn are the connections to the downstream link (i.e., toward the next slave);

CM1 and CM2 are common mode chokes for the upstream link and the downstream link, respectively (R142, R143, R144, and R145 are zero ohm resistors);

C69/C70 and C71/C72 are the AC coupling capacitors for the upstream link and the downstream link, respectively;

CM4 is an optional common mode choke (one exemplary embodiment uses two zero ohm resistors in place of CM4);

L7, L8, L9, and L10 are ferrites;

R124, R125, R126, R127, R142, R143, R144, and R145 are zero ohm resistors;

U17 is a full-wave rectifier (in this example, a SDM10M45SD Schottky Barrier Diode sold by Diodes Incorporated) that allows the device to be connected to the bus in either polarity;

U18 is a voltage regulator (in this example, an ADP 3335 voltage regulator sold by Analog Device, Inc.) that converts the line voltage (which can be up to 8V in an exemplary embodiment) to 3.3V;

C65 and C66 are filter capacitors that are not particularly relevant to the operation of the device and may be omitted;

Q2 is a switch that is used to control whether power is supplied to the downstream bus segment; and U13 and U14 are MLVDS transceiver chips for receiving and transmitting differential MLVDS signals upstream and downstream.

The transceiver-side connections of upstream common mode choke CM1 are coupled to the transceiver section through AC coupling capacitors C69 and C70 and are coupled to the power supply circuitry through ferrites L7 and L8 to provide the positive and negative line voltage signals VDDIN and VSSIN, respectively. These line voltage signals are passed to the power supply circuitry and also are used to bias the downstream bus segment.

Similarly, the transceiver-side connections of downstream common mode choke CM2 are coupled to the transceiver section through the AC coupling capacitors C71 and C72 and are coupled to the line voltage signals VDDIN (via switch Q2) and VSSIN to selectively provide DC bias for the downstream bus segment. It should be noted that the slave devices may be configured to default to not providing power to the downstream bus segment, which, among other things, allows the master device to contact and configure the slaves in a sequential manner, as will be discussed more fully below. Also, the ability to selectively switch off power to the downstream bus segment allows, among other things, the master to shut down the slave devices in an orderly fashion if so desired and also allows for the master and/or slave device to isolate certain types of faults, as will be discussed more fully below.

In the transceiver section, the receive side is essentially just a 100 ohm termination as known in the art, while the transmit side is driven as a current that is converted to a voltage with a series resistor as known in the art.

Not shown in these circuit diagrams are components for switching between upstream and downstream, encoding/decoding signals and implementing the data link layer and higher layer functions (which, in a prototype system, may be modeled using an appropriately programmed processor or FPGA) and recovering timing from the bus, which can be accomplished using circuitry of the type shown in FIG. 20.

In certain exemplary embodiments, the transceiver may be a multipoint LVDS transceiver such as Part No. ADN4690E sold by Analog Devices, Inc. of Norwood, Mass.

7. Bus Diagnostics

In many applications where such a bus may be used, it will be necessary or desirable to be able to detect, locate, and isolate certain types of faults that may occur at various points along the bus.

Figure 30:
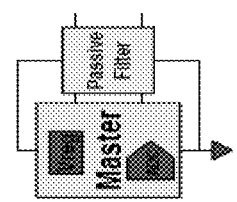
FIG. 30 schematically shows an open wire situation at the master device.

FIG. 30 schematically shows an open wire situation at the master device, which may be detected by the master device, for example, based on the lack of load currents or a failure to establish communication with the first slave device.

Figure 31:
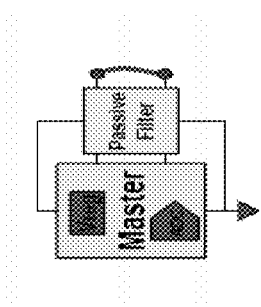
FIG. 31 schematically shows a short circuit situation at the master.

FIG. 31 schematically shows a short circuit situation at the master, which may be detected by the master device, for example, based on an initial over-current situation, a differential DC voltage near zero, or failure to establish communication with the first slave device. Over-current protection is preferably provided on the voltage regulator (Vreg).

Figure 32:
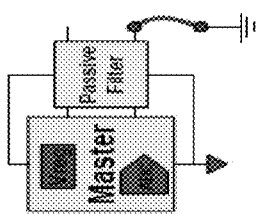
FIG. 32 schematically shows a short of the negative wire to ground.

FIG. 32 schematically shows a short of the negative wire to ground, which may be detected by the master device based on a voltage drop on the negative wire or, if there is no voltage drop, based on the lack of load currents or a failure to establish communication with the first slave device as in FIG. 30.

Figure 33:
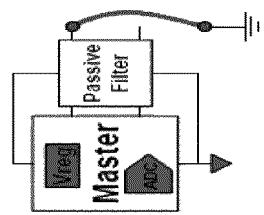
FIG. 33 schematically shows a short of the positive wire to ground.

FIG. 33 schematically shows a short of the positive wire to ground, which may be detected by the master device, for example, based on a voltage drop on the positive wire or failure to establish communication with the first slave device. Over-current protection is preferably provided on the voltage regulator (Vreg).

Figure 34:
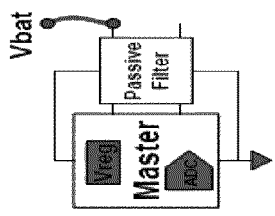
FIG. 34 schematically shows a short of the positive wire to a high-voltage source such as a car battery.

FIG. 34 schematically shows a short of the positive wire to a high-voltage source such as a car battery, which may be detected by the master device, for example, based on a reverse current or voltage rise or failure to establish communication with the first slave device. Reverse current protection is preferably provided on the voltage regulator (Vreg), and over-voltage protection is preferably provided on Vreg and on the transceiver.

Figure 35:
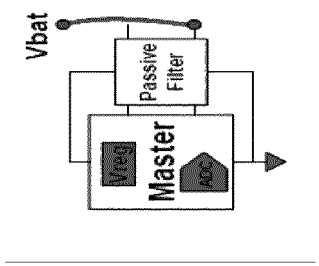
FIG. 35 schematically shows a short of the negative wire to a high-voltage source such as a car battery.

FIG. 35 schematically shows a short of the negative wire to a high-voltage source such as a car battery, which may be detected by the master device, for example, based on a short current or voltage rise or tripping of a fuse or circuit breaker or failure to establish communication with the first slave device. For robustness in the event of certain failure conditions discussed above, Vreg should be protected against over-voltage, over-current, and reverse-current events. Similarly, the transceiver circuits should be protected against over-voltage events.

Other types of fault conditions may be detected in various alternative embodiments. For example, reversal of wires can be detected in a diagnostics mode.

FIG. 36 schematically shows an open wire situation between two slave devices, which may be detected by the master device, for example, based on the inability to communicate with slaves downstream from the break. The master device can determine the last working slave device on the bus and infer that the failure location is between the last working slave and the next slave. A switch at the last working slave may be opened in order to prevent power from being passed downstream. Communication typically remains for all slave devices upstream of the failure, but communication typically ceases for all slave devices downstream of the failure.

FIG. 37 schematically shows a short circuit situation between two slave devices, which may be detected, for example, based on an initial over-current situation or a differential DC voltage near zero, or, similar to the situation in FIG. 36, based on the inability to communicate with slaves downstream from the break. The master device can determine the last working slave device on the bus and infer that the failure location is between the last working slave and the next slave. A switch at the last working slave may be opened in order to prevent power from being passed downstream. Communication typically remains for all slave devices upstream of the failure, but communication typically ceases for all slave devices downstream of the failure.

FIG. 38 schematically shows a situation in which the positive wire between two slave devices is shorted to ground, which may be detected, for example, based on an initial over-current situation or voltage drop on the positive wire at the master, or, similar to the situation in FIG. 36, based on the inability to communicate with slaves downstream from the break. The master device can determine the last working slave device on the bus and infer that the failure location is between the last working slave and the next slave. A switch at the last working slave may be opened in order to prevent power from being passed downstream. Communication typically remains for all slave devices upstream of the failure, but communication typically ceases for all slave devices downstream of the failure.

FIG. 39 schematically shows a situation in which the negative wire between two slave devices is shorted to ground, which may be detected, for example, based on the inability to communicate with slaves downstream from the break. The master device can determine the last working slave device on the bus and infer that the failure location is between the last working slave and the next slave. A switch at the last working slave may be opened in order to prevent power from being passed downstream. Communication typically remains for all slave devices upstream of the failure if signal ground is similar to chassis ground, but communication typically ceases for all slave devices downstream of the failure.

FIG. 40 schematically shows a situation in which the positive wire between two slave devices is shorted to a high-voltage source such as a car battery, which may be detected by the master device, for example, based on a reverse current or voltage rise on the positive wire but also by failure to establish communication with the later slave device. Reverse current protection is preferably provided on the voltage regulator (Vreg), and over-voltage protection is preferably provided on the switch, Vreg, and transceiver.

FIG. 41 schematically shows a situation in which the negative wire between two slave devices is shorted to a high-voltage source such as a car battery, which may be detected by the master device, for example, based on tripping of a fuse or circuit breaker but also by failure to establish communication with the later slave device.

Figure 42:
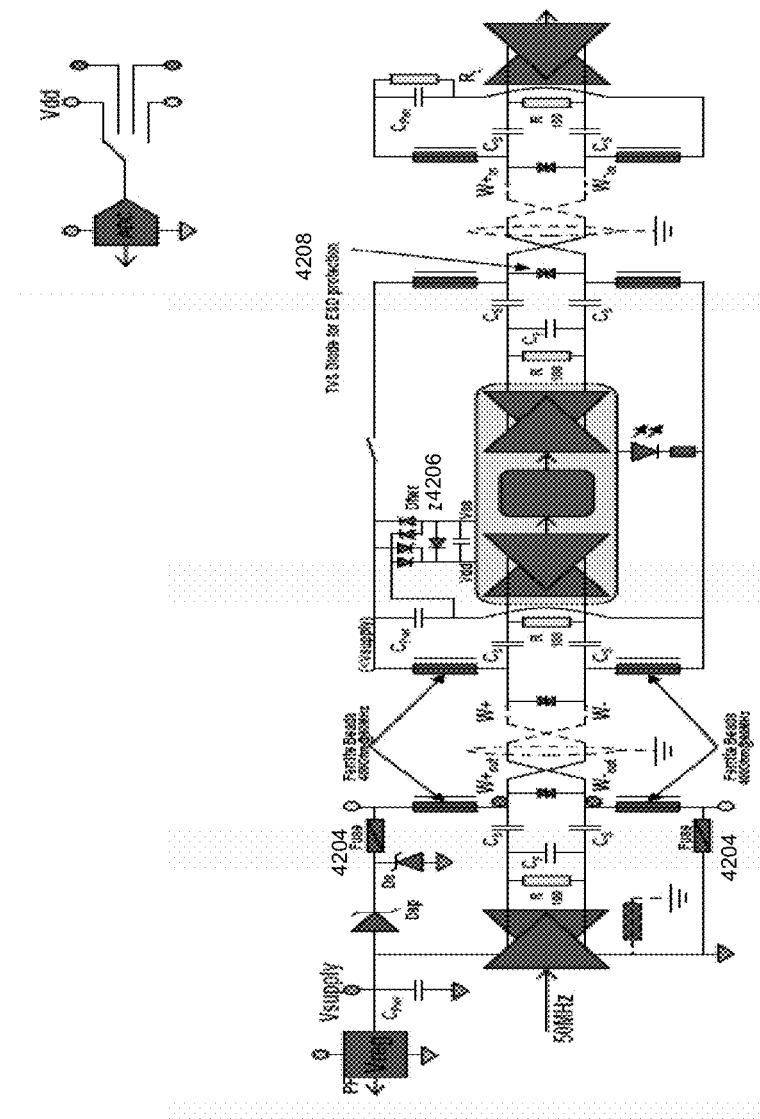
FIG. 42 is a schematic block diagram the bi-directional point-to-point serial bus and devices of FIG. 18 with additional circuitry to support various bus diagnostics and protection, in accordance with exemplary embodiments of the present invention.

FIG. 42 is a schematic block diagram the bi-directional point-to-point serial bus and devices of FIG. 18 with additional circuitry to support various bus diagnostics and protection, in accordance with exemplary embodiments of the present invention. Among other things, the additional circuitry includes may include fuses 4204 at the master node, a full-wave rectifier 4206 at the slave node to allow for operation even if the wires are reversed, and/or diodes 4208 at the master and/or slave nodes for ESD protection.

8. Link Layer Protocols

It should be clear that the bi-directional point-to-point bus can be used generically and is not limited to any particular link layer protocol used to discover, activate, synchronize, and exchange data with slave devices.

An exemplary link layer protocol specifically designed for such a bi-directional point-to-point bus is based on the principle that, periodically, the master device sends a synchronization control frame (SCF) downstream, optionally along with data intended for one or more of the slave devices. In one specific exemplary embodiment, the synchronization control frame is transmitted every 1024 bits (representing a superframe) at a frequency of 48 KHz, resulting in an effective bit rate on the bus of 49.152 Mbps (in this specific exemplary embodiment, other rates are supported, including, for example, 44.1 KHz). Among other things, the synchronization control frame allows the slave devices to identify the beginning of each superframe and also, in combination with the physical layer encoding/signaling, allows each slave device to derive its internal operational clock from the bus.

As will be described below, the synchronization control frame includes a preamble field for signaling the start of synchronization as well as fields that allow for various addressing modes (e.g., normal, broadcast, discovery), configuration information (e.g., writing to slave device registers), conveyance of I2C information, remote control of certain general-purpose input/output (GPIO) pins at the slave devices, and other services. A portion of the synchronization control frame following the preamble typically is scrambled in order to reduce the likelihood that information in the frame will be mistaken for a new synchronization pattern. The synchronization control frame gets passed from slave to slave (optionally along with other data, which typically comes from the master device but additionally or alternatively could come from one or more upstream slaves or from the slave itself) until it reaches the last slave, which has been configured by the master device as the last slave or has self-identified itself as the last slave. Upon receiving the synchronization control frame, the last slave device transmits a synchronization status frame followed by any data that it is permitted to transmit (e.g., a 24-bit audio sample in a designated time slot). The synchronization status frame is passed upstream from slave to slave (optionally along with data from downstream slaves), and based on the synchronization status frame, each slave is able to identify a time slot, if any, in which it is permitted to transmit.

Figure 62:
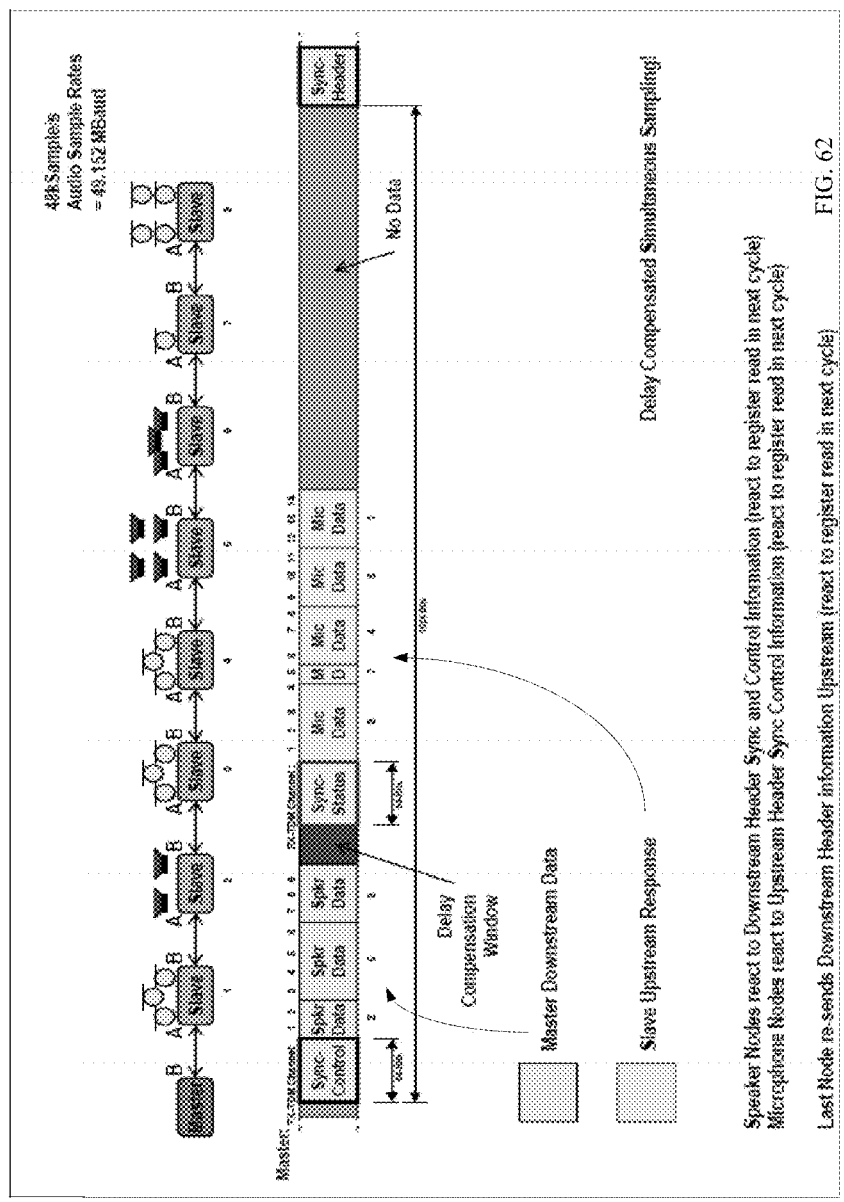
FIG. 62 schematically shows signaling and timing considerations for bi-directional communication, in accordance with an exemplary embodiment of the present invention.

FIG. 62 schematically shows signaling and timing considerations for bi-directional communication, in accordance with an exemplary embodiment of the present invention. In this example, the master device transmits a synchronization control frame (block leveled Sync-Ctrl) followed by data for specific slave devices (blocks labeled Spkr Data). Each successive slave device forwards the synchronization control frame and also forwards at least any data destined for downstream slave devices (a particular slave device may forward all data or may remove data destined for it). When the last slave receives the synchronization control frame, it transmits the synchronization status frame (block labeled Sync-Status) optionally followed by any data that it is permitted to transmit. Each successive slave device forwards the synchronization status frame along with any data from downstream slaves and optionally inserts data of its own (blocks labeled Mic Data or MD). In this example, the master sends data to slaves 2, 5, and 6 (which are depicted here as active speakers) and receives data from slaves 8, 7, 4, 3, and 1 (which are depicted here as microphone arrays).

It should be noted that the slave devices depicted in FIG. 62 have various numbers of sensor/actuator elements and so different amounts of data may be sent to, or received from, the various slave devices. Specifically, slave 2 has two elements, slave 5 has four elements, and slave 6 has three elements, so the data transmitted by the master includes two time slots for slave 2, four time slots for slave 5, and three time slots for slave 6. Similarly, slave 1 has three elements, slave 3 has three elements, slave 4 has three elements, slave 7 has one element, and slave 8 has four elements, so the data transmitted upstream by those slave devices includes the corresponding number of time slots. It should be noted that there does not have to be a one-to-one correlation between elements and time slots. For example, a microphone array having three microphones may include a digital signal processor that combines signals from the three microphones (and possibly also information received from the master or from other slave devices) to produce a single data sample, which, depending on the type of processing, could correspond to a single time slot or multiple time slots.

Figure 63:
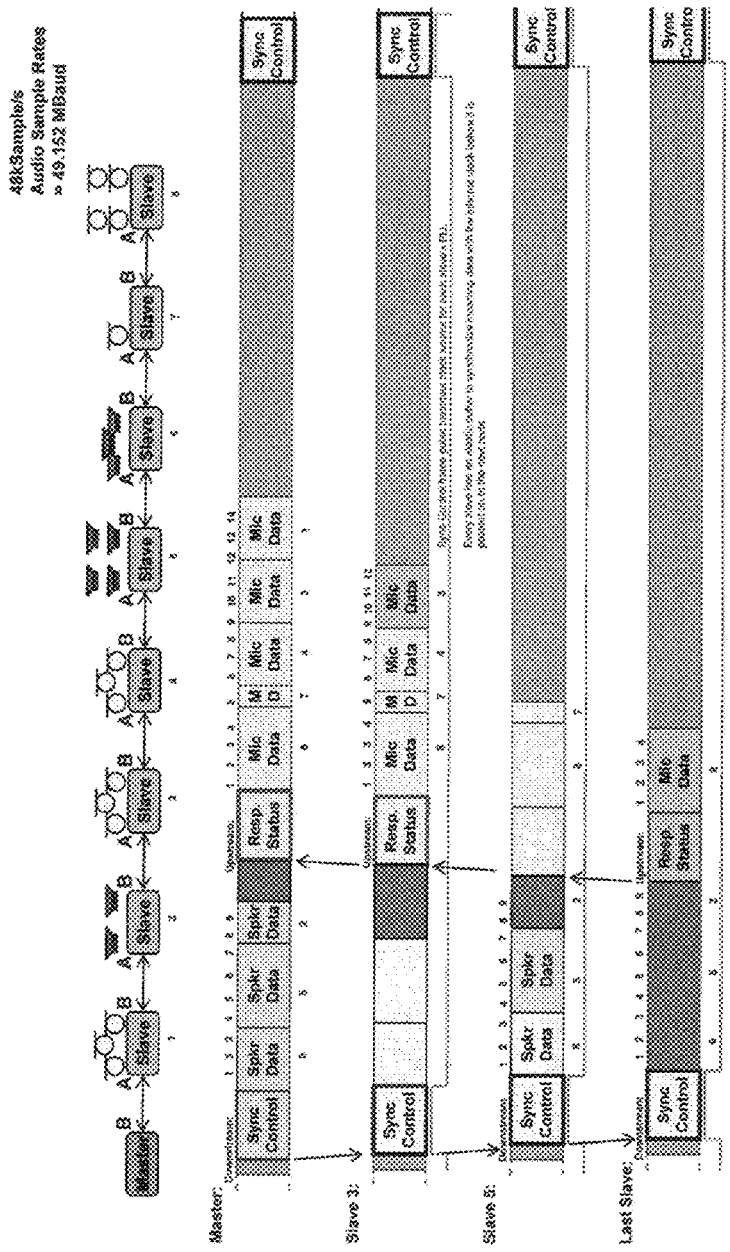
FIG. 63 schematically demonstrates the concept of dynamically removing data from the downstream transmission and inserting data into the upstream transmission, in accordance with an exemplary embodiment of the present invention.

FIG. 63 schematically demonstrates the concept of dynamically removing data from the downstream transmission and inserting data into the upstream transmission, in accordance with an exemplary embodiment of the present invention. Here, as in FIG. 62, the master device transmits a synchronization control frame (labeled Sync Control) followed by data for slave devices 2, 5, and 6 (labeled Spkr Data), but note here that the data is sent in reverse order, i.e., data for slave 6 followed by data for slave 5 followed by data for slave 2 (see the row labeled "Master"). When slave 2 receives this transmission, it removes its own data and forwards to slave 3 only the synchronization control frame followed by the data for slaves 6 and 5 (see the row labeled "Slave 3"). Slaves 3 and 4 forward the information unchanged, such that the information forwarded by slave 2 is received by slave 5 (see the row labeled "Slave 5"). Slave 5 removes its own data and forwards to slave 6 only the synchronization control frame followed by the data for slave 6, and, similarly, slave 6 removes its own data and forwards to slave 7 only the synchronization control frame. Slave 7 forwards the synchronization control frame to slave 8 (see the row labeled "Last Slave").

At this point, slave 8 transmits to slave 7 the status frame (labeled Resp Status) followed by its data (see the row labeled "Last Slave"). Slave 7 forwards to slave 6 the status frame along with the data from slave 8 and its own data, and slave 6 in turn forwards to slave 5 the status frame along with the data from slaves 8 and 7 (see the row labeled "Slave 5"). Slave 5 has no data to add, so it simply forwards the information to slave 4, which forwards the information along with its own data to slave 3, which in turn forwards the information along with its own data to slave 2 (see the row labeled "Slave 3"). Slave 2 has no information to add, so it forwards the information to slave 1, which forwards the information along with its own data. As a result, the master receives the status frame followed by the data from slaves 8, 7, 4, 3, and 1 (see the row labeled "Master").

Figure 64:
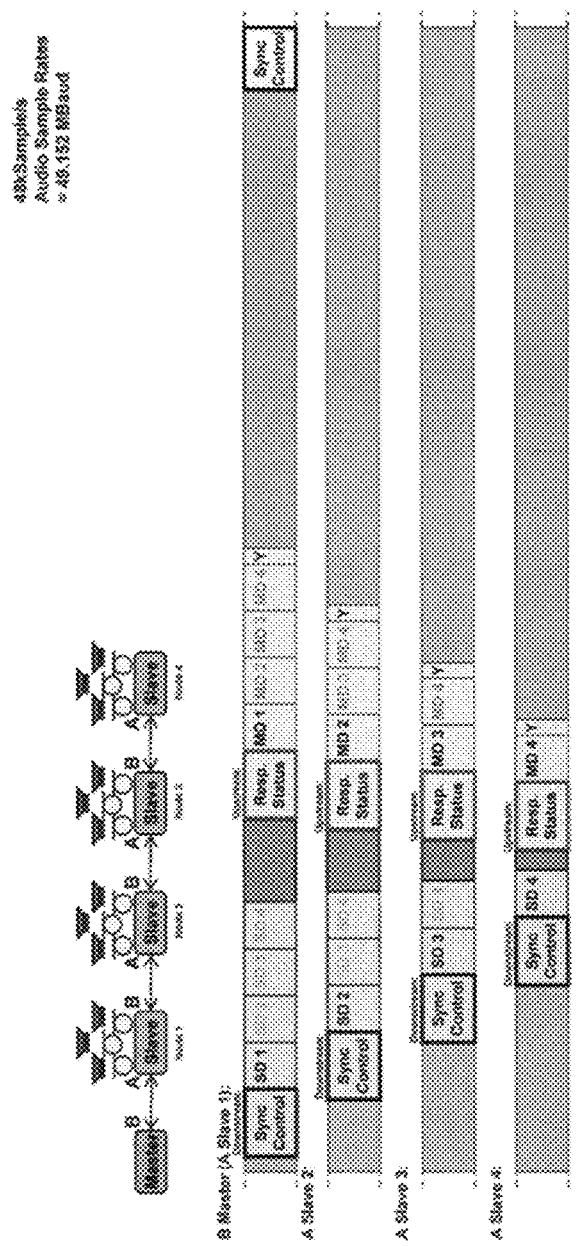
FIG. 64 schematically shows another example of dynamically removing data from the downstream transmission and inserting data into the upstream transmission as in FIG. 63.

FIG. 64 schematically shows another example of dynamically removing data from the downstream transmission and inserting data into the upstream transmission as in FIG. 63, although in this example, the slaves are both sensors and actuators such that the master sends data downstream to all of the devices and receives data back from all of the devices, and here the data is ordered based on the node number it is destined to or originates from.

Figure 65:
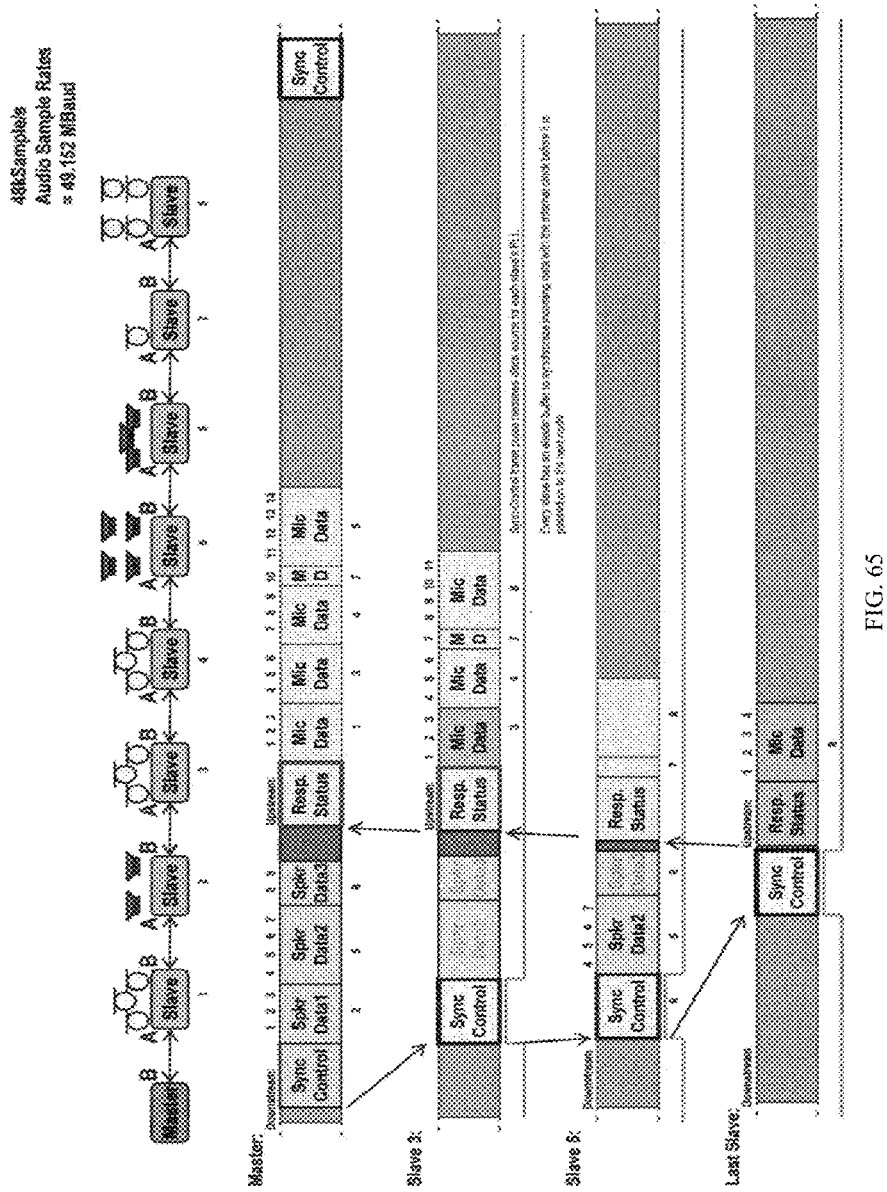
FIG. 65 schematically shows yet another example of dynamically removing data from the downstream transmission and inserting data into the upstream transmission as in FIG. 63.

FIG. 65 schematically shows yet another example of dynamically removing data from the downstream transmission and inserting data into the upstream transmission as in FIG. 63, although in this example, the data is conveyed downstream and upstream in sequential order rather than reverse order. Buffering at each slave allows for selectively adding/removing/forwarding data.

As mentioned above, each slave device may remove information from downstream or upstream transmissions and/or may add information to downstream or upstream transmissions. Thus, for example, the master device may transmit a separate sample of data to each of a number of slave devices, and each such slave device may remove its data sample and forward only data intended for downstream slaves. On the other hand, a slave device may receive information from a downstream slave and forward the information along with additional information. One advantage of transmitting as little information as needed is to reduce the amount of power consumed collectively by the bus.

The A2B system also supports broadcast transmissions (and multicast transmissions) from the master device to the slave devices, specifically through configuration of the downstream slot usage of the slave devices. Typically, each slave device will process the broadcast transmission and pass it along to the next slave device, although a particular slave device may "consume" the broadcast message, i.e., not passing the broadcast transmission along to the next slave device.

The A2B system also can be made to support addressed upstream transmissions, e.g., from a particular slave device to one or more other slave devices. Such upstream transmissions can include unicast, multicast, and/or broadcast upstream transmissions. With such upstream addressing, similar to downstream transmissions, a slave device may determine whether or not to remove data from an upstream transmission and/or whether or not to pass an upstream transmission along to the next upstream slave device based on configuration of the upstream slot usage of the slave devices. Thus, for example, data may be passed by a particular slave device to one or more other slave devices in addition to, or in lieu of, passing the data to the master device as is typically done. Such slave-slave relationships may be configured, for example, via the master device.

In essence, then, the slave devices operate somewhat as active/intelligent repeater nodes, with the ability to selectively forward, drop, and add information. The slaves generally perform such functions without necessarily decoding/examining all of the data, since each slave node knows the relevant time slot(s) within which it will receive/transmit data and hence can remove data from or add data into a time slot. Notwithstanding that the slave nodes generally do not need to decode/examine all data, the slave nodes generally re-clock the data that it transmits/forwards, which tends to make the overall system more robust.

9. Synchronization Control and Status Messages

Figure 57:
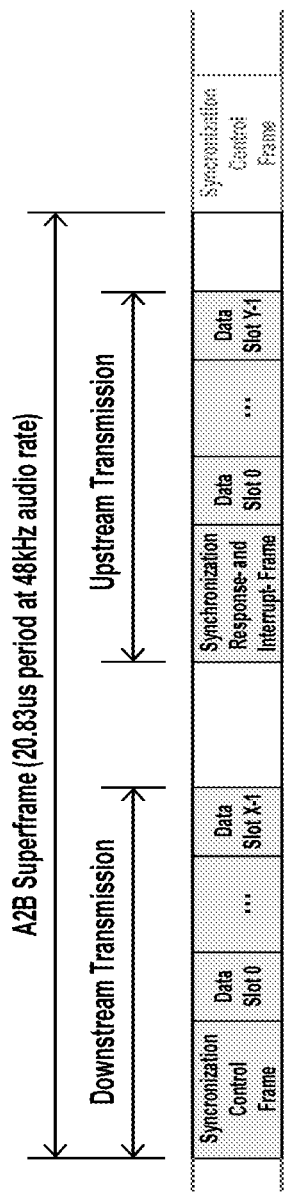
FIG. 57 schematically shows a superframe with an initial period of downstream transmission and a later period of upstream transmission, in accordance with a specific exemplary embodiment.

Communications along the A2B Bus occur in periodic superframes. In one specific exemplary embodiment for audio applications, the superframe frequency is the same as the audio sampling frequency used in the system (either 48 kHz or 44.1 kHz). Each superframe is broken up into periods of downstream transmission, upstream transmission, and no transmission (where the bus is not driven). In FIG. 57, a superframe is shown schematically with an initial period of downstream transmission and a later period of upstream transmission, separated by periods in which the bus is not driven. The downstream transmission starts with a synchronization control frame (SCF) and is followed by X data slots, where X can be zero. The upstream transmission starts with a synchronization response frame (SRF) and is followed by Y data slots, where Y can be zero. The clock used in the A2B chip is generated on chip and, in a specific exemplary embodiment, is 1024× the audio sample frequency. This means that there are 1024 bit clocks in each such superframe.

The Synchronization Control Frame (SCF), which is 64 bits in length, begins each downstream transmission. The SCF starts with a Preamble, which is used for data clock recovery and PLL synchronization. When the synchronization control frame (SCF) is retransmitted by a slave node, the Preamble will be generated by the slave node rather than being retransmitted. The SCF contains several fields which are used to control transactions over the A2B Bus.

In some situations, a different Preamble or a different SCF may be used during Standby Mode so that the slave nodes do not need to receive all 64 bits of the SCF until a transition to Normal Mode is sent.

Figure 58:
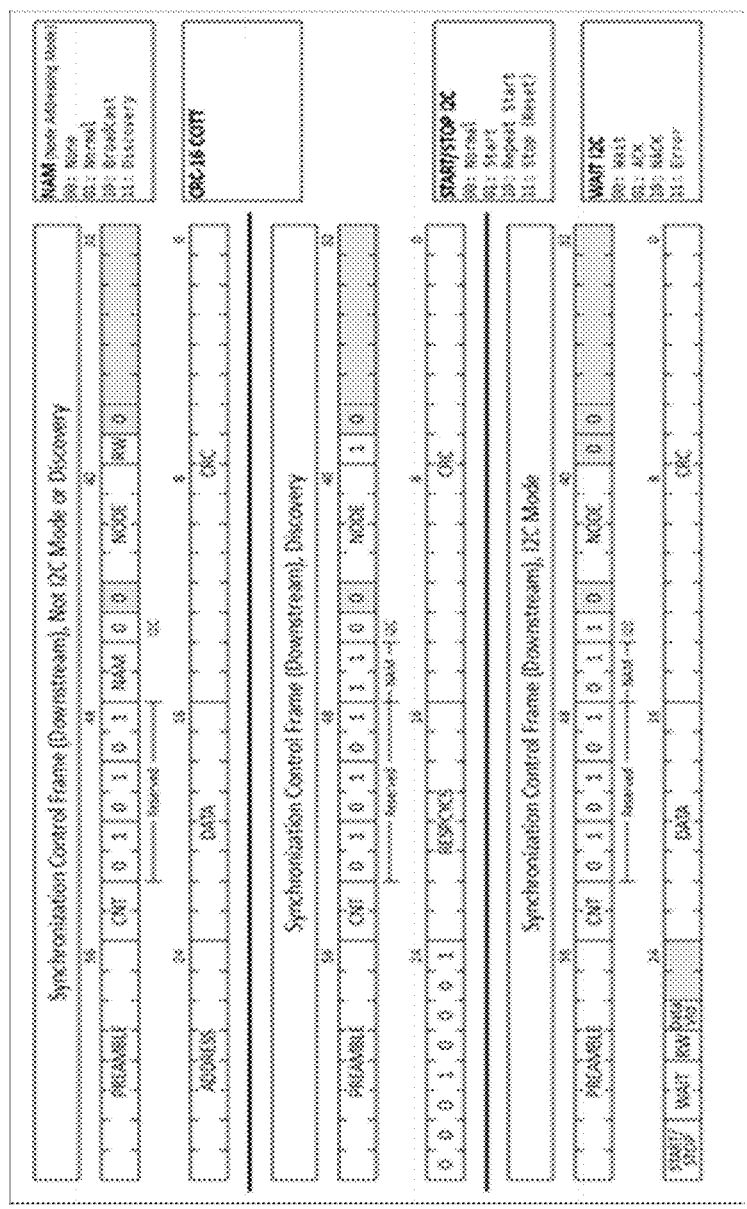
FIG. 58 shows downstream A2B synchronization control frame formats for I2C mode, discovery mode, and normal (i.e., not I2C or discover) mode, in accordance with a specific exemplary embodiment.

FIG. 58 shows downstream A2B synchronization control frame formats for I2C mode, discovery mode, and normal (i.e., not I2C or discover) mode, in accordance with one specific exemplary embodiment.

The SCF contains the following fields:

CNT (2 bits)—The CNT field is incremented (modulo 4) from the value used in the previous superframe. A slave node that receives a CNT value which is unexpected can be programmed to return an interrupt.

NAM (2 bits)—The NAM (Node Addressing Mode) field is used to control access to slave node registers over the A2B Bus. Normal mode provides for reads and writes of slave node register values based on the node ID and address of the register. Broadcast transactions are writes which should be taken by every slave node. There is also support for Discovery Mode and for SCFs which have no register access.

I2C (1 bit)—The I2C bit is used to remotely access an I2C slave which is attached to one of the slave nodes.

NODE (4 bits)—The NODE field is used to indicate which slave node is being addressed for normal and I2C accesses. In Discovery Mode this field is used to program the node ID for a newly discovered node.

RW (1 bit)—The RW bit is used to control whether normal accesses are reads (RW=1) or writes (RW=0).

ADDRESS (8 bits)—The ADDRESS field is used to address specific registers through the A2B Bus. This field is unused for Discovery frames. For I2C transactions the ADDRESS field is replaced with some I2C control values.

DATA (8 bits)—The DATA field is used for normal, I2C, and broadcast writes. In Discovery Mode (which doesn't require data) this field is replaced with a RESPCYCS field which is used to program a RESPCYCS Register in a newly discovered node. This value multiplied by 4 is used to determine how many cycles should elapse between the start of the SCF being received and the start of the SRF being transmitted.

CRC (16 bits)—A 16-bit CRC value is generated for the portion of the SCF following the Preamble.

The Synchronization Response Frame (SRF), which is 64 bits in length, begins each upstream transmission. At the end of a downstream transmission, the last slave node on the bus will wait until the response cycles counter has expired and then begin transmitting an SRF upstream. If an upstream slave has been targeted by a normal read or write transaction, it will generate its own SRF and replace the one received from downstream. If any slave node does not see an SRF from the downstream at the expected time, it will generate its own SRF and begin transmitting it upstream. For the next-to-last node during discovery, this wait time typically will be more than 5 sysclk cycles (nominally 49.152 MHz). Otherwise the wait time typically will be less than 5 sysclk cycles.

The last 10 bits of the SRF contains an Interrupt Field, which contains its own CRC protection and is not protected by the CRC field preceding it. Any slave node that needs to signal an interrupt to the master node will insert its interrupt information into this field. This means that a slave node with an interrupt pending will have higher priority than any higher numbered slave node that also has an interrupt pending. The last node in the system will always generate an Interrupt Field. If it has no interrupt pending, it will set the IRQ bit to 0, set the IRQNODE field to its node ID, and generate the correct CRC-4 value.

Figure 59:
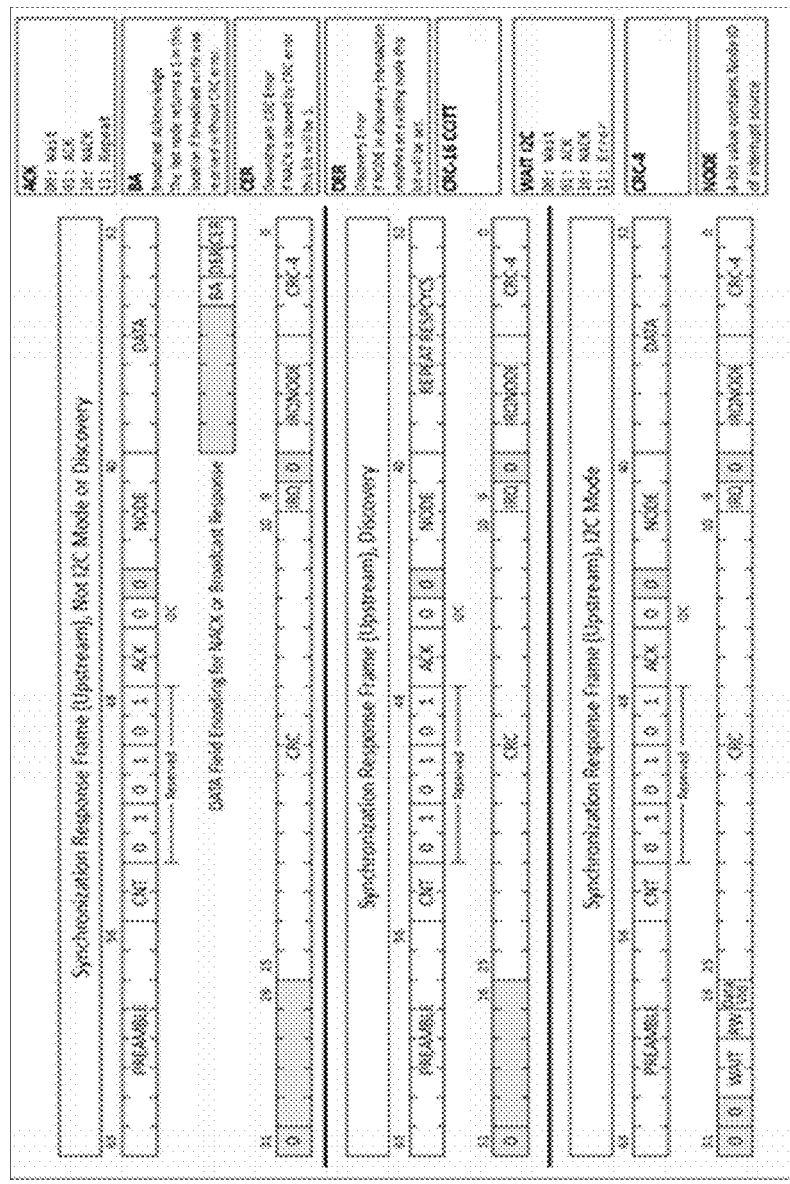
FIG. 59 shows upstream A2B synchronization response frame formats for I2C mode, discovery mode, and normal (i.e., not I2C or discover) mode, in accordance with a specific exemplary embodiment.

FIG. 59 shows upstream A2B synchronization response frame formats for I2C mode, discovery mode, and normal (i.e., not I2C or discover) mode.

The SRF contains the following fields which are used to communicate a response back to the master node:

CNT (2 bits)—The received value of the CNT field in the SCF is transmitted back to the master node.

ACK (2 bits)—Any slave node generating an SRF will insert an appropriate ACK field to acknowledge the command received in the previous SCF. The ACK values returned include Wait, ACK (acknowledge), NACK (not acknowledge), and Retry.

I2C (1 bit)—The received value of the I2C field in the SCF is transmitted back to the master node.

NODE (4 bits)—The slave node generating the SRF will insert its own node ID into this field.

DATA (8 bits)—The value placed in the DATA field will depend on the type of transaction and the ACK response of the slave node generating the SRF. For discovery transactions, the received value of the RESPCYCS field in the SCF is transmitted back to the master node.

CRC (16 bits)—A 16-bit CRC value is generated for the portion of the SRF between the Preamble and bit 26.

IRQ (1 bit)—Indicates an interrupt signaled from a slave node.

IRQNODE (4 bits)—The slave node generating the Interrupt Field will insert its own ID into this field.

CRC-4 (4 bits)—A 4-bit CRC value is generated for IRQ and IRQNODE (bits 9 through 4).

In certain exemplary embodiments, at least a portion of the synchronization control frame between the preamble and the CRC field may be scrambled in order reduce the likelihood that a sequence of bits following the SYNC word will periodically match the preamble (which could be misinterpreted by the slave devices as the start of a new synchronization cycle). In this exemplary embodiment, the SCF includes a counter (CNT) field that is incremented (modulo 4) each synchronization cycle so that the following scrambled header fields are scrambled differently from one synchronization cycle to the next. It should be noted that certain embodiments of the present invention may omit scrambling.

Figure 61:
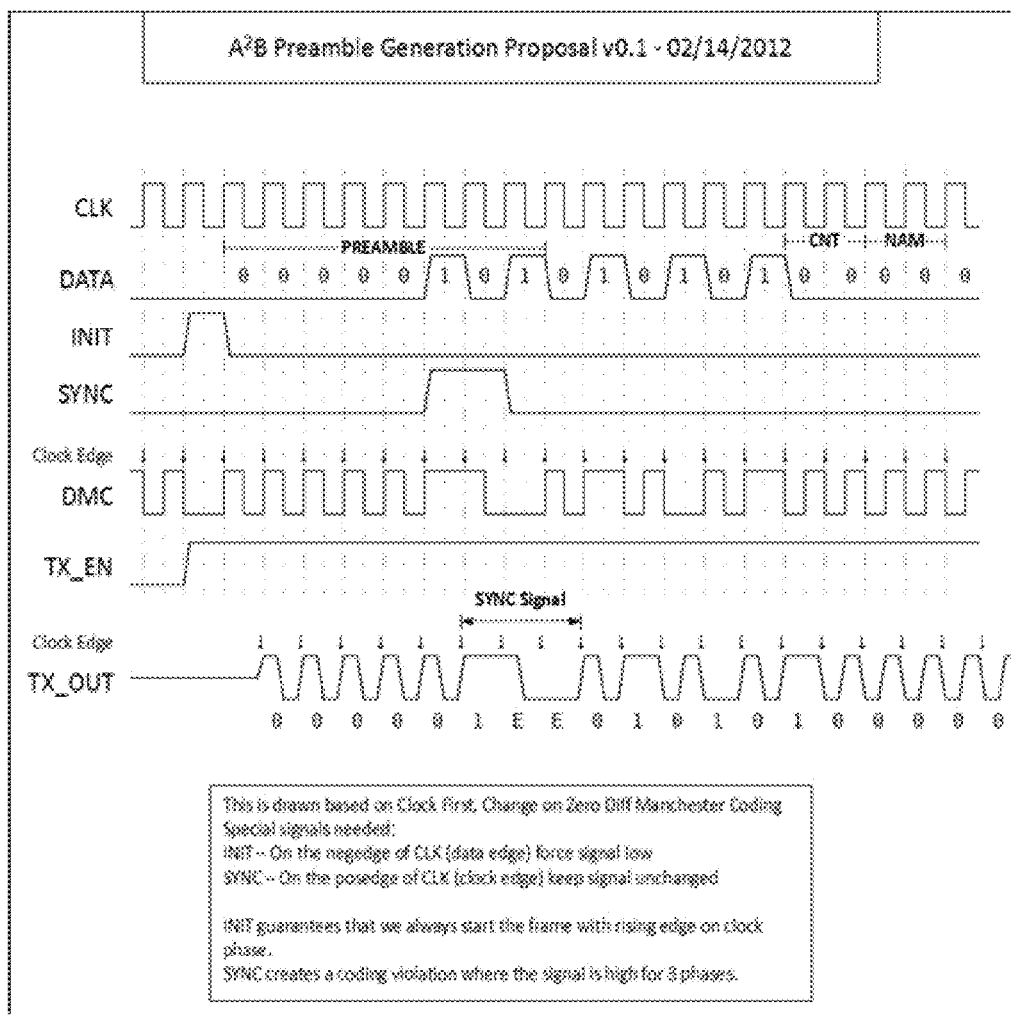
FIG. 61 shows one exemplary proposal for the content of the preamble and the logical handshake for generating the preamble.

Additionally or alternatively, the preamble typically is purposely transmitted with an encoding error (e.g., violating the BMC or differential Manchester encoding scheme) in order to further distinguish it as the preamble from the rest of the SCF. FIG. 61 shows one proposal for the content of the preamble and the logical handshake for generating the preamble, although other preamble formats/handshakes are possible. The slave devices would identify the start of the synchronization control frame based on the preamble bits including the characteristic encoding error. As with the scrambling described above, certain embodiments of the present invention may omit such error encoding.

It should be noted that other techniques may be used to ensure that the synchronization preamble can be uniquely identified by the slaves or to ensure that the synchronization preamble cannot show up elsewhere in the synchronization control frame, in addition to or in lieu of techniques such as scrambling and/or error encoding as discussed above. For example, a longer synchronization sequence may be used so as to reduce the likelihood that a particular encoding of the remainder of the synchronization control word will match it. Additionally or alternatively, the header portion of the synchronization control frame may be structured so that the synchronization sequence cannot occur, such as by placing fixed "0" or "1" values at appropriate bits.

In the exemplary embodiment shown in FIG. 58, the node addressing mode (NAM) field provides for four types of node addressing, specifically none (i.e., not addressed to any particular slave device), normal (i.e., unicast to a specific slave device specified in the NODE address field), broadcast (i.e., addressed to all slave devices), and discovery (discussed below). When the node addressing mode is set to "Discovery," the ADDR and DATA fields are encoded as a response cycles (RESPCYCS) value that indicates the time in bits from the end of the downstream header to the start of the upstream response header, which allows a newly discovered slave device to determine the appropriate time slot for upstream transmission.

For broadcast messages, provisions are preferably made for each slave device to acknowledge receipt and processing of the broadcast message, e.g., by transmitting a broadcast acknowledgement to the master. The slave also may indicate whether the slave has data to transmit, which could be used, for example, for demand-based upstream transmissions (e.g., for non-TDM data, such as inputs from a keypad or touch screen) or for prioritized upstream transmission (e.g., the slave needs to report an error or emergency condition).

In the exemplary embodiment shown in FIG. 58, and as discussed above, provisions are made for sending read and write requests to the slave devices, including both A2B-specific requests and I2C requests. Here, the master device can send read and write requests (indicated using the RW field) to one or more designated slave devices (using the NAM and NODE fields) and can indicate whether the request is an A2B-related request for the slave device, an I2C request for the slave device, or an I2C request to be passed along to an I2C device attached to the slave device (and allowing for multiple I2C ports).

Figures 1, 70:
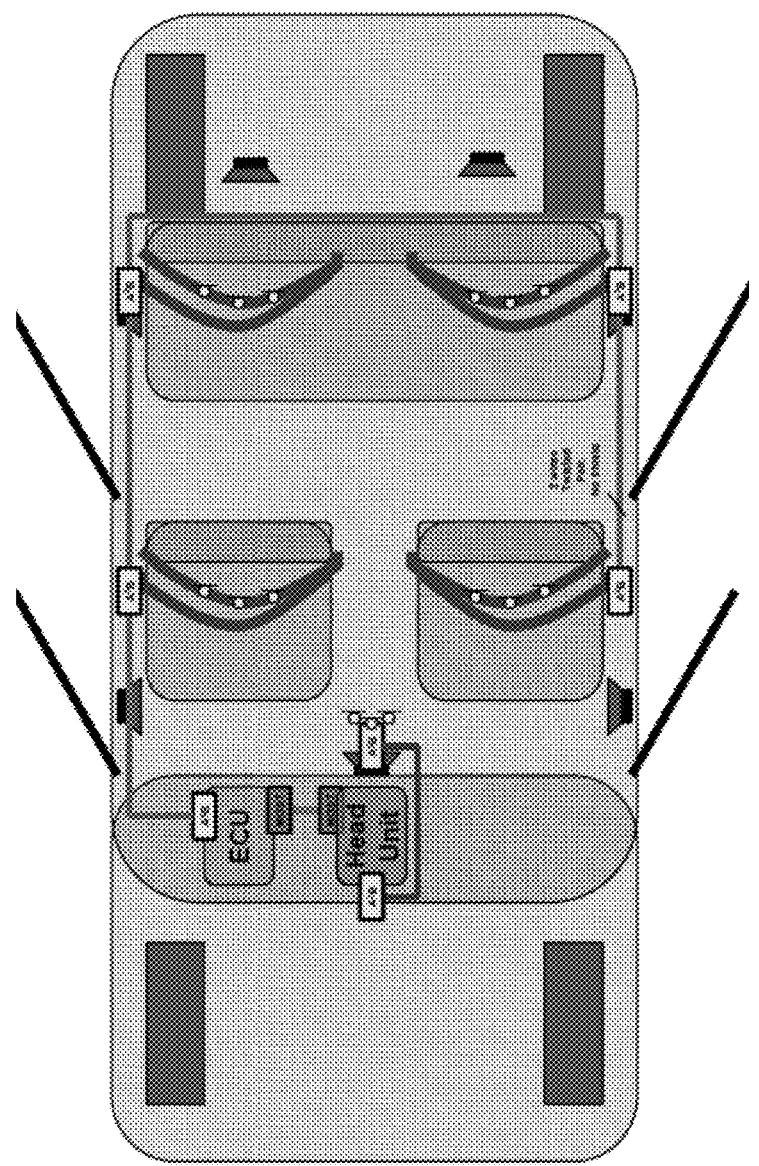
Figures 2, 70:
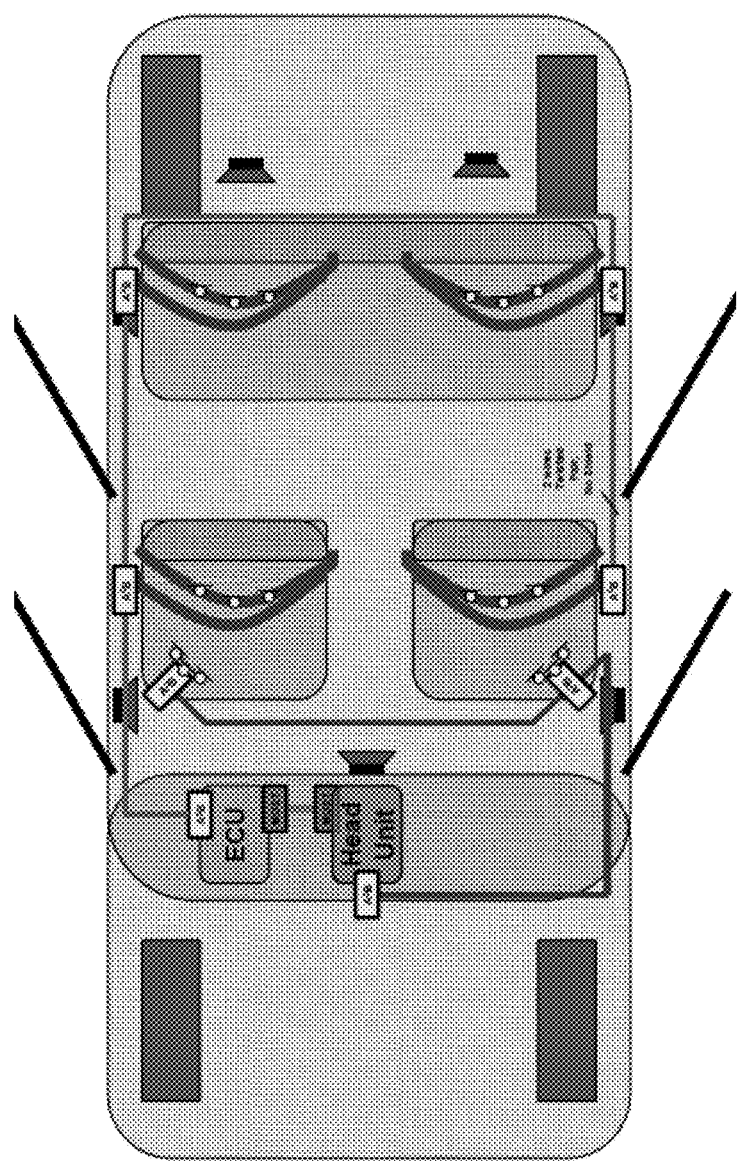
Figures 1, 71:
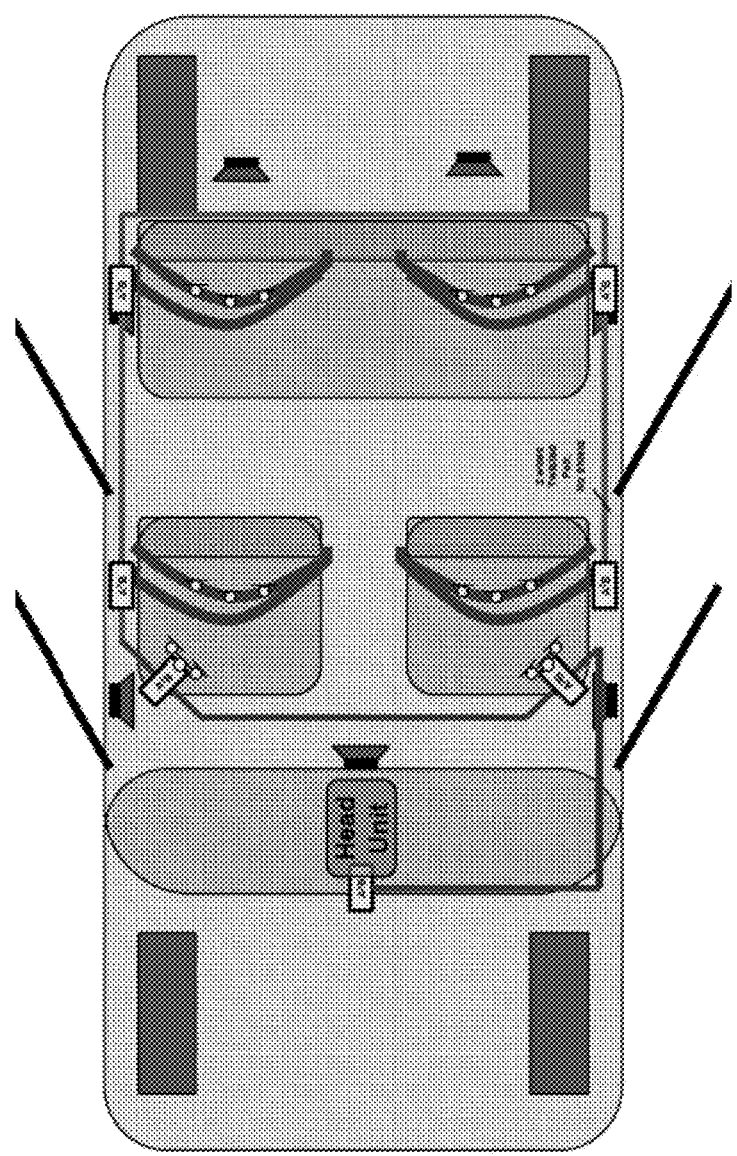
Figures 2, 71:
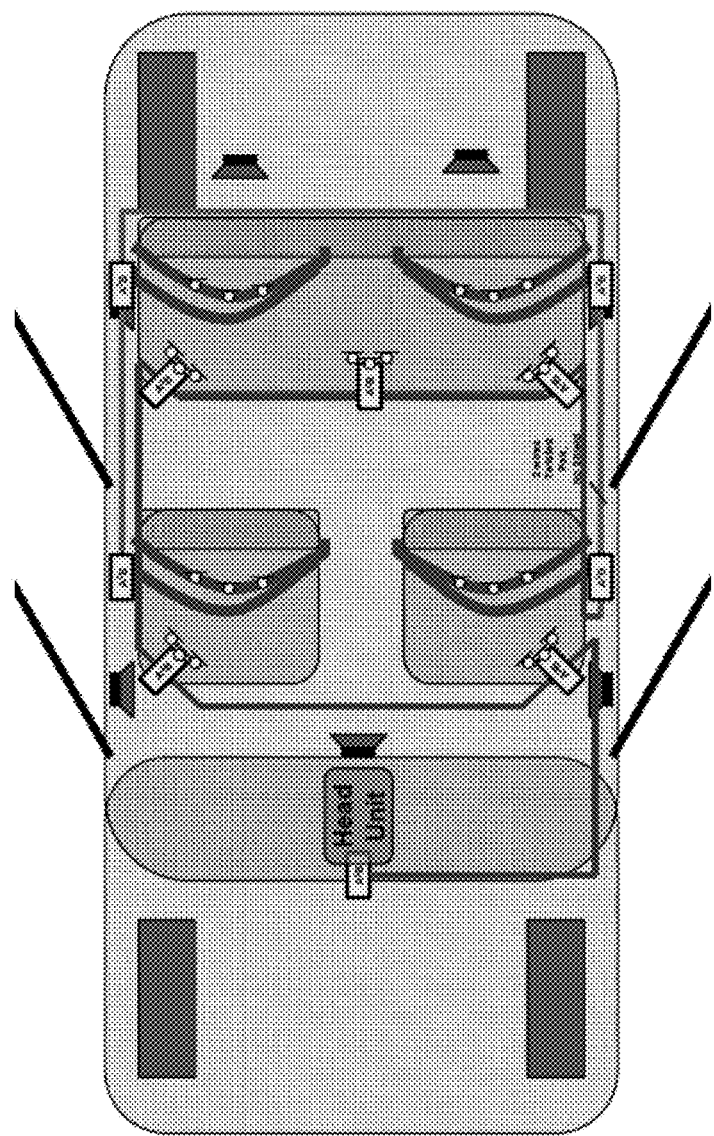
Figures 1, 72:
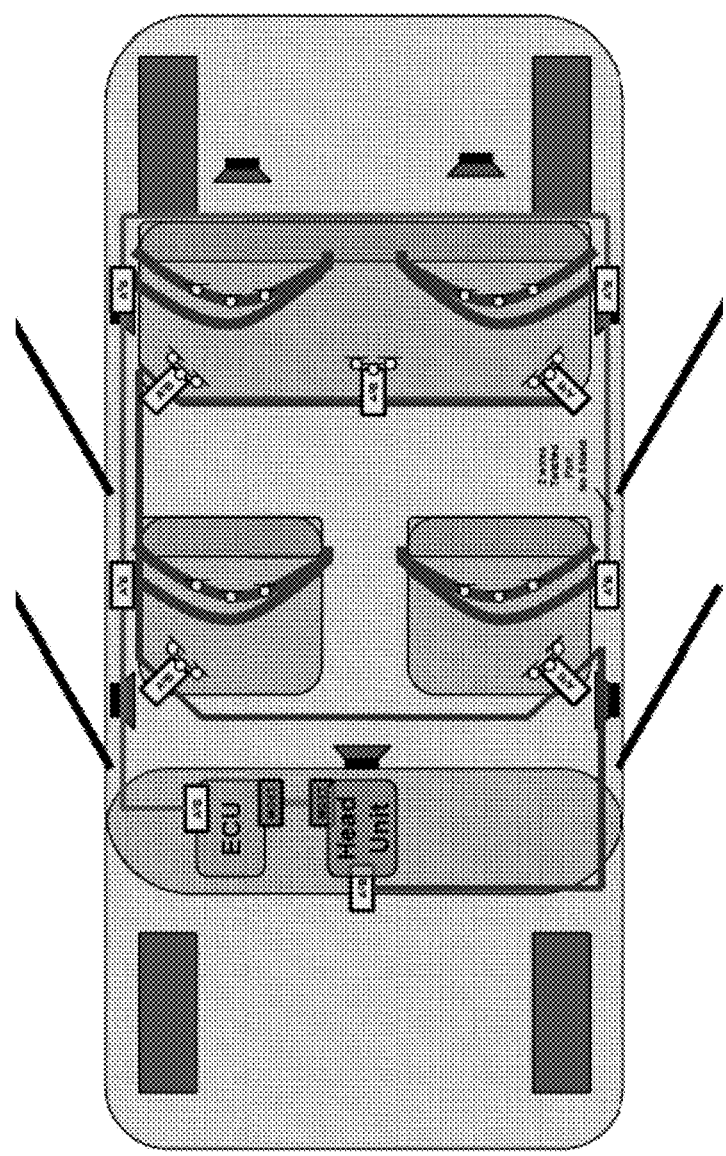
Figures 2, 72:
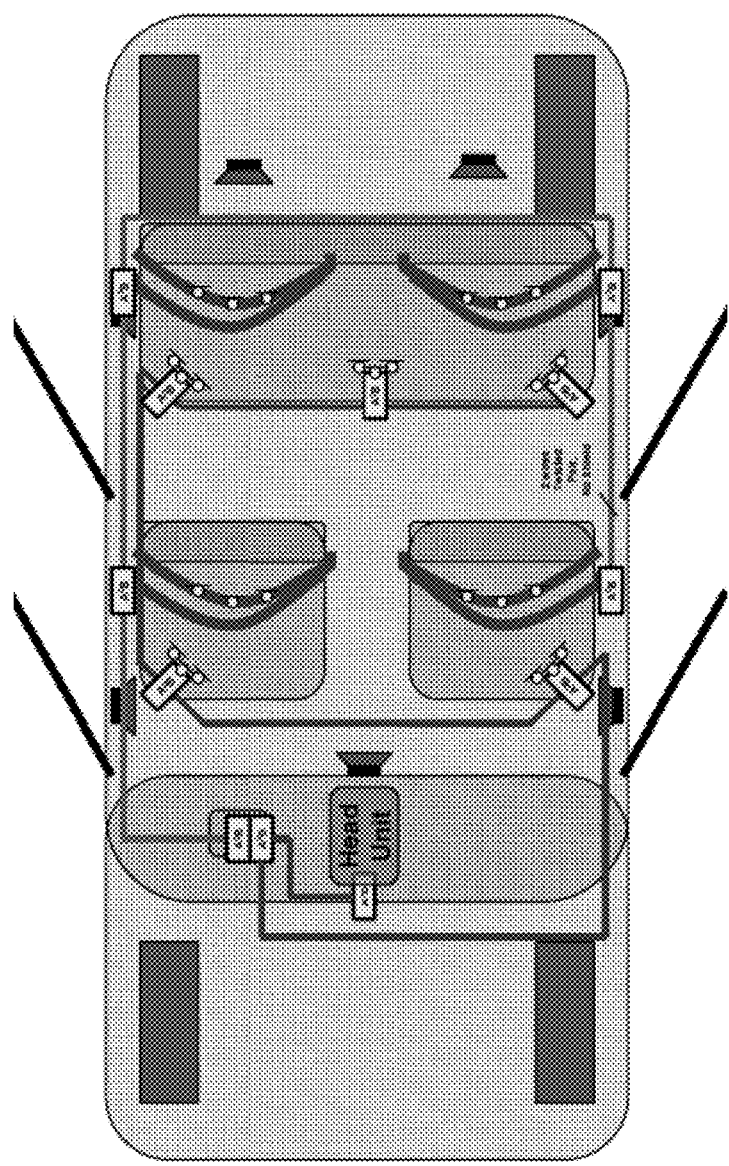
Figures 1, 73:
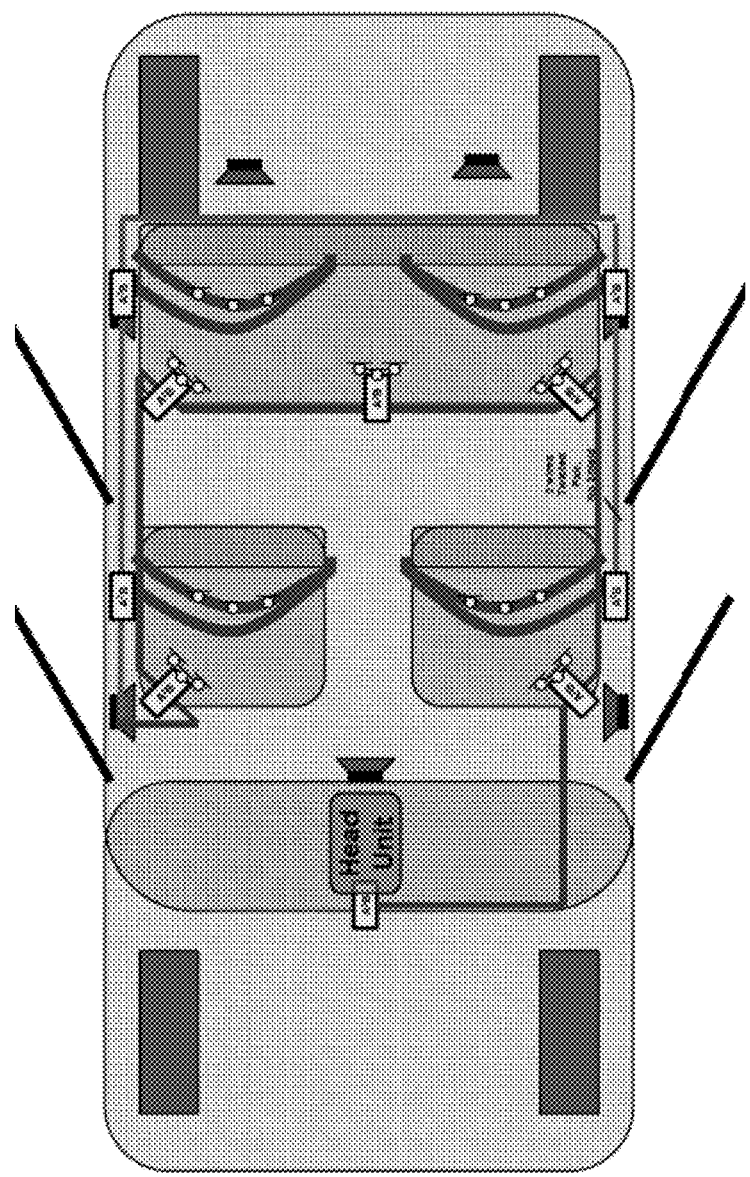
Figures 2, 73:
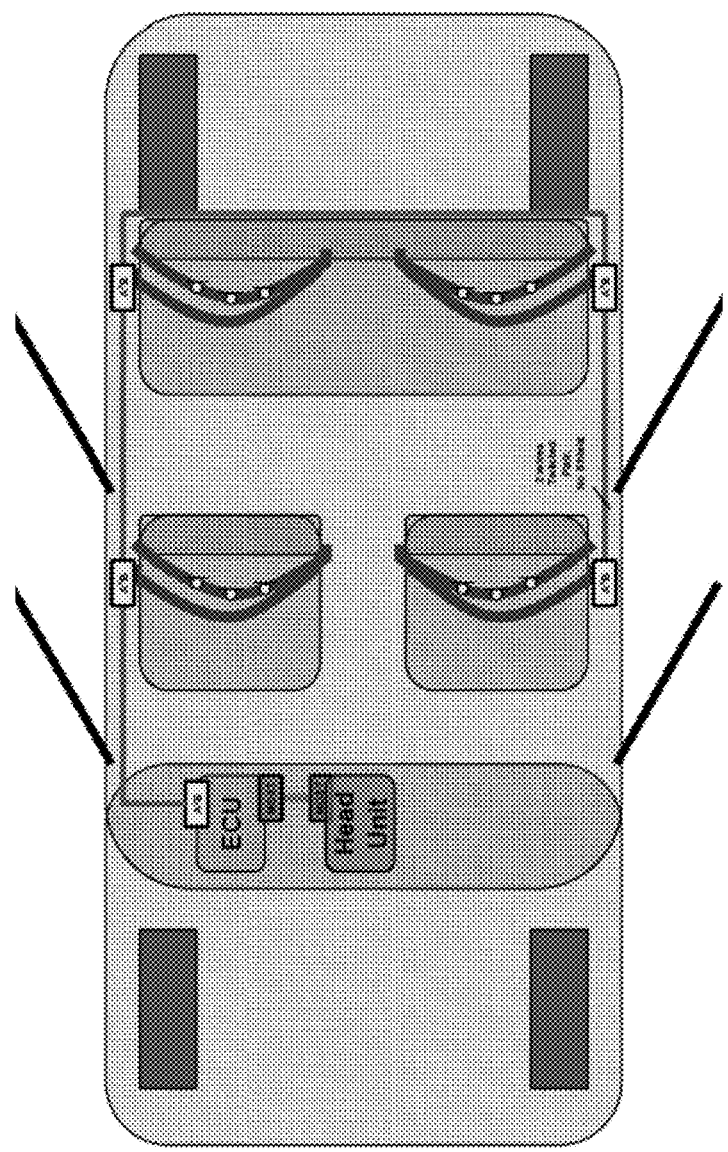

FIG. 70 shows exemplary data frame formats in accordance with certain embodiments of the present invention.

10. Slave Discovery/Configuration

In exemplary embodiments of the present invention, the synchronization status frame may include substantially the same types of fields as the synchronization control frame.

In an exemplary embodiment, the master device uses a novel slave discovery protocol to discover and configure each successive slave device. In this exemplary slave discovery protocol, the master first attempts to contact the first slave device by powering the bus and repeatedly sending a predetermined discovery message. The discovery message is essentially a specifically configured synchronization control frame (e.g., the NAM field encoded for "Discovery" with an appropriate value in the RESPCYCS field; in alternative embodiments, the NODE field may be used to convey an address for the slave device or the slave address may be configured separately from discovery).

Upon receiving the discovery message (after synchronization), the first slave device responds to the master (e.g., with an ACK and the node number), and then the master can communicate with and configure the slave device, including configuring the slave device with framing information. At this point, the master can exchange data with the first slave device. The slave device is by default the last slave.

Once the master device has discovered and configured the first slave device, it goes on to try to discover a second slave device. In this novel slave discovery protocol, the master device essentially instructs the first slave device to try to contact a second downstream slave device (enable next). During this exchange, the first slave device can continue communicating over its upstream bus with the master. Specifically, the master device sends a control word to the first slave, commanding it to enable the next slave (default is disabled next slave). In exemplary embodiments, this attempt to contact the second slave device includes, among other things, the first slave device switching on power to its downstream bus segment, e.g., by closing its power switch(es) and transmitting downstream control frames on its downstream bus segment. This allows the second slave to synchronize itself to the downstream control header. The master repeatedly sends discovery messages (with the second node number) until the second slave responds. As the penultimate last slave device on the bus, the first slave device forwards all downstream synchronization control frames to the second (new) slave device. It generates its own upstream status response header after a certain time-out period (e.g. 32 bit cycles) until it receives an upstream response from the second slave device. Once the second node (new node) responds to a discovery frame then its status response header will be passed along upstream from the second slave to the first slave embedding all upstream data information. Assuming the master device receives a matching response to its discovery frame from the second, new last slave device (no reply might suggest that there are no further slave devices on the bus or perhaps there is a problem with the bus or downstream slave device), it can now exchange control and status information with both slaves including configuring the slave device with framing information.

Using the types of protocol exchanges just described, the master device can instruct the second slave device to try to contact the third slave device, and so on, until all slave devices have been discovered and configured and the truly last slave device does not need to enable another device.

To facilitate such slave discovery and configuration over bi-directional point-to-point buses of the type described above, each slave typically has a default configuration in which it "knows" it has not yet been discovered/configured, and also typically has a default configuration with its power switch(es) open so that it does not provide power to its downstream bus segment unless and until implicitly or explicitly instructed to do so by the master device. In this way, when a particular slave device receives a discovery message, its default configuration prevents it from mistakenly powering its downstream bus segment and forwarding the discovery message; instead, the slave device "knows" that it must respond to the discovery message in order to be discovered and configured.

The selective powering of each successive bus segment under control of the master device also provides enhanced opportunities for bus fault detection and isolation. For example, when a particular slave device is instructed to provide power on its downstream bus segment, the master device and or the slave device may be configured to monitor for any of a variety of fault conditions (e.g., over-voltage, over-current, etc.) and take appropriate corrective action if such a condition is detected, e.g., opening the power switch(es) to turn off power to the downstream bus segment. It should be noted that the slave device may include additional switches, e.g., switches positioned so that the slave device transceiver and power circuitry can be completely decoupled from the downstream bus segment in order to provide enhanced isolation. As with the power switch(es), such additional switches generally would default to "open" and would be selectively closed as part of the downstream slave discovery process.

Figure 66:
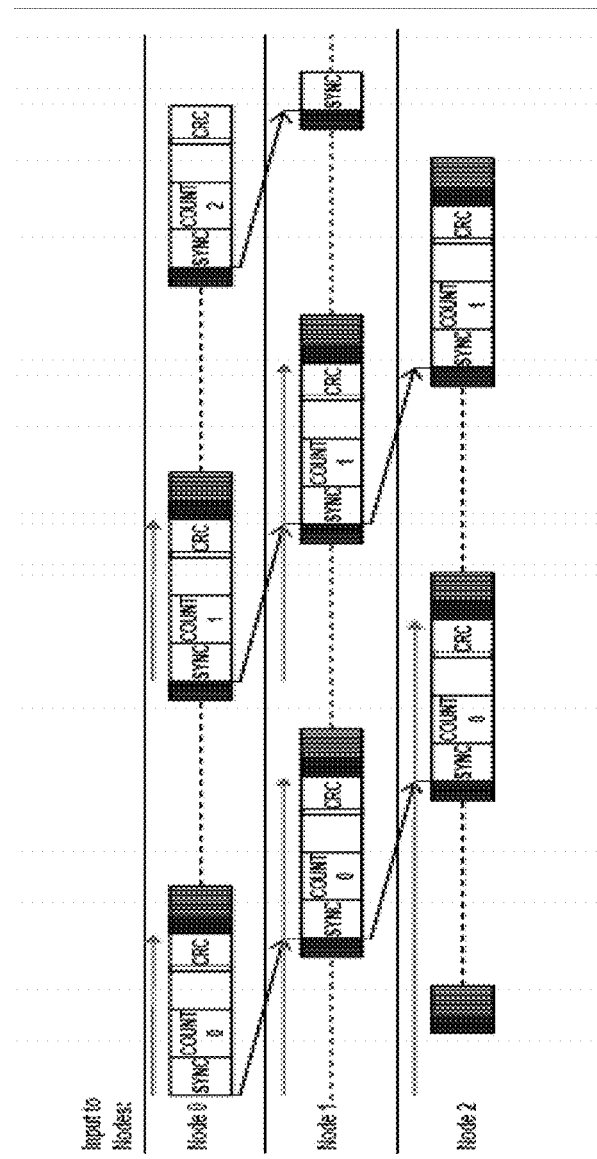
FIG. 66 schematically provides an example of simultaneous sampling, in accordance with an exemplary embodiment of the present invention.

It should be noted that the master may program a sampling delay parameter for one or more slave devices, e.g., to allow for synchronization of slave data sampling. FIG. 66 schematically provides an example of simultaneous sampling, in accordance with an exemplary embodiment of the present invention. In an exemplary embodiment, each slave has an adjustment counter to specify when the slave should sample data relative to the sync signal. The master conveys the adjustment counter in the discovery frame header via the RESP-CYCS field.

It should be noted that the slave discovery/configuration protocol just described is but one example of slave discovery/configuration protocol that may be used on a bi-directional point-to-point line bus of the type described herein. Other types of protocols may be used in various alternative embodiments. For example, if all slaves have pre-programmed slave addresses and the bus is fully powered (e.g., the slaves do not have switches for selectively enabling and disabling power to downstream devices), the master may simply poll the individual slave devices.

It also should be noted that a slave discovery/configuration protocol of the type just described may be used in other bus configurations and therefore is not limited to bi-directional point-to-point line buses of the type described herein.

11. Alternative Uni-Directional Bus (Ring) Configurations

Figure 43:
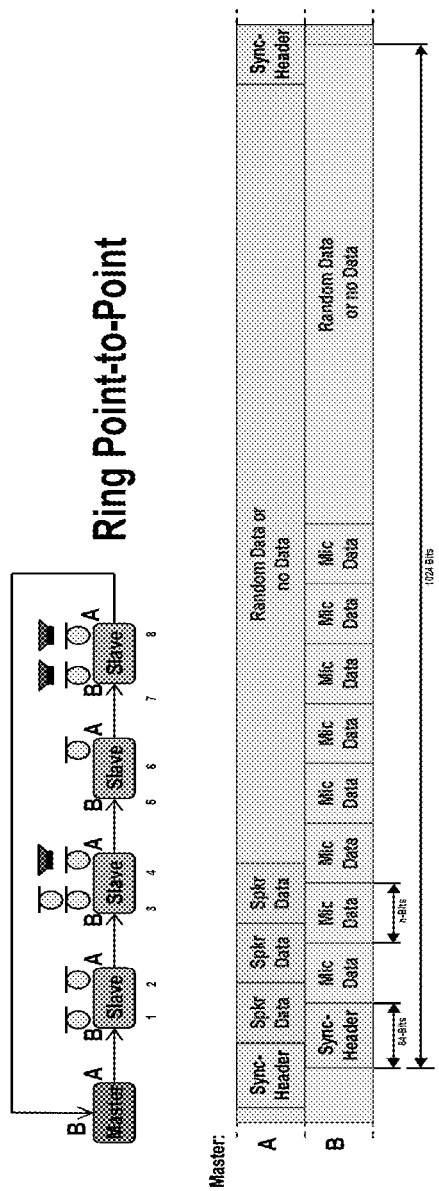
FIG. 43 schematically shows a uni-directional bus (ring) topology in accordance with an exemplary embodiment of the present invention.
Figure 44:
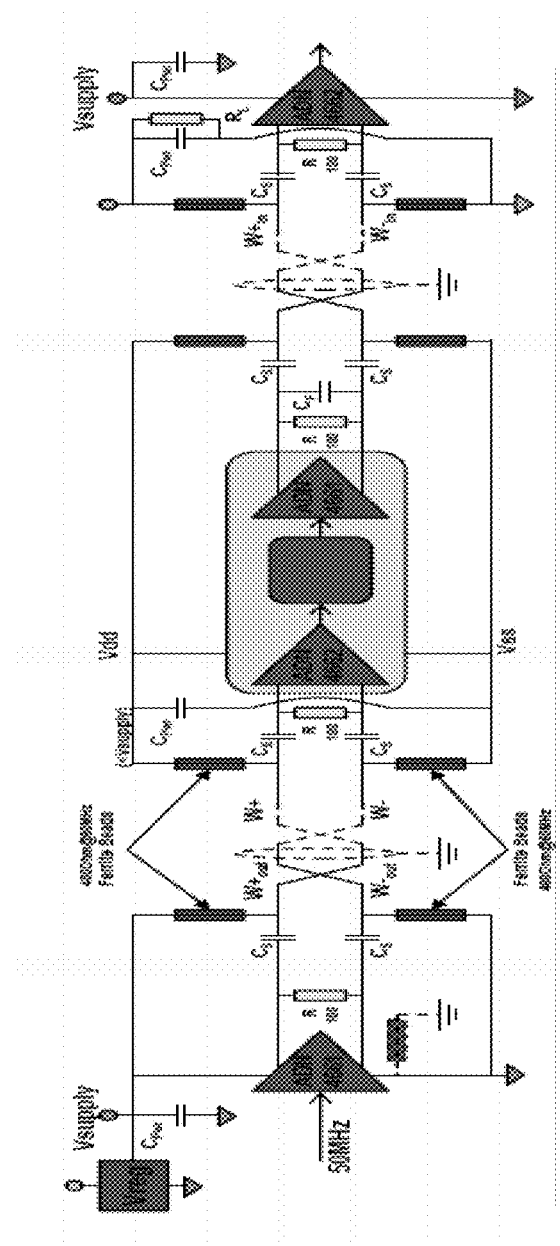
FIG. 44 schematically shows a block diagram of a device for operation in a uni-directional bus, in accordance with an exemplary embodiment of the present invention.

Data, power, and clocking of the type discussed above may be provided by devices configured for uni-directional bus (ring) operation, for example, as shown schematically in FIG. 43. In such embodiments, rather than including transceivers of the type discussed above, the slave devices can be configured with a receive-only port and a transmit-only port, for example, as shown schematically in FIG. 44. Although only slave devices with microphones are represented in this example, it should be noted that a slave device may include one or more sensors and/or one or more actors, e.g., microphone(s) and/or speaker(s).

FIG. 43 also shows an exemplary link layer synchronization scheme for the uni-directional bus. Here, the master transmits a synchronization control frame (Sync-Header) optionally followed by downstream data (not shown in FIG. 43), and each successive slave device forwards the synchronization control frame along with any data from prior slave devices and a data sample of its own.

One issue with a uni-directional bus configuration of the type shown in FIG. 43 is that it may not be possible to identify or isolate a failure location in certain failure situations, for example, if there is an open connection anywhere along the bus or if one of the slave devices fails. Extra circuitry would be needed to monitor time of failure and to sustain operation of nodes so that they can flush out remaining good information to the master.

Figure 45:
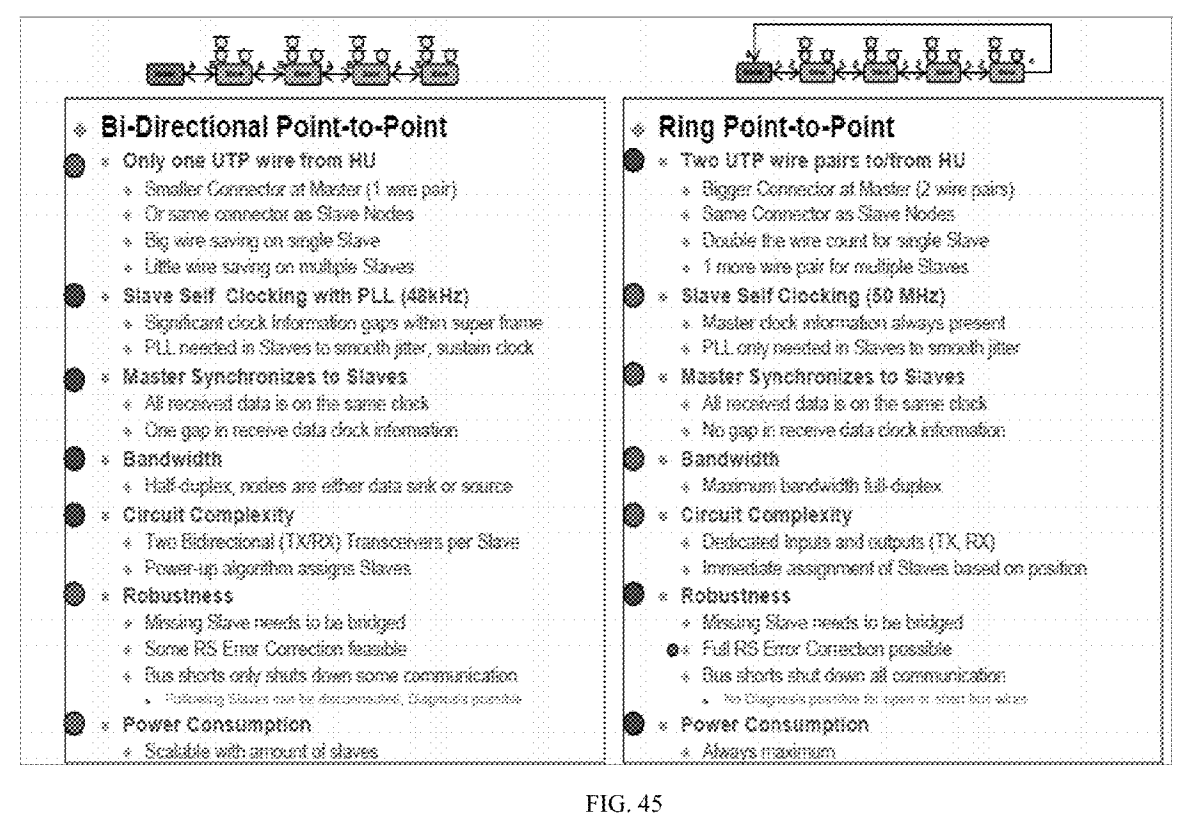

FIG. 45 provides a relative comparison of the uni-directional bus (ring) to the bi-directional point-to-point bus for certain exemplary embodiments.

12. Alternative Bi-Directional Multipoint Bus Configurations

Figure 46:
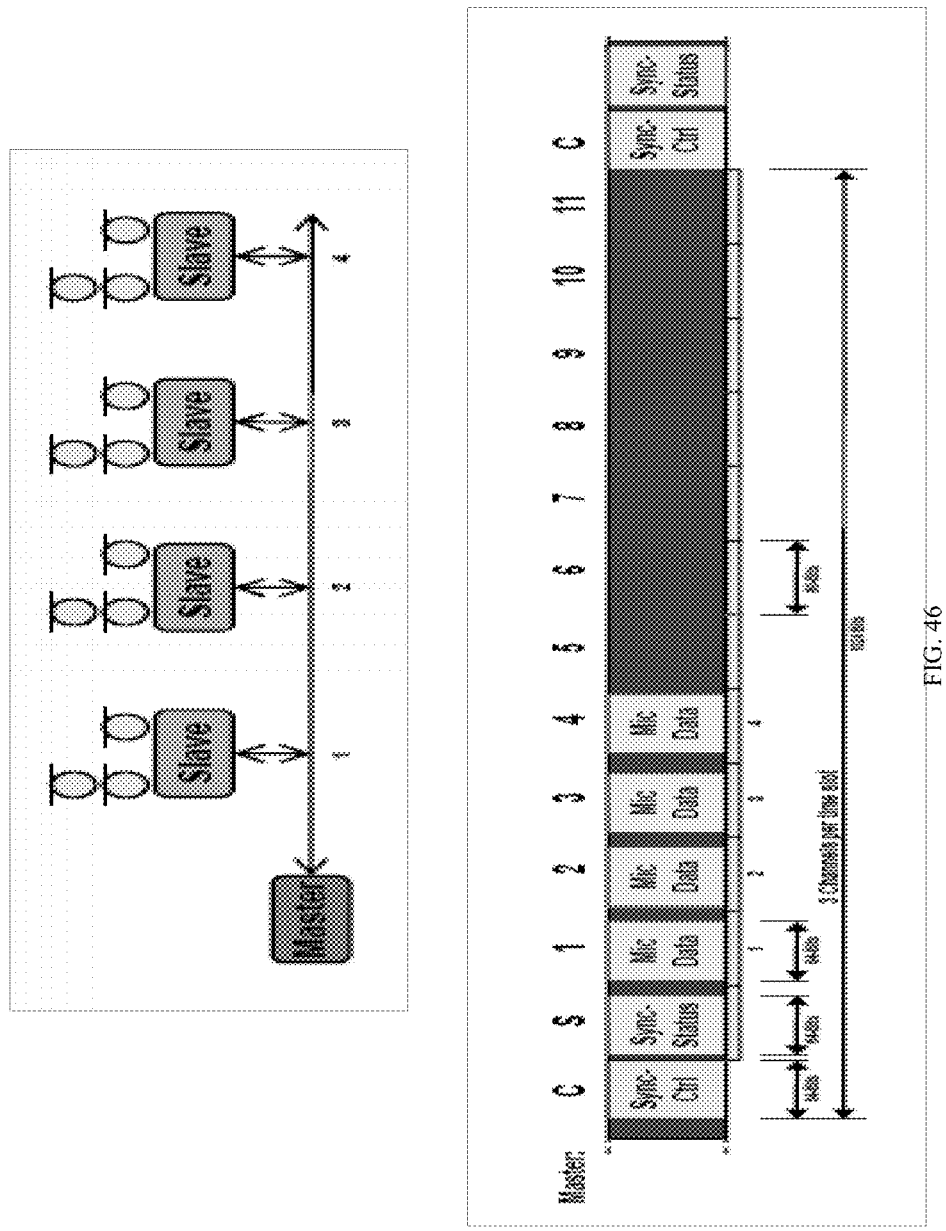
FIG. 46 schematically shows a bi-directional multipoint bus in accordance with an exemplary embodiment of the present invention.

Data, power, and clocking of the type discussed above may be provided by devices configured for bi-directional multipoint bus operation, for example, as shown schematically in FIG. 46. Various bi-directional multipoint bus configurations are described in FIGS. 50-56.

FIG. 46 also shows an exemplary link layer synchronization scheme for the bi-directional multipoint bus. Here, the master transmits a synchronization control frame (Sync-Ctrl), and a designated slave device returns the synchronization status frame and each slave device transmits data in a designated time slot.

Figure 47:
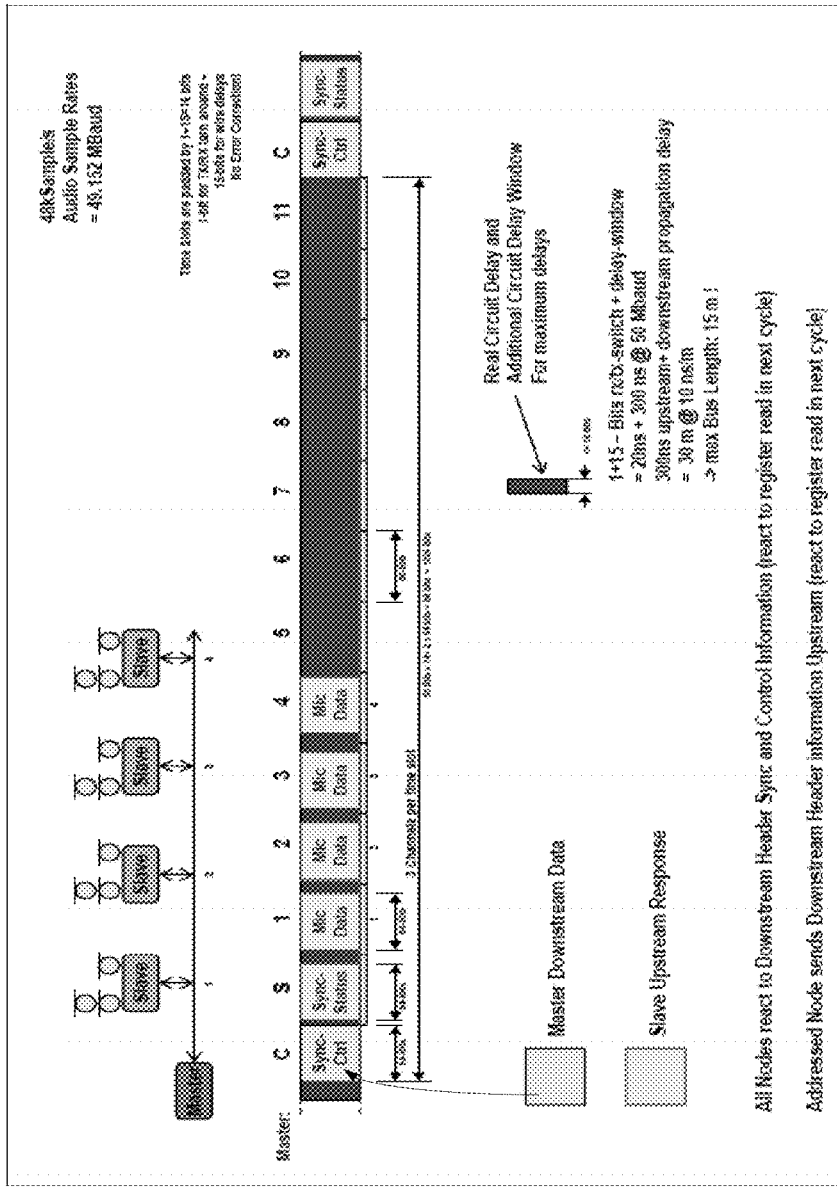
FIG. 47 schematically shows signaling and timing considerations for a multipoint bus configuration of the type shown in FIG. 46, in accordance with an exemplary embodiment of the present invention.

FIG. 47 schematically shows signaling and timing considerations for a multipoint bus configuration of the type shown in FIG. 46, in accordance with an exemplary embodiment of the present invention. In this example, the master downstream data is represented by the blocks labeled Sync-Ctrl in the slots labeled "C" while slave upstream response data is represented by the blocks labeled Sync-Status in the slots labeled "S" and Mic Data in slots numbered 1-4 following the Sync-Status block.

Figure 48:
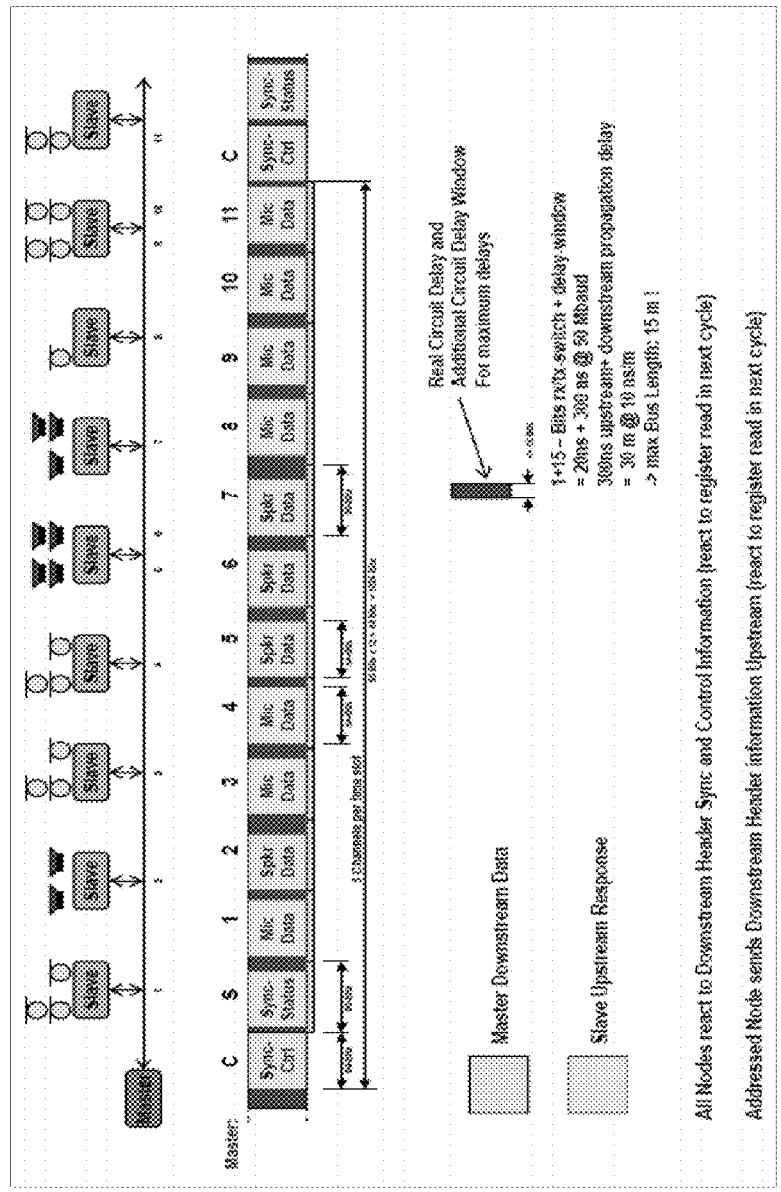
FIG. 48 schematically shows signaling and timing considerations for a multipoint bus configuration with audio data being transmitted bi-directionally, in accordance with an exemplary embodiment of the present invention.

FIG. 48 schematically shows signaling and timing considerations for a multipoint bus configuration with audio data being transmitted bi-directionally, in accordance with an exemplary embodiment of the present invention. In this example, the master downstream data is represented by the blocks labeled Sync-Ctrl in slots labeled "C" and Spkr Data in slots numbered 2, 5, 6, and 7 while slave upstream response data is represented by the blocks labeled Sync-Status in slots labeled "S" and Mic Data in slots numbered 1, 3, 4, 8, 9, and 10. Although not explicitly shown in the diagram, slave nodes can provide data (e.g., from microphones), consume data (e.g., for speakers), or do both in a shared time slot or separate time slots.

Figure 49:
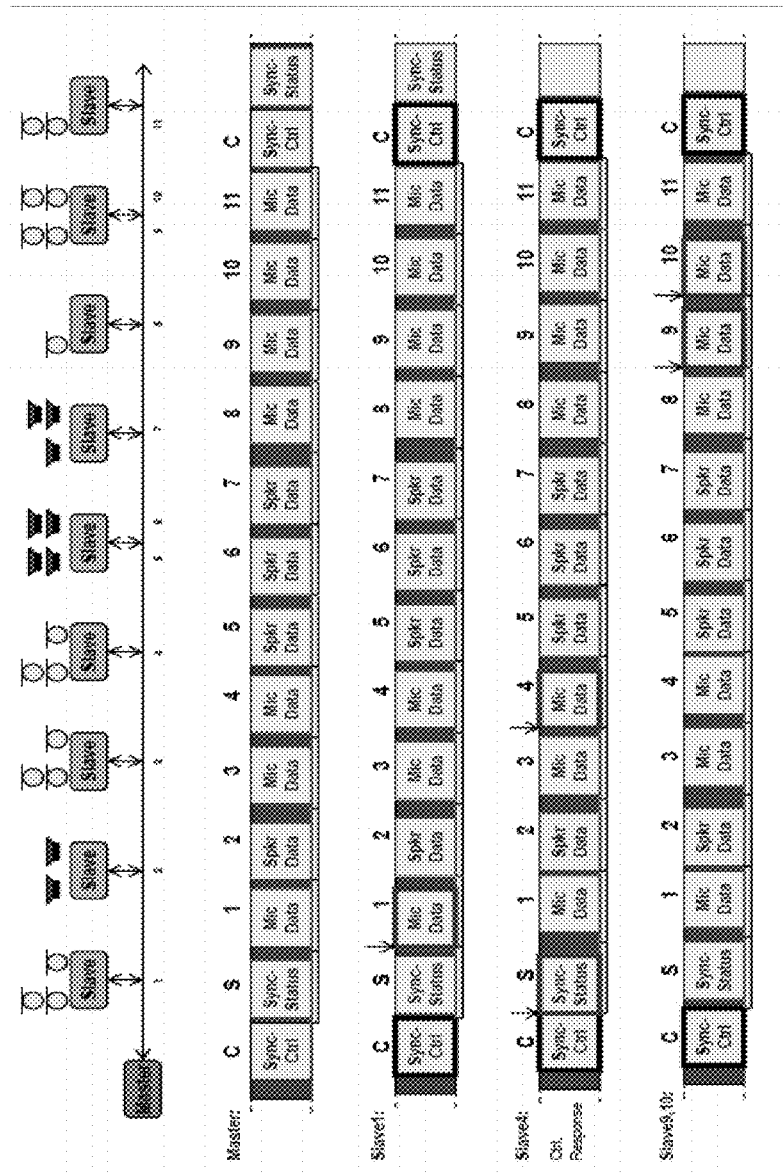
FIG. 49 schematically provides examples of certain multipoint bus operations between nodes, in accordance with an exemplary embodiment of the present invention.

FIG. 49 schematically provides examples of certain multipoint bus operations between nodes, in accordance with an exemplary embodiment of the present invention. In this example, slave 4 is the designated slave that transmits the synchronization status frame, and device 9/10 is a multi-channel device that transmits two audio samples in corresponding time slots. Note that even though slave 4 transmitted the synchronization status frame, it still transmitted its audio sample in its designated time slot. Master downstream data is represented by the blocks labeled "Sync-Ctrl and Spkr Data, while slave upstream response data is represented by the blocks labeled Sync-Status and Mic Data.

One issue with a bi-directional multipoint bus configuration of the type shown in FIG. 46 is that it may not be possible to identify or isolate a failure location in certain failure situations.

Figure 50:
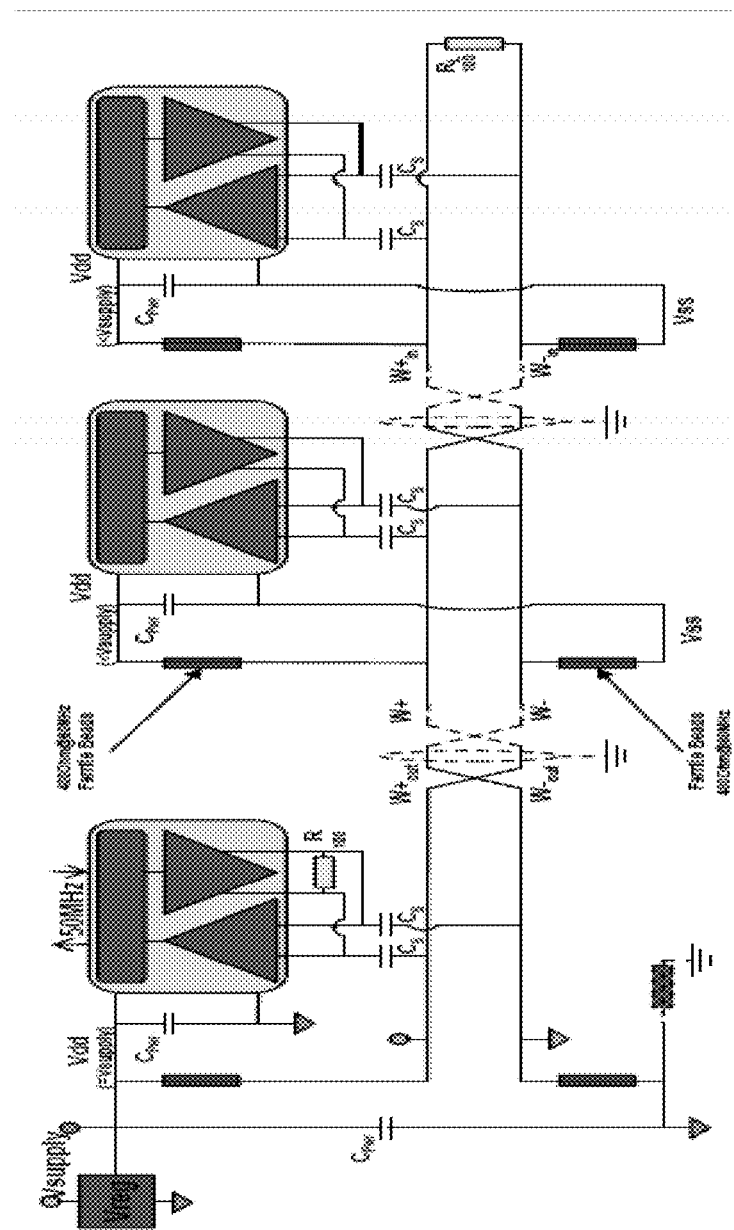
FIGS. 50-56 schematically show various bi-directional multipoint bus configurations, in accordance with various exemplary embodiments of the present invention.

FIG. 50 schematically shows a bi-directional multi-point bus configuration in which the power provided to the bus does not go through a switch. In such a configuration, it would be difficult to determine the location of a bus or slave failure.

Figure 51:
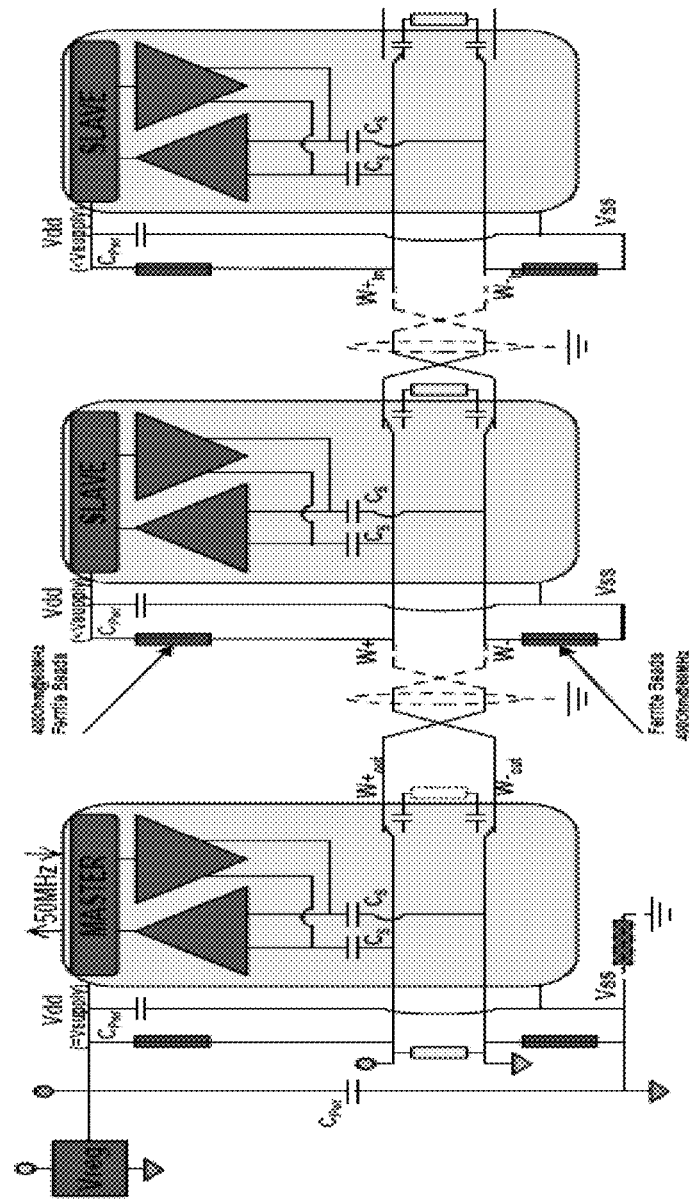

FIG. 51 schematically shows a bi-directional multi-point bus configuration in which switches in each device are used to selectively switch both power and signal. In such a configuration, each device is able to selectively disconnect its downstream link, which allows for fault detection and isolation and continued communication in the event of certain downstream faults. However, the switches typically must be able to handle the high supply currents and high frequency on the bus, which may make CMOS switches unusable in such applications; MEMS switches may be usable in such applications.

Figure 52:
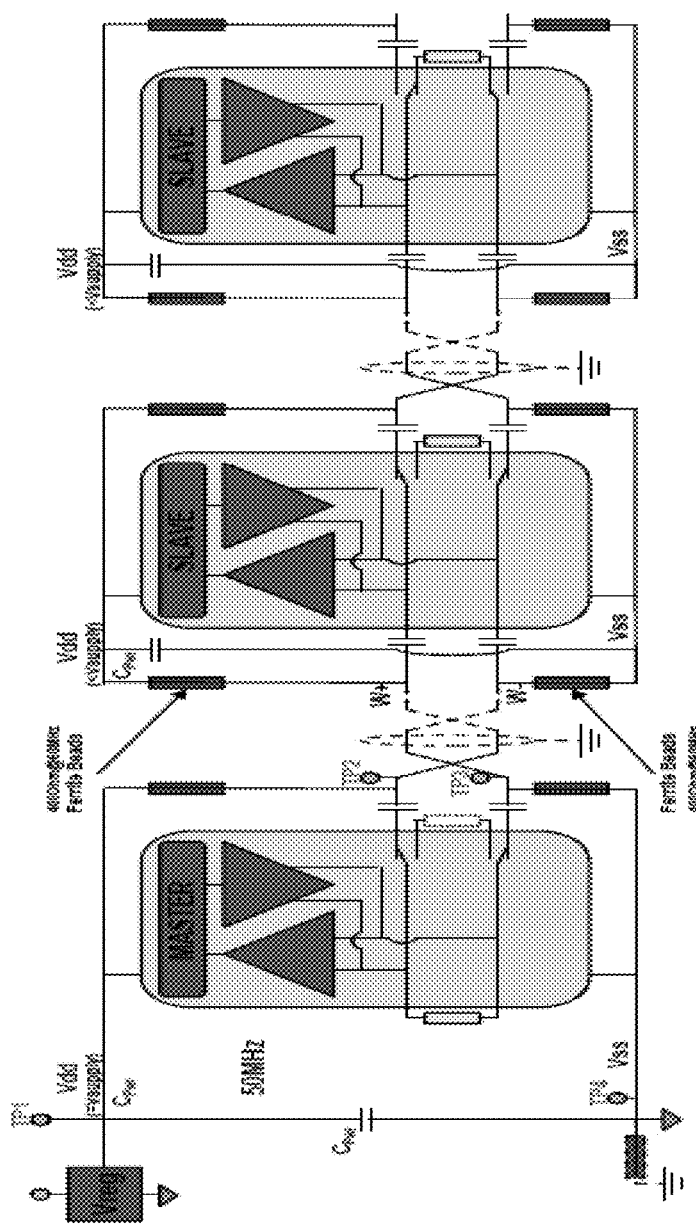

FIG. 52 schematically shows a bi-directional multi-point bus configuration in which the communication line is AC-coupled, and switches in each device used to selectively switch only the communication link but not the power. Such switches generally need to have good AC performance.

Figure 53:
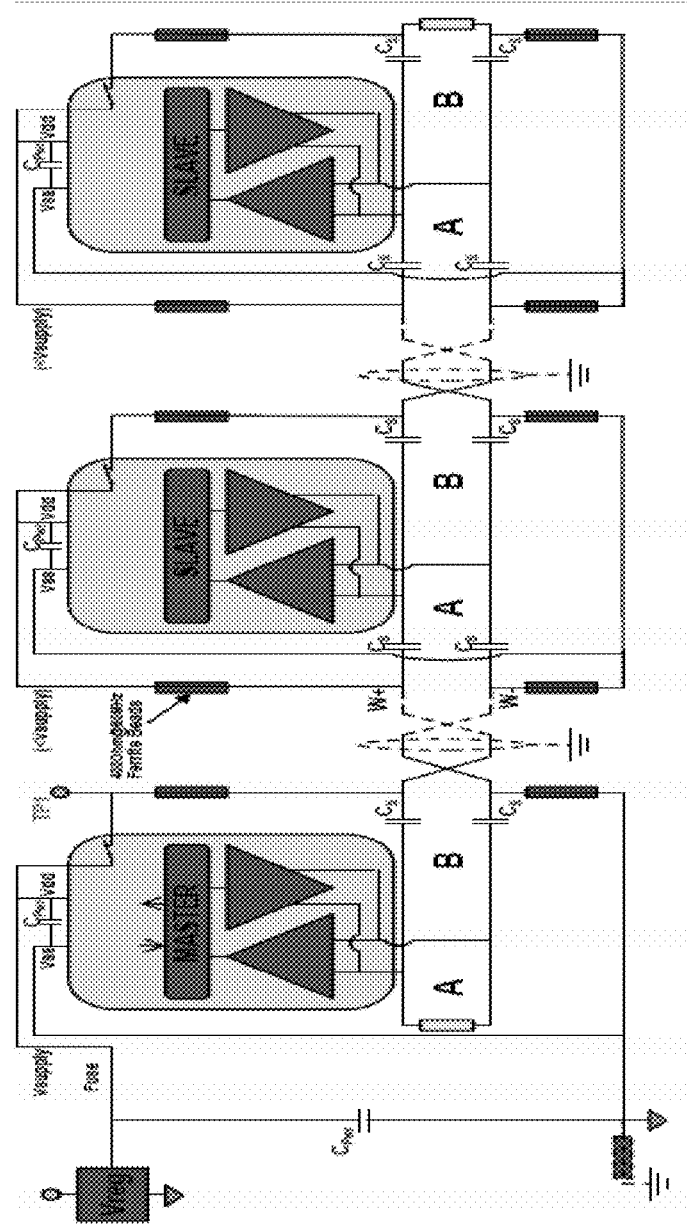

FIG. 53 schematically shows a bi-directional multi-point bus configuration in which only the power is switched.

Figure 54:
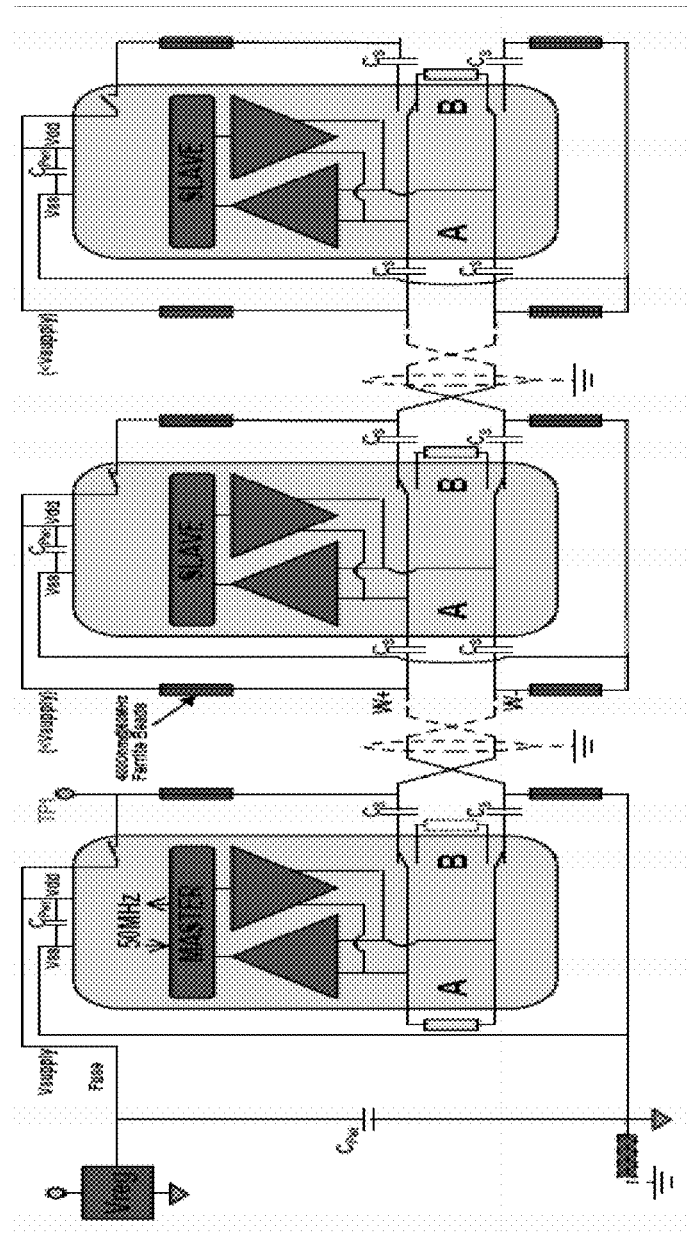

FIG. 54 schematically shows a bi-directional multi-point bus configuration in which separate switches are used to separately switch the signal line and the power line.

Figure 55:
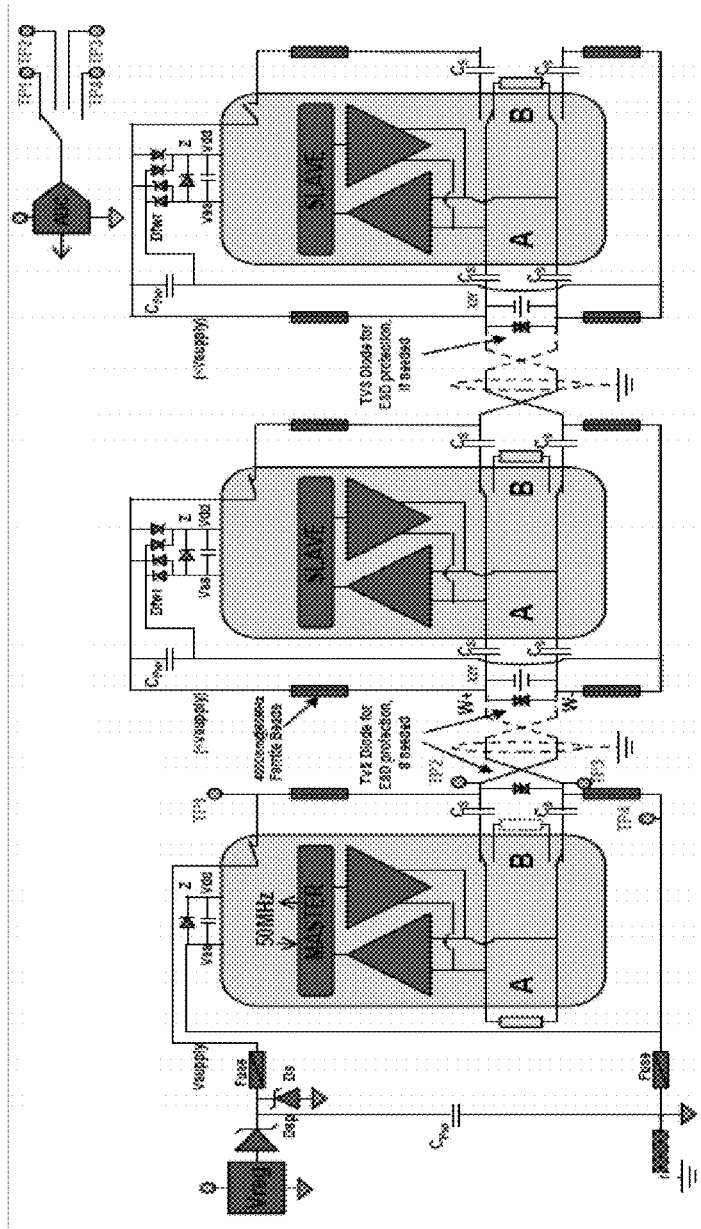

FIG. 55 schematically shows a bi-directional multi-point bus configuration as in FIG. 54 but with additional circuitry for fault detection and protection, e.g., protecting against excess voltages, a full wave rectifier for reversed wire operation, and an ADC for diagnostics.

Figure 56:
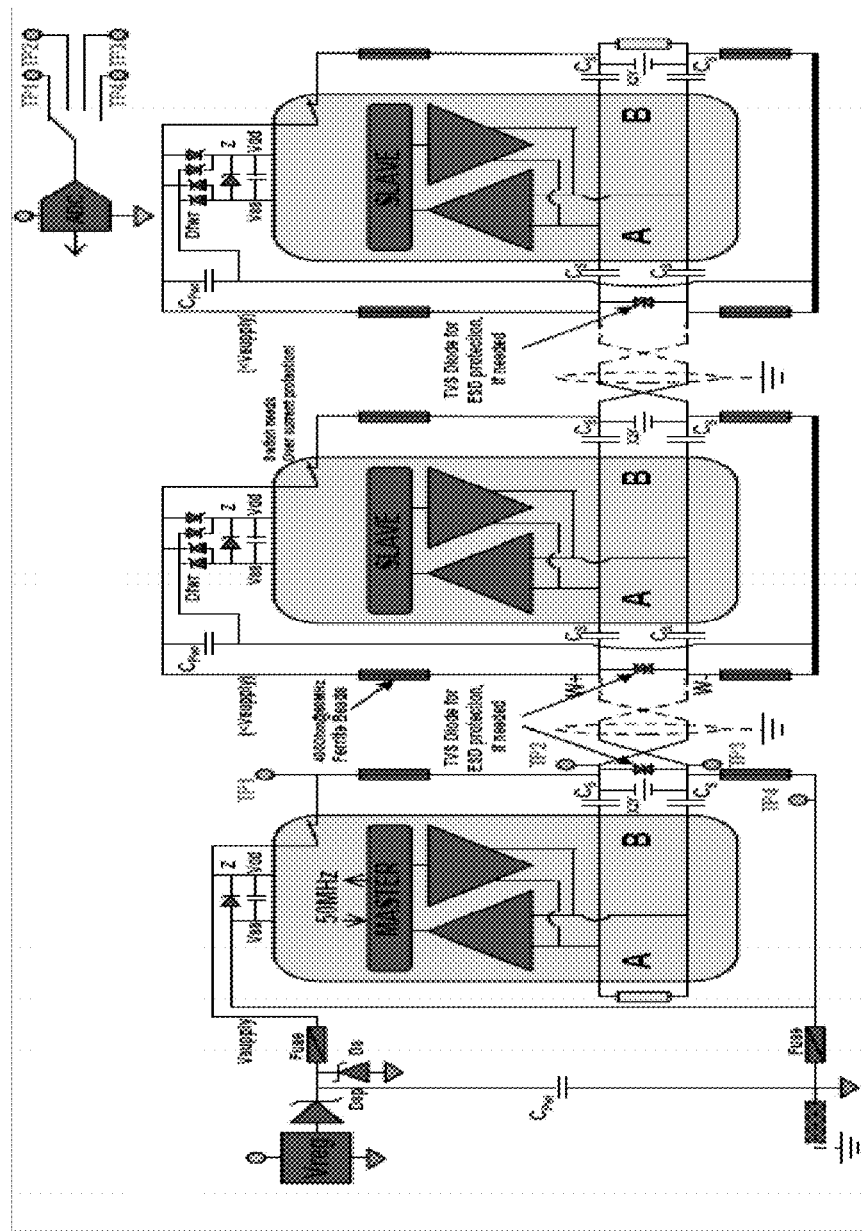

FIG. 56 schematically shows a bi-directional multi-point bus configuration as in FIG. 53 but with additional circuitry for fault detection and protection, e.g., protecting against excess voltages, a full wave rectifier for reversed wire operation, and an ADC for diagnostics.

13. Details of a Specific Exemplary Embodiment

In one specific exemplary embodiment, the A2B system provides a multi-channel, I2S/TDM link over distances of up to 10 meters between nodes. It embeds bi-directional synchronous data (for example digital audio), clock and synchronization signals onto a single differential wire pair. It supports a direct point-to-point connection and allows multiple, daisy-chained nodes at different locations to contribute to the time division multiplexed channel content. It also supports a phantom powering feature in which supply voltage and current may be provided to one or more slave nodes over the same daisy-chained twisted-pair wire cable as used for the communication link.

This exemplary A2B system is a single-master, multiple-slave system where the transceiver chip at the host controller is the master. It generates clock, synchronization and framing for all slave nodes. The master A2B chip is programmable over a control bus (I2C) for configuration and read-back. An extension of this control bus is embedded in the A2B data stream, allowing direct access of registers and status information on slave nodes as well as I2C-to-I2C communication over distance.

Each slave node in a system will be assigned a unique ID, which will be referred to as the node ID or the node number. This value is held in a NODE register and is assigned to a slave node when it is discovered, as discussed below. The master node does not need to have an ID in this embodiment, although the master node may have an ID in various alternative embodiments. In this exemplary embodiment, the slave attached to the master node will be slave node 0 and each successive slave node will have a number that is 1 higher than the previous slave node. For example, the next slave node after node 0 will be node 1, followed by node 2. This node numbering scheme is used in this specific exemplary embodiment, although alternative slave numbering schemes may be used in various alternative embodiments.

A configuration pin (MSTR) sets the chip to act as either an A2B master node or a slave node.

In a master configuration, the A2B chip is configured as an I2C Slave device that can be programmed via the I2C Interface and also is configured as an I2S/TDM Slave in which SCLK and SYNC are inputs. The PLL uses the SYNC pin or SCLK pin as an input to generate clocks. An interrupt request (IRQ) pin is provided to signal interrupts to host processor. An address (ADR) pin is used to modify the I2C addresses used by the chip.

In a slave configuration, the A2B chip is configured as an I2C Master device that can be used to program other parts via the I2C Interface and also is configured as an I2S/TDM Master in which SCLK and SYNC are outputs. The PLL uses data received from the upstream transceiver as an input to generate clocks. The serial data must be run through frame sync detection logic so that the frame rate can be used as the input to the PLL. In a slave configuration, the A2B chip also provides a PDM interface for direct connection of up to four pulse-density modulated digital microphones.

When the A2B chip is powered up, the voltage regulator will raise a "power good" signal, which will be used as a power-on reset by the PLL. A frame sync detection block in the PLL will wait until a predetermined number of frame syncs have been detected and then the PLL will synchronize to the frame syncs. The frame syncs come from the SYNC pin in a master node and from the upstream transceiver in a slave node (note that the slave node typically must have its upstream receiver enabled while the system reset is still active in order for the slave node to receive clocking and data from the upstream bus segment).

The A2B chip can be directly interfaced to general-purpose DSPs, FPGAs, ASICs, ADCs, DACs and codecs through a multi-channel I2S/TDM interface and an I2C port.

As discussed above, each node may provide power to the following downstream node over the downstream bus segment. For example, the master node may provide power to the first slave node, the first slave node may provide power to the second slave node, and so on. The powering of nodes typically is performed in a sequenced manner, i.e., after discovering and configuring the first slave node, the master instructs the first slave node to provide power to its downstream bus segment in order to provide power to a second slave node; after the second slave node is discovered and configured, the master instructs the second slave node to provide power to its downstream bus segment in order to provide power to a third slave node; and so on. It should be noted that the A2B allows for one or more of the slave nodes to be locally-powered as opposed to being powered from its upstream bus segment, and local power source for a given slave node may be used to provide power to one or more downstream slave nodes.

As discussed above, each superframe on the A2B bus will contain one Synchronization Control Frame (SCF) at the beginning and one Synchronization Response Frame (SRF) at the start of upstream traffic. These frames contain CRC fields that are used for error detection when the frames are received. The SCF and the SRF frames contain 16-bit CRC fields while the interrupt portion of the SRF contains a 4-bit CRC field. For convenience, an SRF frame that conveys an interrupt may be referred to herein as an "interrupt frame."

For an SCF, the slave nodes will check the CRC value and will not perform any commands given in the SCF in the case of a failure. For an SRF, the master node will check the CRC value and may generate an interrupt to the host in the case of a failure.

Any slave node that has an interrupt pending will generate an interrupt frame including its node identifier and the 4-bit CRC value.

A register access can be repeated when a CRC error occurred.

For an interrupt frame, the master node will check the 4-bit CRC value and will ignore any interrupt indicated in the case of a failure.

In a specific exemplary embodiment, the A2B Bus is capable of carrying up to 32 data slots combined between upstream (towards the host) and downstream (away from the host) data. There are several registers dedicated to managing these data slots on the bus. They are:

DNSLOTS—In the master node, this register holds the value of the total number of downstream data slots. It also defines the number of data slots that will be used for combined I2S/TDM and PDM receive by the master node. In a slave node, this register defines the number of data slots which are passed downstream before the node begins to strip off its own data.

LDNSLOTS—This register is unused in the master node. In a slave node, this register defines the number of data slots which the node will use and not retransmit. It also defines, in conjunction with BCDNSLOTS, the number of slots that will be used for I2S/TDM transmit by the slave node.

UPSLOTS—In the master node, this register holds the value of the total number of upstream data slots. It also defines the number of slots that will be used for I2S/TDM transmit by the master node. In a slave node, this register defines the number of data slots which are passed upstream before the node begins to add its own data.

LUPSLOTS—This register is unused in the master node. In a slave node, this register defines the number of data slots which the node will add to the upstream data. It also defines the number of data slots that will be used for combined I2S/TDM and PDM receive by the slave node.

BCDNSLOTS—This register is unused in the master node. In a slave node, this register defines the number of broadcast data slots. Broadcast data slots always come at the beginning of the data field. Broadcast data slots are used in multiple nodes and are passed downstream by all slave nodes whether or not they are used.

SLOTFMT—This register defines the format of data, both for upstream and downstream transmissions. The data size for the I2S/TDM Transmitter and I2S/TDM Receiver are also determined by this register. Valid data sizes include 8, 12, 16, 20, 24, 28, and 32 bits. There are also bits to enable floating point compression for downstream and upstream traffic. When floating point compression is enabled, the $I^2S$/TDM data size is 4 bits larger than the A2B data size. All notes in a system have the same values for SLOTFMT when data slots are enabled, and the nodes may be programmed by a broadcast write so that all nodes will be updated with the same value.

As discussed above, certain embodiments include data compression/decompression that can be selectively applied so that less bandwidth can be used on the A2B bus at a given data size with better quality than the next lower data size. In one specific exemplary embodiment, the compression scheme is a floating point compression that can be used for A2B data sizes of 12, 16, and 20 bits. This corresponds to I2S data sizes of 16, 20, and 24 bits. The compression works by transmitting 3 bits to indicate how many repeated sign bits are in the number, followed by a sign bit and N−4 bits of data, where N is the A2B data size. The use of such data compression is generally considered to be optional and may be selected/configured by the master device when such data compression scheme is included in certain exemplary embodiments.

Figure 16:
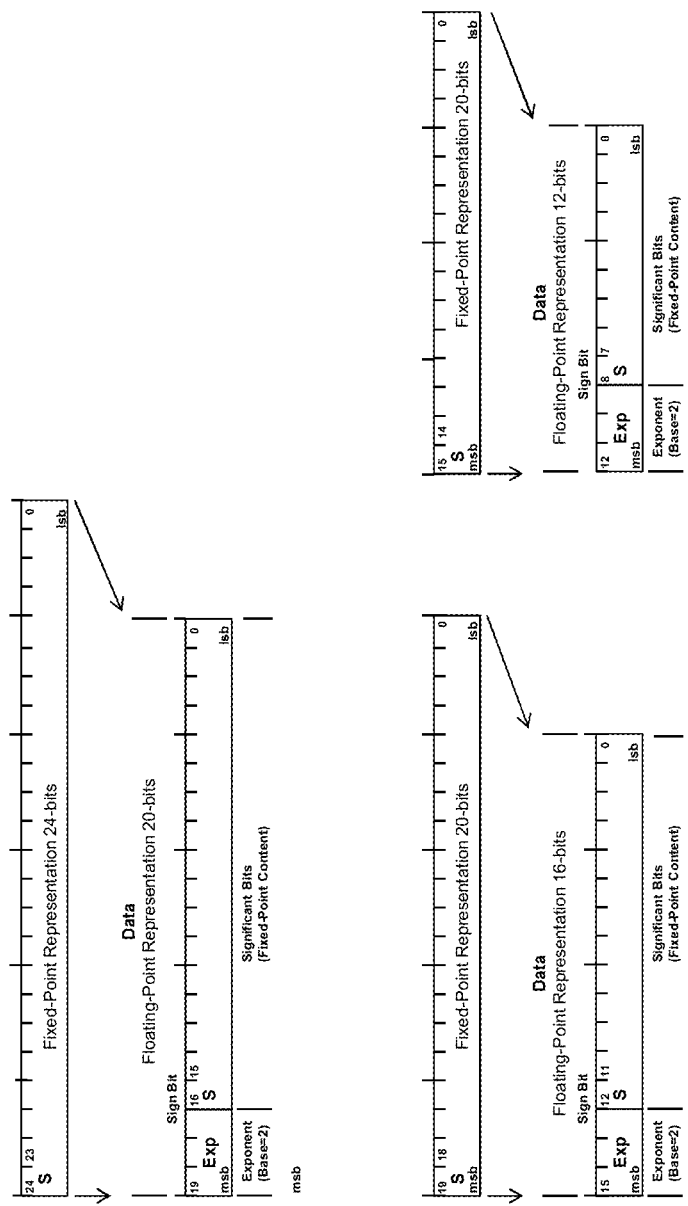
FIG. 16 shows various floating point compression formats, in accordance with one specific exemplary embodiment of the present invention.
Figure 17:
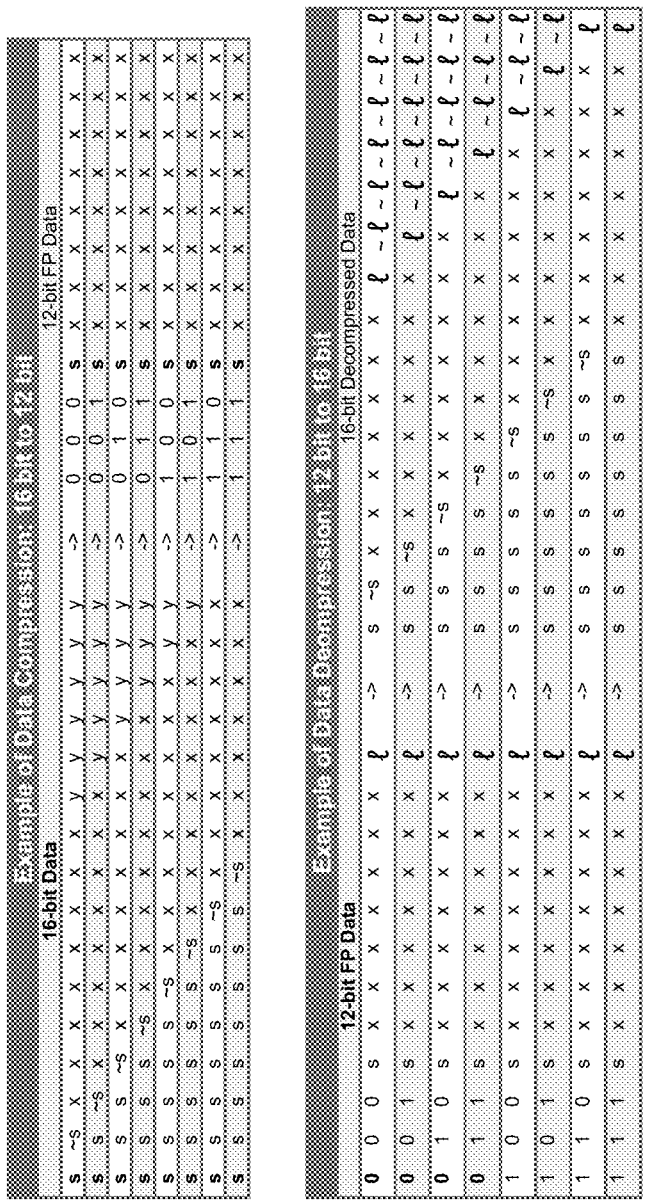
FIG. 17 provides an example of compression from 16 bits to 12 bits and decompression of the data from 12 bits back to 16 bits, in accordance with the floating point compression formats shown in FIG. 16.

FIG. 16 shows various floating point compression formats, in accordance with one specific exemplary embodiment of the present invention. FIG. 17 provides an example of compression from 16 bits to 12 bits and decompression of the data from 12 bits back to 16 bits, in accordance with the floating point compression formats shown in FIG. 16.

Whenever the master node receives an interrupt from a slave node, the master node will communicate with the slave node to obtain the interrupt type. Typically, this will not delay the generation of an interrupt to the host. If the host attempts to obtain interrupt information from the master before the master has obtained the interrupt information from the slave, the read will be delayed until the information is available. This may be done, e.g., through I2C clock stretching or other mechanism.

In one specific exemplary embodiment, A2B system initialization is controlled in large part by the host through interaction with the master device, although it should be noted that in various alternative embodiments the master device may be configured to perform substantially all slave discovery and initial configuration. In this specific exemplary embodiment, each node in the system is brought up in order, starting with the master node. The initialization sequence given below assumes that the slave nodes are bus powered.

In order to initialize the master node, if necessary, the host will enable power to the master node. The host will then provide a clock signal to the master via a SYNC pin, e.g., at the audio sampling rate of the system (e.g., typically either 48 kHz or 44.1 kHz). Frame sync detection logic in the master device typically uses the rising edge of the SYNC pin as the clock edge. After the PLL has locked onto the clock signal, the master node will generate an interrupt to the host (IRQ will be driven high). Because the PLL lock takes time to complete, the host should set a timer so that a non-responsive master node can be detected by the software. Once the master node is initialized, the master node may be programmed via the I2C interface. It should be noted that, at this point during system initialization, the master node is the current last node that has been discovered by the host.

Following initialization of the master node, each slave node will be initialized in order, as follows. The host sends a command to the current last node causing the current last node to enable power on its downstream bus segment. If the only node that has been brought up is the master node (and no slave nodes have been discovered) then the master node is the last node. The host then sends a command to the current last node to enable the downstream transceiver in the current last node, which begins transmitting superframes to the next slave node with only synchronization header fields in the synchronization control frame. The host then sends a command to the master node to prepare for discovery of the next slave node, including the node number of the slave node to be discovered (i.e., typically, this number will be 0 for the slave node connected to the master node, and will be one higher than the number of the current last node otherwise). The host then sends a command to the current last node to initiate discovery mode. Discovery mode is controlled by a state machine in the master and begins with a complete synchronization control frame being sent to the next slave device. Because the PLL lock may take time to complete, the host should set a timer so that a non-responsive slave node can be detected by the software. It is possible for the host to abort the discovery process by writing to a predetermined register in the master, e.g., after unsuccessful discovery attempts). Assuming the next higher numbered node is discovered, it can be programmed via the A2B bus, and a bit in the master node will be set when discovery is successful, which can be used to generate an interrupt to the host. Registers in the newly discovered node can be accessed using appropriate addressing in the NODEADR register of the master. This process is repeated for each slave node to be brought up. It is possible for data slots to be enabled to and from active slave nodes before entering discovery mode again.

It should be noted that the above initialization sequence is exemplary only, and embodiments may use alternative initialization sequences to accomplish discovery and configuration of the master and slave devices. The various operations described above may be atomized further than what was described, e.g., sending a command to a device may involve multiple interactions/transactions.

14. Exemplary Automobile Microphone Placement Scenarios

Figure 67:
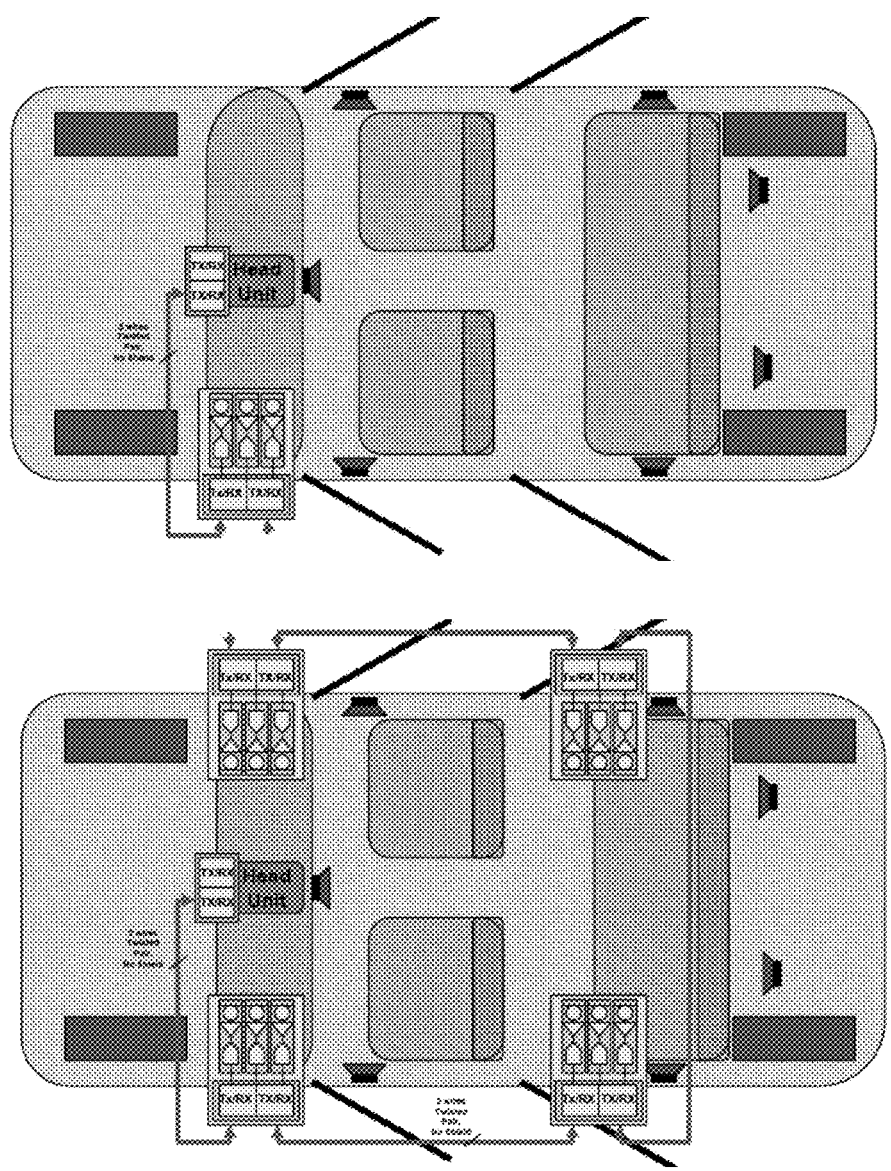
FIG. 67 schematically shows scenarios with one or more microphone arrays in communication with the headend control unit via an A2B bus.
Figures 1, 69:
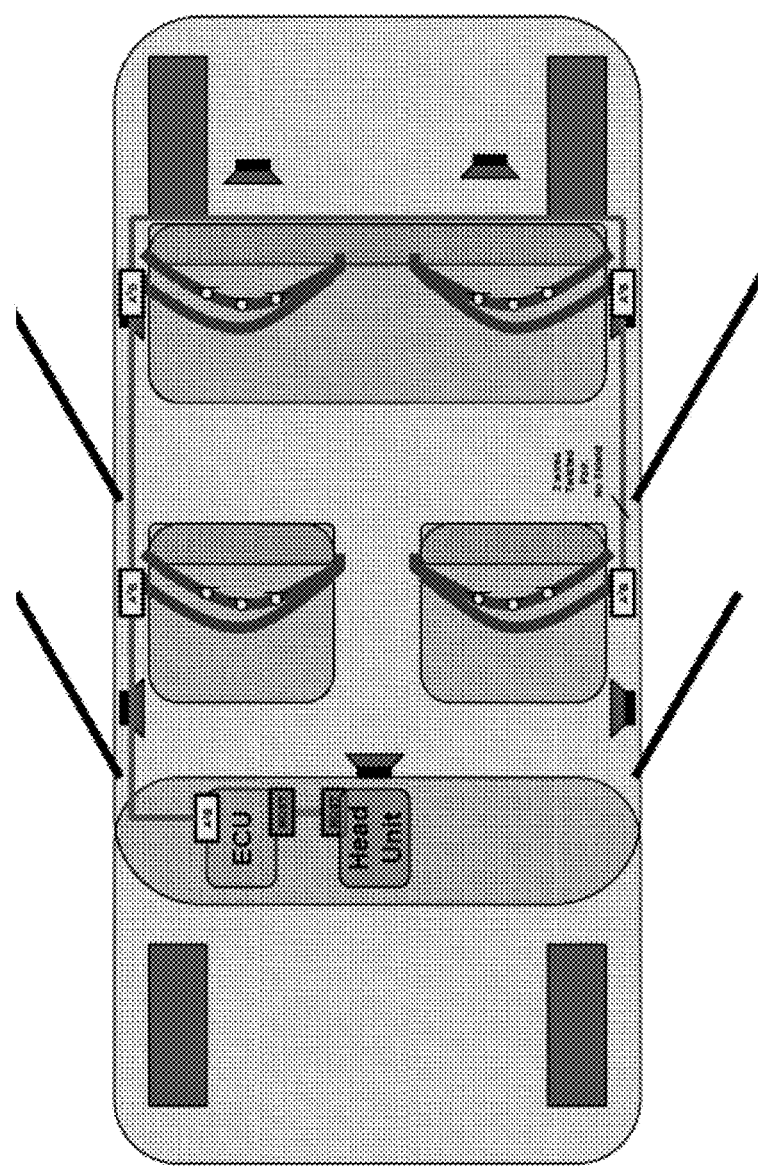
FIGS. 69-73 schematically show various other A2B-enabled scenarios for placement of microphones and other devices throughout an automobile.
Figures 2, 69:
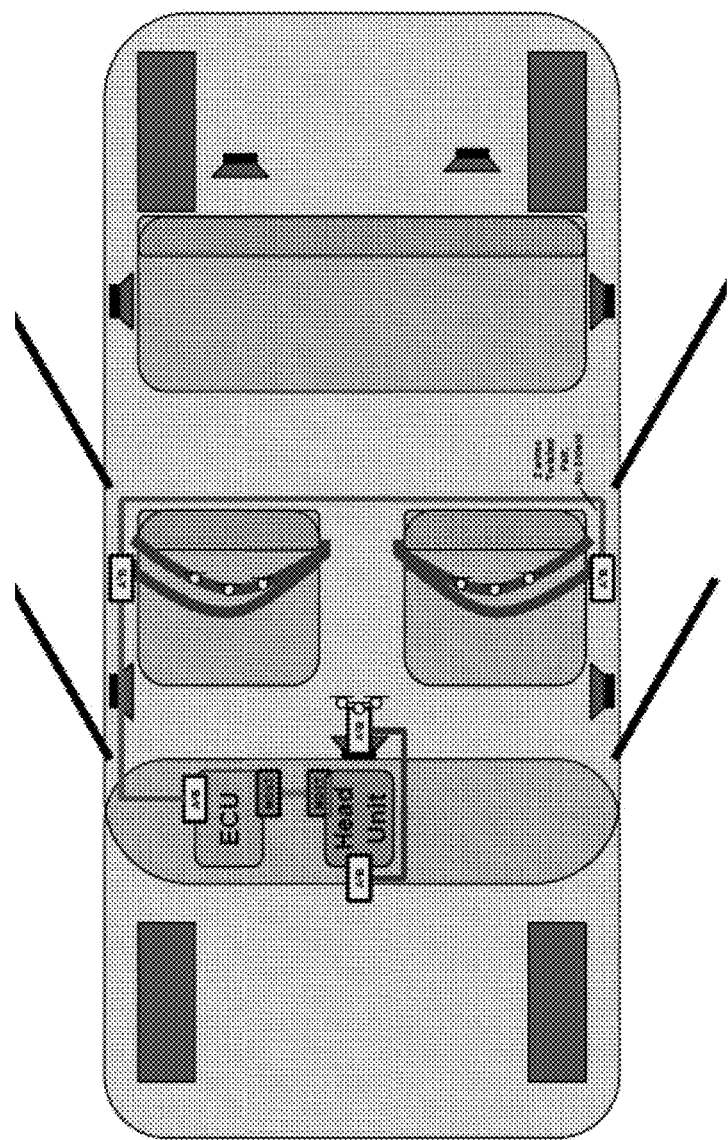
FIG. 2 shows some exemplary microphone connections as known in the art.

FIG. 67 schematically shows scenarios with one or more microphone arrays in communication with the headend control unit via an A2B bus.

FIG. 68 schematically shows scenarios with seatbelt-mounted microphones in communication with the headend control unit via one or more A2B devices. In the top drawing, three separate microphones are individually wired to an A2B connection point, which is attached to the A2B bus to the headend control unit. In the bottom drawing, each microphone has its own A2B interface; in this example, the A2B interfaces at the microphones communicate through another A2B interface, although this is not required.

It should be noted that various types of sensors and/or actuators (e.g., a speaker, a push-to-talk button, etc.) may be mounted in the seatbelt or seat itself (e.g. headrest) in addition to, or in lieu of, one or more microphones, with all such sensors/actuators connected to the headend control unit via one or more A2B bus interfaces. For one example, with reference again to FIG. 68, an A2B interface may be incorporated into a seatbelt stopper button (not shown), which would reduce the amount of wiring needed for microphones and other devices and also would avoid bulky attachments to the seatbelt (which may be the case for the A2B-enabled microphones shown in FIG. 68). Also, the seatbelt stopper button could house additional devices, such as, for example, a speaker, a push-to-talk button, a mute button, etc.

FIGS. 69-73 schematically show various other A2B-enabled scenarios for placement of microphones and other devices throughout an automobile.

Figures 1, 74:
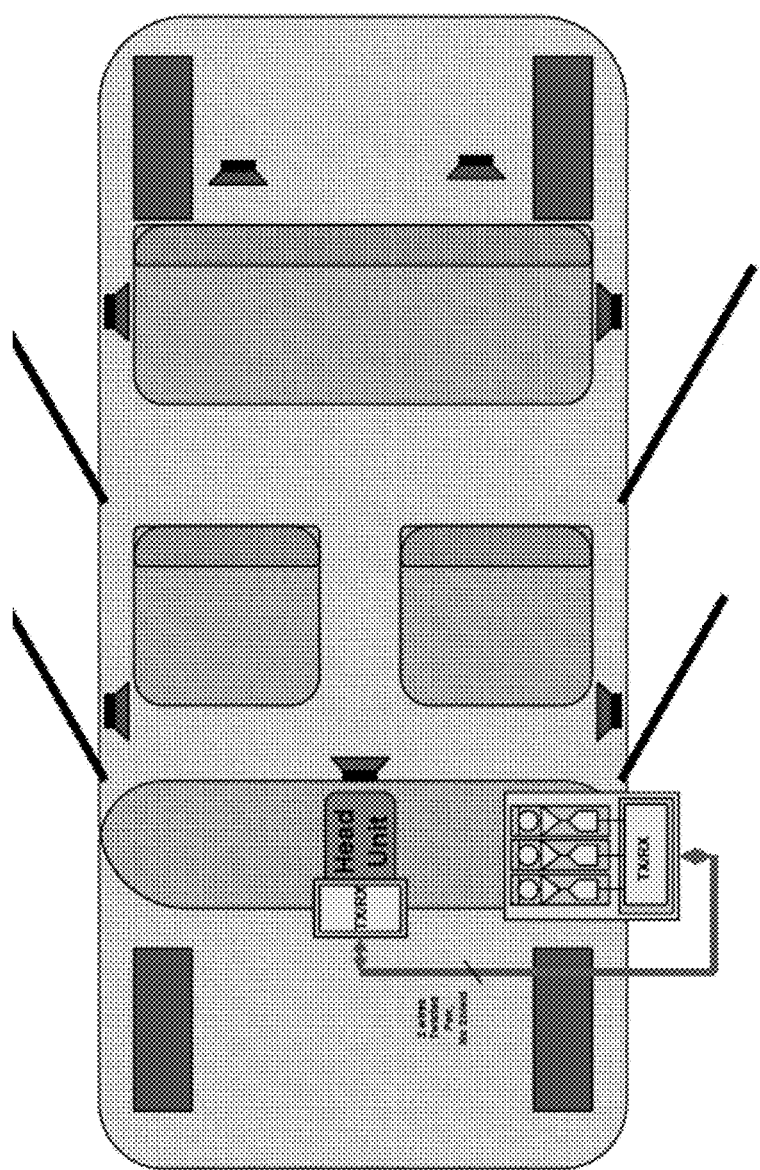
FIG. 74 schematically shows various A2B-enabled scenarios for placement and microphones and other devices throughout an automobile using an A2B bi-directional multipoint bus configuration.
Figures 2, 74:
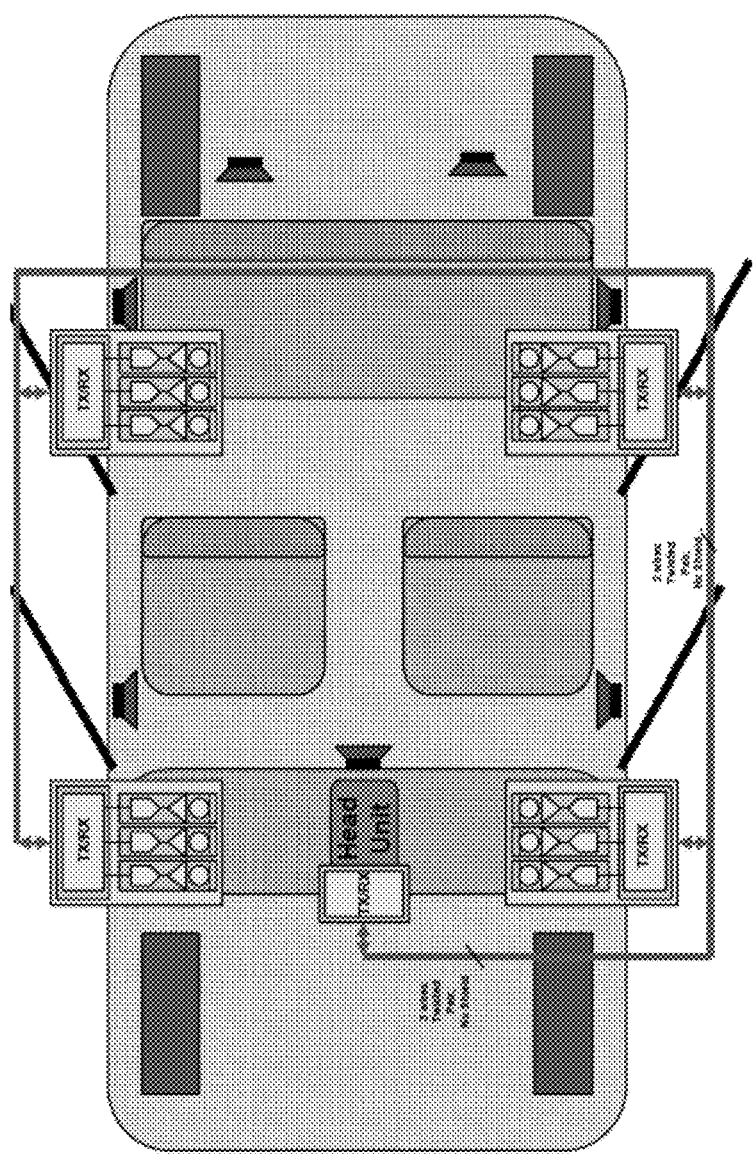

FIG. 74 schematically shows various A2B-enabled scenarios for placement and microphones and other devices throughout an automobile using an A2B bi-directional multipoint bus configuration.

15. Additional Uses of A2B System

While the exemplary embodiments described above focus mainly on the conveyance of audio data using the A2B system, it should be noted that the A2B system can be configured and used for a wide range of applications including, but in no way limited to, the following:

1) MEMS microphone processing may be integrated on the A2B transceiver die (includes e.g. MEMS stimulus, Cap Sensor, etc.). Among other things, this allows integration into a microphone chip with two dies both a MEMS element and an A2B transceiver with microphone processing.

2) Use time domain reflectometry (TDR) for line diagnostics, which allows differentiation between good connection, short and open line even with line distance measurement of fault (based on time of reflection arrival).

3) Use a MEMS switch to pass power from one node to the next. This could be on the same die or on a separate die, e.g., integrated with microphone MEMS element.

4) Stack die on top of A2B transceiver, e.g., stacked die for passive components (resistors, capacitors, inductors), active components (e.g. switches) or even MEMS (e.g. MEMS element, MEMS switch). Additionally or alternatively, could stack A2B transceiver on another device such as a signal processor;

5) Use transformer on A2B transmitter/receiver circuit for AC coupling and to reduce common mode effects, optionally in combination with common mode choke.

6) Use iCoupler™ technology from Analog Devices, Inc. of Norwood, Mass. for the A2B transmitter/receiver interface to the A2B wires or to isolate the bus and transceiver from other components.

7) Use current sense or voltage sense with thresholds in transceiver devices to integrate a diagnostics function (e.g., instead of using external ADC in the master).

8) Use A2B bus for accelerometers and gyroscopes as well as other sensors and actuators.

9) Include digital content protection like HDCP or DTCP with A2B (e.g., integrated or as an outside layer).

10) Update program code of microcontrollers over A2B data stream to memory or flash (flash update). This could be implemented as an additional software communication layer between the host and slaves, e.g., using I2S/TDM and A2B as a physical medium for fast data exchanges.

11) Support IP packets over I2S and A2B.

12) Support of proprietary data exchange packets that concatenate different I2S/A2B slots.

13) Support of compressed video frames over I2S/A2B slots (optionally with content protection).

14) The protocols described herein can be modified to allow direct slave-to-slave communication, as discussed above. Additionally or alternatively, the master node could also directly send received upstream slots downstream without streaming the data through a host (less delay).

15) Use switch-capacitor voltage converters (charge pump) e.g., in the master, in a locally-powered slave, or in a slave that provides power to peripherals, to step up or step down supply voltage, which can save power compared to linear regulators for step-down and allows step-up with external capacitor instead of inductor.

16) Use transformers instead of common mode chokes for common mode rejection or use integrated combined transformers that include a common mode choke.

17) Use center tapped auto transformer for common mode rejection instead of transformer or common mode choke (or use it as an addition to other common mode rejection circuit).

16. Miscellaneous

Various embodiments are described above with reference to microphones used in automotive applications. It should be noted that, in such applications, a slave device with one or more microphones (which may be integral with the slave device or separate from the slave device) may be included near or in the rear-view mirror, in the vehicle headliner, in a vehicle restraint (e.g., seatbelt strap), in a vehicle headrest, and/or in other vehicle components. In some embodiments, multiple microphones (e.g., digital MEMS microphones) will be used together in each of a number of locations (e.g., three separate microphones or a microphone array with three microphones), for example, for beam-forming or beam-steering.

While exemplary embodiments are described above with reference to automotive audio applications (e.g., involving microphones and/or speakers), it should be noted that the two-wire buses may be used in other applications, such as, for example, replacing a MOST or analog link between a head-end control unit and car amplifier, for active speakers in a vehicle, as a field bus alternative, for industrial automatic noise cancellation, for active speaker communication, for intercom systems, for professional audio systems, etc. It also should be noted that the various protocols (e.g., for synchronization, discovery/synchronization, and I2C) may be used in other communication systems and are not necessarily limited to use with the A2B bus or other two-wire buses (e.g., conceivably, the described protocols may be used over single-wire bus systems or other communication systems).

It should be noted that the message formats shown and described herein are exemplary, and other message formats can be used to accomplish the same or similar functionality over the A2B bus or similar bus.

It should be noted that headings are used above for convenience and are not to be construed as limiting the present invention in any way.

It should also be noted that, unless the context requires otherwise, references to specific communication protocols and message formats are exemplary, and it should be understood that alternative embodiments may, as appropriate, employ variations of such communication protocols and message formats (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

Various aspects of the present invention may be embodied in different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

The present invention may be embodied in other specific forms without departing from the true scope of the invention, and numerous variations and modifications will be apparent to those skilled in the art based on the teachings herein. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. In a communication system having a master device, at least one intermediate slave device, and a last slave device communicatively coupled in series, a method for coordinating data communications between the master device and a succession of slave devices, the method comprising:
   periodically transmitting a synchronization control frame by the master device downstream to a first intermediate slave device in the succession of slave devices;
   selectively forwarding the synchronization control frame downstream by each successive intermediate slave device to the last slave device;
   transmitting by the last slave device a synchronization response frame upstream; and
   selectively forwarding the synchronization response frame upstream by each successive intermediate slave device to the master device, wherein:
   each slave device derives timing information from the downstream synchronization control frame;
   at least one slave device transmits data upstream;
   each slave device that receives data from a downstream device selectively transmits the received data upstream and selectively transmits additional data upstream; and
   each device that transmits data upstream transmits that data in at least one designated time interval following the synchronization control frame.

2. A method according to claim 1, wherein each slave device is communicatively coupled to a corresponding upstream device by a separate two-wire bus segment.

3. A method according to claim 1, wherein the timing information includes a clock signal for local timing at the slave device and a framing signal indicating the start of a periodic superframe.

4. A method according to claim 1, wherein selectively transmitting data received from a downstream device comprises selectively removing that data without transmitting that data upstream.

5. A method according to claim 1, further comprising:
   selectively transmitting data for at least one slave device by the master device following the synchronization control frame, wherein:
   each slave device that receives data from an upstream device selectively transmits that data downstream and selectively transmits additional data downstream; and
   each device that transmits downstream data transmits that data in designated time intervals following the synchronization control frame.

6. A method according to claim 5, wherein selectively transmitting data received from an upstream device comprises selectively removing that data from a time interval without transmitting that data downstream.

7. A method according to claim 5, wherein at least one of:
   the downstream data transmitted in designated time intervals includes a parity bit as part of a frame of that data; or
   the downstream data transmitted in designated time intervals is scrambled.

8. A method according to claim 1, wherein the synchronization control frame comprises:
   a preamble; and
   a header, wherein periodically transmitting the synchronization control frame by the master device comprises scrambling a portion of the header.

9. A method according to claim 8, wherein the scrambled portion of the header includes a count field that is changed for each successive transmission to effectively change scrambling parameters for scrambling the remainder of the scrambled portion of the header.

10. A method according to claim 1, wherein the synchronization control frame includes a set of fields selectively used by the master device for conveying communications between an 12C-connected host and a designated slave device.

11. A method according to claim 10, wherein the set of fields includes a field selectively used by the master device to indicate whether a communication is destined for the designated slave device itself or for an 12C device coupled to the designated slave device.

12. A method according to claim 1, wherein the synchronization control frame sent by the master device selectively includes broadcast information intended for all slave devices, and wherein the synchronization response frame includes a broadcast acknowledgement field for indicating whether or not the slave devices received the broadcast information.

13. A method according to claim 1, wherein the synchronization response frame includes an interrupt frame portion to indicate that a slave device requires attention by the master device.

14. A method according to claim 13, wherein the synchronization response frame includes a first CRC field and a second CRC field specifically for the interrupt frame portion.

15. A method according to claim 14, wherein the first CRC field is a 16-bit CRC field, and wherein the second CRC field is a 4-bit CRC field.

16. A method according to claim 1, wherein at least one of:

the upstream data transmitted in at least one designated time interval includes a parity bit as part of a frame of that data; or the upstream data transmitted in at least one designated time interval is scrambled.

17. In a communication system having a master device and a plurality of slave devices communicatively coupled in series, a method for discovering and configuring slave devices, the method comprising, in each of a number of successive discovery cycles:

transmitting a discovery signal by the master device on a downstream communication link;

by each discovered slave device that receives the discovery signal, forwarding the discovery signal on to a respective next-in-line downstream communication link; and by an undiscovered slave device that receives the discovery signal, responding to the discovery signal upstream towards the master device without forwarding the discovery signal on to a next-in-line downstream communication link.

18. A method according to claim 17, wherein a discovered slave device that is configured as a last discovered slave device and that receives the discovery signal forwards the discovery signal on to a respective next-in-line downstream communication link and awaits a reply from a downstream slave device while maintaining communications with the master device over an upstream communication link and, upon receiving a discovery response from the downstream slave device, forwards the discovery response from the downstream slave device to the master device over the upstream communication link.

19. A method according to claim 18, wherein such discovered slave device that is configured as the last discovered slave device and that receives the discovery signal provides power to the respective next-in-line downstream communication link of the last discovered slave device prior to forwarding the discovery signal.

20. A method according to claim 19, wherein the last discovered slave device providing power to the respective next-in-line downstream communication link of the last discovered slave device comprises connecting power from the upstream communication link to the respective next-in-line downstream communication link of the last discovered slave device.

21. A method according to claim 20, wherein connecting power from the upstream communication link to the respective next-in-line downstream communication link of the last discovered slave device comprises closing at least one switch coupled between the upstream communication link and the respective next-in-line downstream communication link of the last discovered slave device.

22. A method according to claim 18, further comprising, upon discovery of the downstream slave device:

configuring the downstream slave device as the last discovered slave device; and reconfiguring the previously last discovered slave device as no longer being the last discovered slave device.

23. A method according to claim 17, wherein the discovery signal is part of a synchronization control frame from which the slave devices obtain timing information.

24. A method according to claim 17, wherein the discovery signal includes a response time indicating a time interval for a newly discovered slave device to reply to the discovery signal.

* * * * *